US012592803B2

(12) United States Patent
Jiang et al.

(10) Patent No.: US 12,592,803 B2
(45) Date of Patent: Mar. 31, 2026

(54) USER EQUIPMENT AND METHOD THEREOF FOR WIRELESS COMMUNICATION

(71) Applicant: Apogee Networks, LLC, Plano, TX (US)

(72) Inventors: Qi Jiang, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 432 days.

(21) Appl. No.: 17/949,235

(22) Filed: Sep. 21, 2022

(65) Prior Publication Data

US 2023/0163919 A1     May 25, 2023

Related U.S. Application Data

(63) Continuation of application No. PCT/CN2021/083153, filed on Mar. 26, 2021.

(30) Foreign Application Priority Data

Mar. 27, 2020     (CN) .......................... 202010228295.3
Apr. 5, 2020     (CN) .......................... 202010261836.2
(Continued)

(51) Int. Cl.
*H04L 5/00*          (2006.01)
(52) U.S. Cl.
CPC .................................. *H04L 5/0053* (2013.01)
(58) Field of Classification Search
CPC ... H04L 5/0053; H04L 5/0007; H04L 5/0094; H04L 27/26025; H04W 72/23
See application file for complete search history.

(56) References Cited

U.S. PATENT DOCUMENTS 10,448,389 B1     10/2019 Seo
2018/0368116 A1     12/2018 Liao
(Continued)

FOREIGN PATENT DOCUMENTS

CN          106304371 A          1/2017
CN          109952803 A          6/2019
(Continued)

OTHER PUBLICATIONS

SR received in application No. PCT/CN2021/083153 dated Aug. 25, 2021.
(Continued)

*Primary Examiner* — Chae S Lee
(74) *Attorney, Agent, or Firm* — Volpe Koenig

(57) ABSTRACT

A method and a device in nodes used for wireless communications. A node receives a first information block; and monitors M1 control channel candidates in a first time window, and the M1 control channel candidates occupy M2 control channel elements; the first information block is used to indicate a scheduled cell set, and serving cells comprised by the scheduled cell set are divided into a first cell group and a second cell group; the scheduled cell set comprises a target cell, and K1 scheduling cells are capable of scheduling the target cell; a number of control resource pools of the K1 scheduling cells is used to determine a cell group to which the target cell belongs; a first quantitative value and a second quantitative value respectively correspond to the first cell group and the second cell group. The present disclosure ensures the flexibility of control signaling under multiple TRPs.

20 Claims, 12 Drawing Sheets

100C

Step 101C receiving first information, the first information being used for indicating first search space set Step 102C monitoring a target control signaling candidate set in first time window, the target control signaling candidate set comprising a positive integer number of control signaling candidate(s)

(30) Foreign Application Priority Data

| | | |
|---|---|---|
| Apr. 8, 2020 | (CN) | .......................... 202010270020.6 |
| Apr. 14, 2020 | (CN) | .......................... 202010289027.2 |

(56) References Cited

U.S. PATENT DOCUMENTS

| | | | | |
|---|---|---|---|---|
| 2019/0150073 | A1 | 5/2019 | Tiirola | |
| 2019/0349155 | A1 | 11/2019 | Xu | |
| 2019/0380149 | A1 | 12/2019 | Jiang | |
| 2020/0092073 | A1 | 3/2020 | Papasakellariou | |
| 2020/0280994 | A1* | 9/2020 | Liu | ........................ H04W 72/53 |
| 2021/0195559 | A1* | 6/2021 | Khoshnevisan | ...... H04W 72/23 |

FOREIGN PATENT DOCUMENTS

| | | | |
|---|---|---|---|
| CN | 110383729 | A | 10/2019 |
| CN | 110662228 | A | 1/2020 |
| CN | 110740479 | A | 1/2020 |
| CN | 110740512 | A | 1/2020 |
| CN | 110830216 | A | 2/2020 |
| EP | 3813420 | A1 | 4/2021 |
| IN | 110582119 | A | 12/2019 |
| NO | 2020039483 | A1 | 2/2020 |
| WO | 2020015643 | A1 | 1/2020 |
| WO | WO-2022082709 | A1 * | 4/2022 |

OTHER PUBLICATIONS

First Search Report of Chinses patent application No. CN202010228295.3 dated Mar. 12, 2022.

First Search Report of Chinses patent application No. CN202010270020.6 dated Mar. 16, 2022.

First Search Report of Chinses patent application No. CN202010289027.2 dated Feb. 15, 2022.

Notification to Grant Patent Right for Invention of Chinses patent application No. CN202010228295.3 dated Mar. 18, 2022.

Notification to Grant Patent Right for Invention of Chinses patent application No. CN202010270020.6 dated Mar. 23, 2022.

Notification to Grant Patent Right for Invention of Chinses patent application No. CN202010289027.2 dated Apr. 6, 2022.

Ericsson "PDCCH Enhancements for NR URLLC" 3GPP TSG-RAN WG1 Meeting #96bis Tdoc R1-1904122 Apr. 2, 2019.

Ericsson "PDCCH Enhancements for NR URLLC" 3GPP TSG-RAN WG1 Meeting #99 R1-1911945 Nov. 9, 2019.

LG Electronics "PDCCH enhancements for Nr URLLC"3GPP TSG RAN WG1 #99 R1-1912396 Nov. 8, 2019.

Huawei, HiSilicon "Corrections on PDCCH/GC-PDCCH monitoring procedure in TS38.213"3GPP TSG RAN WG1 Meeting #100-e R1-2000195 Feb. 15, 2020.

Qualcomm Incorporated"Remaining issues on control resource set and search space"3GPP TSG RAN WG1 Meeting #92bis R1-1804798 Apr. 6, 2018.

Zte, Sanechips"Search space design and related issues"3GPP TSG RAN WG1 Meeting #92Bis R1-1805263 Apr. 10, 2018.

Third Generation Partnership Project, "Technical Specification Group Radio Access Network; NR; Physical channels and modulation (Release 16)," 3GPP TS 38.211 V16.0.0 (Dec. 2019).

Third Generation Partnership Project, "Technical Specification Group Radio Access Network; NR; Multiplexing and channel coding (Release 16)," 3GPP TS 38.212 V16.0.0 (Dec. 2019).

Third Generation Partnership Project, "Technical Specification Group Radio Access Network; NR; Physical layer procedures for control (Release 16)," 3GPP TS 38.213 V16.0.0 (Dec. 2019).

Third Generation Partnership Project, "Technical Specification Group Radio Access Network; NR; Physical layer procedures for data (Release 16)," 3GPP TS 38.214 V16.0.0 (Dec. 2019).

Third Generation Partnership Project, "Technical Specification Group Radio Access Network NR Radio Resource Control (RRC) protocol specification (Release 15)," 3GPP TS 38.331 V15.8.0 (Dec. 2019).

\* cited by examiner

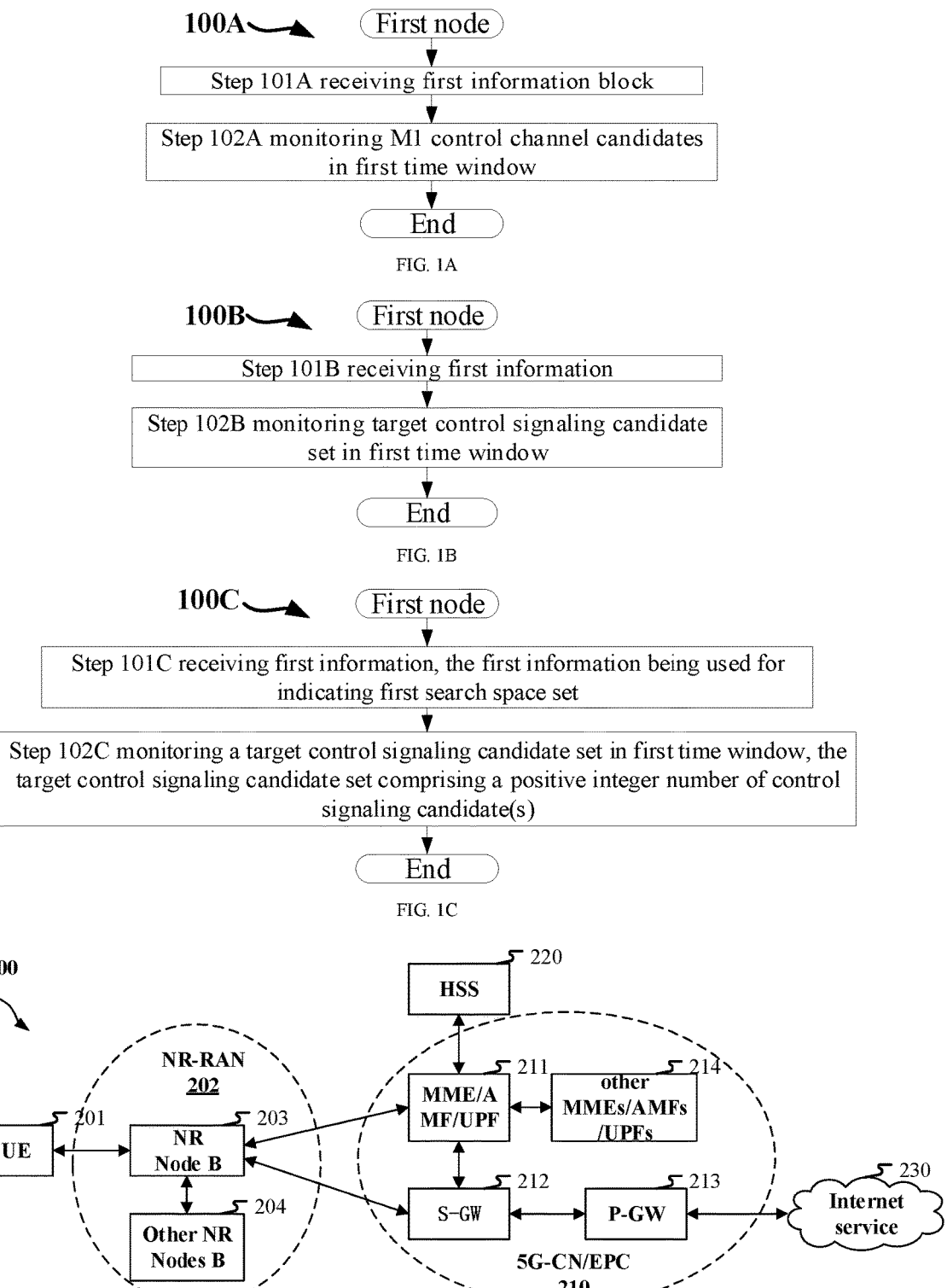

100A ➤ ( First node )
↓
Step 101A receiving first information block
↓
Step 102A monitoring M1 control channel candidates in first time window
↓
( End )

FIG. 1A

100B ➤ ( First node )
↓
Step 101B receiving first information
↓
Step 102B monitoring target control signaling candidate set in first time window
↓
( End )

FIG. 1B

100C ➤ ( First node )
↓
Step 101C receiving first information, the first information being used for indicating first search space set
↓
Step 102C monitoring a target control signaling candidate set in first time window, the target control signaling candidate set comprising a positive integer number of control signaling candidate(s)
↓
( End )

FIG. 1C

EPS 200

NR-RAN
202

UE — 201
NR Node B — 203
Other NR Nodes B — 204

HSS — 220

MME/AMF/UPF — 211
other MMEs/AMFs/UPFs — 214

S-GW — 212
P-GW — 213

5G-CN/EPC
210

Internet service — 230

FIG. 2

*jointly determining whether first search space set and second search space are to be dropped*

$$\frac{\text{Target sum value} = N_{1,\mu}+\gamma \cdot N_{2,\mu}}{\text{Characteristic sum value} = N_1+\gamma \cdot N_2} \implies \boxed{\text{First parameter}}$$

$$N_{1,cap}+R \cdot N_{2,cap} \implies \boxed{\text{Second parameter}}$$

| SCS Index | first-type candidate parameter | Second-type candidate parameter |
|-----------|-------------------------------|--------------------------------|
| 0 | 44 | 56 |
| 1 | 36 | 56 |
| 2 | 22 | 48 |
| 3 | 20 | 32 |
FIG. 18A
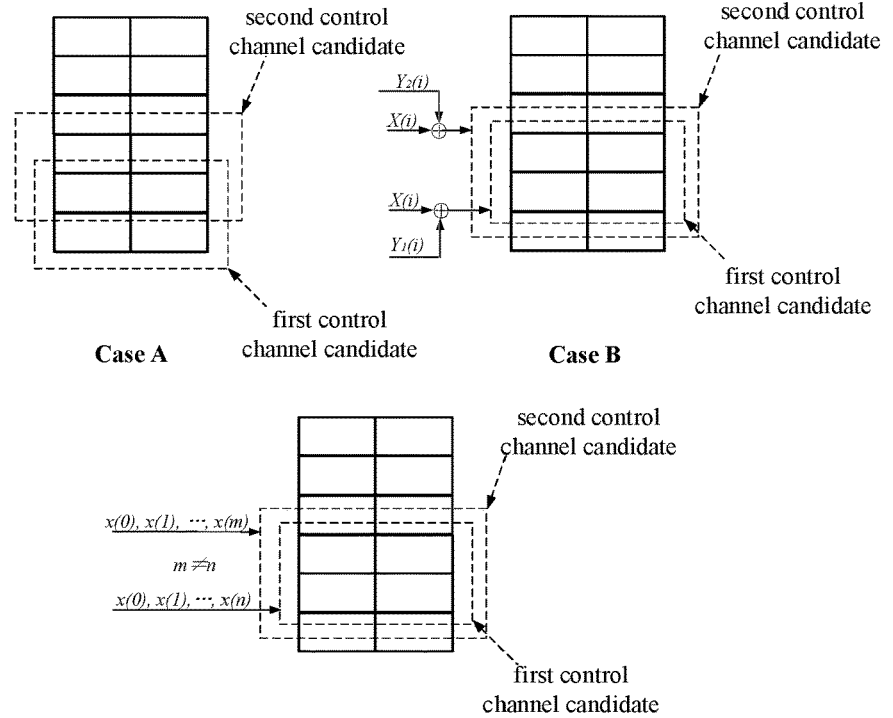
Case A
Case B
Case C
FIG. 19A
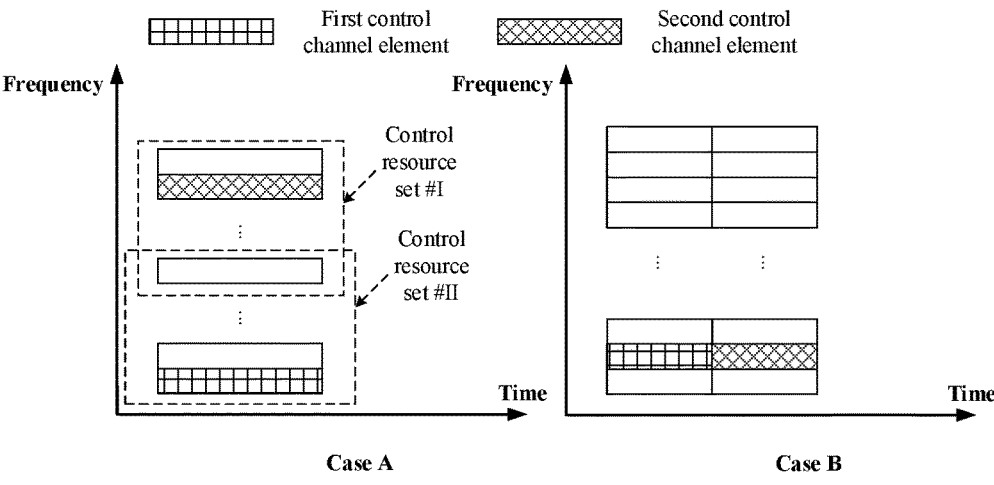
Case A
Case B
FIG. 20A

USER EQUIPMENT AND METHOD THEREOF FOR WIRELESS COMMUNICATION

CROSS REFERENCE TO RELATED APPLICATIONS

This application is the continuation of the International Patent application No.PCT/CN2021/083153, filed on Mar. 26, 2021, which claims the priority benefit of Chinese Patent Application No. 202010228295.3, filed on Mar. 27, 2020, and claims the priority benefit of Chinese Patent Application No. 202010261836.2, filed on Apr. 5, 2020, and claims the priority benefit of Chinese Patent Application No. 202010270020.6, filed on Apr. 8, 2020, and claims the priority benefit of Chinese Patent Application No. 202010289027.2, filed on Apr. 14, 2020, the full disclosure of which is incorporated herein by reference.

BACKGROUND

Technical Field

The present disclosure relates to transmission methods and devices in wireless communication systems, and in particular to a transmission method of Physical Downlink Control Channel (PDCCH) in wireless communications under Release 17.

Related Art

Application scenarios of future wireless communication systems are becoming increasingly diversified, and different application scenarios have different performance demands on systems. In traditional Long-Term Evolution (LTE) and Long-Term Evolution Advanced (LTE-A) systems, the technique of Multi Input Multi Output (MIMO) is introduced for the benefit of transmission performance, with an improvement in system throughput and transmission rate. In 5G and NR systems, a scheme of Beamforming is further proposed to enhance transmission efficiency.

In 5G and subsequent Release 17 evolutions, the Multi-Beam scheme will continue its evolution and enhancement, of which one important aspect is how to enhance the transmission performance of PDCCH under multi-beam scenarios, especially when adopting multiple beams in a Multi-Transmitter Receiver Points (Multi-TRP) scenario.

SUMMARY

In scenarios of Carrier Aggregation (CA), and various Subcarrier Spacings (SCSs), a maximum PDCCH Candidate number and a maximum Non-Overlapped Control Channel Element (CCE) number that a UE can detect are introduced to optimize implementation and distribution of blind detections at the terminal end. When combining CA and Multi-TRP, in consideration of supporting a secondary carrier scheduling a primary carrier in future scenarios, namely, a Scheduled Cell capable of being scheduled by multiple Scheduling Cells, protocols pertaining to the maximum PDCCH candidate and the maximum Non-Overlapped CCE shall be redesigned.

In traditional PDCCH blind detection in Release 16, a terminal usually maintains a maximum number of PDCCH candidates and Non-Overlapped CCEs monitored for a Serving Cell in a Downlink Bandwidth Part (DL BWP) in a slot: when a total number of PDCCH Candidate and Non- Overlapped CCEs required to be monitored by a terminal exceeds the upper limit, the terminal will, on the condition that the number of blind detections on a Common Search Space (CSS) is guaranteed, perform blind detections according to an ascending order of Search Space Set IDs. A Search Space Set with larger Search Space Set ID is more likely to be dropped.

In the DSS scenario, when a Scheduled Cell can be scheduled by multiple Scheduling Cells, the above-mentioned dropping mechanism shall be re-defined. In the meantime, the Multi-Beam scheme will be further evolved and enhanced in 5G and later evolutions of R17. One important aspect herein is to enhance the PDCCH transmission performance in Multi-Beam scenarios, especially when employing multiple beams in a Multi-TRP scenario. When multiple search space sets are respectively associated with different TRPs, the above dropping mechanism shall be re-defined.

In the DSS scenario, when a Scheduled Cell can be scheduled by multiple Scheduling Cells, and the scheduling cells and the scheduled cell respectively employ different SCSs, the above dropping mechanism shall be re-defined.

To address the above problem, the present disclosure provides a solution of dynamic spectrum sharing. It should be noted that though the present disclosure only took the combination of multicarrier and multi-antenna scenarios, or multi-TRP scenario as a typical example in the statement above, it is also applicable to other scenarios confronting similar difficulties, including other multicarrier transmissions, or multi-channel transmissions or other networks having specific requirements for data scheduling, where similar technical effects can be achieved. Additionally, the adoption of a unified solution for various scenarios (including but not limited to dynamic spectrum sharing and multicarrier multi-antenna communications) contributes to the reduction of hardcore complexity and costs. If no conflict is incurred, embodiments in a first node in the present disclosure and the characteristics of the embodiments are also applicable to a second node, and vice versa. And the embodiments in the present disclosure and the characteristics in the embodiments can be arbitrarily combined if there is no conflict. Particularly, for interpretations of the terminology, nouns, functions and variants (unless otherwise specified) in the present disclosure, refer to definitions given in TS36 series. TS38 series and TS37 series of 3GPP specifications.

In view of the above problems, the present disclosure provides a solution. It should be noted that if no conflict is incurred, embodiments in a first node in the present disclosure and the characteristics of the embodiments are also applicable to a second node, and vice versa. And the embodiments in the present disclosure and the characteristics in the embodiments can be arbitrarily combined if there is no conflict.

The present disclosure provides a method in a first node for wireless communications, comprising: receiving a first information block; and monitoring M1 control channel candidates in a first time window, the M1 control channel candidates occupying M2 control channel elements. M1 being a positive integer greater than 1, and M2 being a positive integer greater than 1;

herein, the first information block is used to indicate a scheduled cell set, and serving cells comprised by the scheduled cell set are divided into a first cell group and a second cell group: the first cell group is different from the second cell group: the scheduled cell set comprises a target cell, and any of K1 scheduling cells is a scheduling cell for the target cell. K1 being a positive integer greater than 1; one of the M1 control channel candidates employs a first subcarrier spacing (SCS), and the first SCS is used to determine a length of the first time window: a number of control resource pool(s) comprised by at least one of the K1 scheduling cells is used to determine a cell group to which the target cell belongs from the first cell group and the second cell group: a first quantitative value is a number of serving cells comprised in the first cell group being associated with at least one of the M1 control channel candidates, and a second quantitative value is a number of serving cells comprised in the second cell group being associated with at least one of the M1 control channel candidates: the first quantitative value, the second quantitative value and the target factor are used together for determining a first threshold and a second threshold: the target factor is a positive number: M1 is no greater than the first threshold, and M2 is no greater than the second threshold: both the first threshold and the second threshold are positive integers greater than 1.

In one embodiment, a technical effect of the above method lies in that for a scheduled cell that can be scheduled by multiple scheduling cells. Control Resource Set (CORESET) pool configurations on multiple scheduling cells associated with the scheduled cell are used to determine a cell group to which the scheduled cell belongs, which in turn determines a coefficient multiplied when calculating the maximum PDCCH candidate number and the maximum CCE number, thus optimizing the distribution of blind detections.

In one embodiment, another technical effect of the above method lies in that for a scheduled cell configured with multiple scheduling cells, in which the multi-TRP scenarios are existing, the number of blind detections will be increased so as to ensure the receiving performance of PDCCH and to achieve diversity gains brought by multiple TRPs.

In one embodiment, a third technical effect of the above method lies in that grouping serving cells according to scheduling cells respectively for the serving cells guarantees the conformity in design, thus ensuring good forward compatibility, leaving ample room for further functionality enhancement in the future.

According to one aspect of the present disclosure, the K1 scheduling cells respectively correspond to K1 identities, and a scheduling cell corresponding to a smallest one of the K1 identities is a first scheduling cell of the K1 scheduling cells: when a number of control resource pools provided in the first scheduling cell is equal to 1 or there is no control resource pool being provided in the first scheduling cell, the target cell belongs to the first cell group: when the number of control resource pools provided in the first scheduling cell is greater than 1, the target cell belongs to the second cell group.

In one embodiment, a technical effect of the above method lies in that a scheduling cell with a minimum ID among the K1 scheduling cells is deemed as a most robust one, so a scheduling signaling of the target cell is preferentially placed upon the scheduling cell with the minimum ID, and consequently, the determination of a cell group is also dependent on the judgment by the scheduling cell with the minimum ID.

According to one aspect of the present disclosure, when the number of control resource pools provided in any of the K1 scheduling cells is less than 2, the target cell belongs to the first cell group: when among the K1 scheduling cells there is a scheduling cell in which the number of control resource pools provided is greater than 1, the target cell belongs to the second cell group.

In one embodiment, a technical effect of the above method lies in that as long as there is a scheduling cell among the K1 scheduling cells that is configured with multiple CORESET pools, the target cell is deemed as a part of the second cell group: so that adequate PDCCH candidates and Non-overlapped CCEs can be available to support the diversity gains between multiple TRPs.

According to one aspect of the present disclosure, the K1 scheduling cells respectively correspond to K1 first coefficients, and each of the K1 first coefficients is a positive integer, and a quotient of a sum of the K1 first coefficients and K1 is equal to a target value: when the target value is less than a target threshold. the target cell belongs to the first cell group: when the target value is no less than the target threshold, the target cell belongs to the second cell group: the target threshold is a positive real number.

In one embodiment, a technical effect of the above method lies in that an average value is gained by combining the total number of CORESET pools in the K1 scheduling cells and K1, thereby avoiding the burden of excessive blind detections.

According to one aspect of the present disclosure, a first serving cell is a serving cell comprised in the scheduled cell set, and the first serving cell is only scheduled by one scheduling cell: when the number of control resource pool(s) provided in the scheduling cell for the first serving cell is equal to 1 or there is no control resource pool being provided in the scheduling cell for the first serving cell, the first serving cell belongs to the first cell group: when the number of control resource pools provided in the scheduling cell for the first serving cell is greater than 1, the first serving cell belongs to the second cell group.

In one embodiment, a technical effect of the above method lies in that for a scheduled cell that only supports one scheduling cell, when the scheduling cell comprises multiple CORESET pools, the number of corresponding blind detections and Non-overlapped CCEs will be respectively increased to ensure the PDCCH performance.

In one embodiment, another technical effect of the above method lies in the possession of fair forward compatibility.

According to one aspect of the present disclosure, comprising:

transmitting a second information block; and receiving a third information block:

herein, the second information block is used to indicate a first candidate factor from a first candidate factor set, the first candidate factor set comprising more than one candidate factor, the first candidate factor is a candidate factor comprised by the first candidate factor set, and any candidate factor comprised by the first candidate factor set is greater than 0; the third information block is used to determine whether the target factor is equal to the first candidate factor: when the target factor is unequal to the first candidate factor, the target factor is equal to a pre-defined value.

In one embodiment, a technical feature of the above method lies in that the second information block comprises an indication of an R value, so as to represent the first node's capability of PDCCH blind detection: the third information block comprises a BDFactorR indicated by a base station, so as to indicate an R value actually used by the first node in performing dynamic sharing of blind detections.

According to one aspect of the present disclosure, comprising:

transmitting a fourth information block:

herein, the first candidate factor set is one of G candidate factor sets, G being a positive integer greater than 1: any of the G candidate factor sets comprises more than one candidate factor: the fourth information block is used to indicate the first candidate factor set out of the G candidate factor sets.

In one embodiment, a technical feature of the above method lies in that the G candidate factor sets respectively correspond to G types of terminal capabilities, such as version numbers, or whether to support CA, which in turn will influence the R value reported by the first node.

According to one aspect of the present disclosure, the first quantitative value, the second quantitative value and the target factor are used together for determining a first parameter: the first parameter is used with a second parameter for determining the first threshold and the second threshold: the second parameter is a positive integer.

According to one aspect of the present disclosure, the first parameter is a ratio of a target sum value to a characteristic sum value, the target sum value being no greater than the characteristic sum value: the characteristic sum value is linear with a number of serving cells comprised in the first cell group being associated with at least one control channel candidate, and the characteristic sum value is linear with a product of a number of serving cells comprised in the second cell group being associated with at least one control channel candidate and the target factor: the target sum value is linear with the first quantitative value, and the target sum value is linear with a product of the second quantitative value and the target factor.

In one embodiment, a technical feature of the above method lies in that the target sum value is obtained by combined calculation of a total number of serving cells in the first cell group that employ the first SCS as an SCS of scheduling cells and a total number of serving cells in the second cell group that employ the first SCS as an SCS of scheduling cells.

In one embodiment, a technical feature of the above method lies in that the characteristic sum value is obtained by combined calculation of a total number of serving cells in the first cell group that employ multiple SCSs as an SCS of scheduling cells and a total number of serving cells in the second cell group that employ multiple SCSs as an SCS of scheduling cells.

According to one aspect of the present disclosure, comprising:

transmitting a fifth information block:

herein, the fifth information block is used to indicate the second parameter.

In one embodiment, a technical feature of the above method lies in that the fifth information block indicates the first node's CA capability.

According to one aspect of the present disclosure, the second parameter is linear with a number of serving cells comprised in the first cell group, and the second parameter is linear with a product of a number of serving cells comprised in the second cell group and the target factor.

According to one aspect of the present disclosure, the first SCS is one of X candidate SCSs, X being a positive integer greater than 1: the X candidate SCSs respectively correspond to X first-type candidate parameters, any of the X first-type candidate parameters being a positive integer, the X candidate SCSs respectively correspond to X second-type candidate parameters, any of the X second-type candidate parameters being a positive integer: a third parameter is one of the X first-type candidate parameters, and the third parameter is used to determine the first threshold: a fourth parameter is one of the X second-type candidate parameters, and the fourth parameter is used to determine the second threshold: the first SCS is used to determine the third parameter out of the X first-type candidate parameters, and the first SCS is used to determine the fourth parameter out of the X second-type candidate parameters.

According to one aspect of the present disclosure, comprising:

receiving a sixth information block:

herein, the sixth information block is used to determine at least one of the M1 control channel candidates, the M2 control channel elements, or the number of control resource pools configured by any of the K1 scheduling cells.

According to one aspect of the present disclosure, a first control channel candidate is one of the M1 control channel candidates, and a second control channel candidate is one of the M1 control channel candidates other than the first control channel candidate: a control channel element occupied by the first control channel candidate is different from that occupied by the second control channel candidate, or scrambling employed by the first control channel candidate is different from that employed by the second control channel candidate, or a payload size of a downlink control information (DCI) format corresponding to the first control channel candidate is different from that of a DCI format corresponding to the second control channel candidate.

According to one aspect of the present disclosure, a first control channel element is one of the M2 control channel elements, and a second control channel element is one of the M2 control channel elements other than the first control channel element: the first control channel element and the second control channel element respectively belong to different control resource sets, or a control channel candidate occupying the first control channel element and a control channel candidate occupying the second control channel element respectively start with different symbols.

According to one aspect of the present disclosure, a scheduling cell set comprises scheduling cells for serving cells comprised by the scheduled cell set, and the scheduling cell set comprises a positive integer number of serving cell(s): the M1 control channel candidates are monitored in (a) sub-band(s) comprised by the first sub-band set, the first sub-band set comprising a positive integer number of sub-band(s): a serving cell to which any sub-band comprised by the first sub-band set belongs in frequency domain belongs to the scheduling cell set: an SCS of subcarriers comprised in any sub-band comprised by the first sub-band set is equal to the first SCS.

According to one aspect of the present disclosure, comprising:

receiving a first signaling in the M1 control channel candidates;

herein, the first signaling is a physical layer.

The present disclosure provides a method in a second node for wireless communications, comprising:

transmitting a first information block; and determining M1 control channel candidates in a first time window, the M1 control channel candidates occupying M2 control channel elements, M1 being a positive integer greater than 1, and M2 being a positive integer greater than 1:

herein, the first information block is used to indicate a scheduled cell set, and serving cells comprised by the scheduled cell set are divided into a first cell group and a second cell group: the first cell group is different from the second cell group: the scheduled cell set comprises a target cell, and any of K1 scheduling cells is a scheduling cell for the target cell, K1 being a positive integer greater than 1: one of the M1 control channel candidates employs a first subcarrier spacing (SCS), and the first SCS is used to determine a length of the first time window: a number of control resource pool(s) comprised by at least one of the K1 scheduling cells is used to determine a cell group to which the target cell belongs from the first cell group and the second cell group: a first quantitative value is a number of serving cells comprised in the first cell group being associated with at least one of the M1 control channel candidates, and a second quantitative value is a number of serving cells comprised in the second cell group being associated with at least one of the M1 control channel candidates: the first quantitative value, the second quantitative value and the target factor are used together for determining a first threshold and a second threshold: the target factor is a positive number: M1 is no greater than the first threshold, and M2 is no greater than the second threshold: both the first threshold and the second threshold are positive integers greater than 1.

According to one aspect of the present disclosure, the K1 scheduling cells respectively correspond to K1 identities, and a scheduling cell corresponding to a smallest one of the K1 identities is a first scheduling cell of the K1 scheduling cells: when a number of control resource pools provided in the first scheduling cell is equal to 1 or there is no control resource pool being provided in the first scheduling cell, the target cell belongs to the first cell group: when the number of control resource pools provided in the first scheduling cell is greater than 1, the target cell belongs to the second cell group.

According to one aspect of the present disclosure, when the number of control resource pools provided in any of the K1 scheduling cells is less than 2, the target cell belongs to the first cell group: when among the K1 scheduling cells there is a scheduling cell in which the number of control resource pools provided is greater than 1, the target cell belongs to the second cell group.

According to one aspect of the present disclosure, the K1 scheduling cells respectively correspond to K1 first coefficients, and each of the K1 first coefficients is a positive integer, and a quotient of a sum of the K1 first coefficients and K1 is equal to a target value: when the target value is less than a target threshold, the target cell belongs to the first cell group: when the target value is no less than the target threshold, the target cell belongs to the second cell group: the target threshold is a positive real number.

According to one aspect of the present disclosure, a first serving cell is a serving cell comprised in the scheduled cell set, and the first serving cell is only scheduled by one scheduling cell: when the number of control resource pool(s) provided in the scheduling cell for the first serving cell is equal to 1 or there is no control resource pool being provided in the scheduling cell for the first serving cell, the first serving cell belongs to the first cell group: when the number of control resource pools provided in the scheduling cell for the first serving cell is greater than 1, the first serving cell belongs to the second cell group.

According to one aspect of the present disclosure, comprising:
receiving a second information block; and
transmitting a third information block:
herein, the second information block is used to indicate a first candidate factor from a first candidate factor set, the first candidate factor set comprising more than one candidate factor, the first candidate factor is a candidate factor comprised by the first candidate factor set, and any candidate factor comprised by the first candidate factor set is greater than ( ) the third information block is used to determine whether the target factor is equal to the first candidate factor: when the target factor is unequal to the first candidate factor, the target factor is equal to a pre-defined value.

According to one aspect of the present disclosure, comprising:
receiving a fourth information block:
herein, the first candidate factor set is one of G candidate factor sets, G being a positive integer greater than 1: any of the G candidate factor sets comprises more than one candidate factor; the fourth information block is used to indicate the first candidate factor set out of the G candidate factor sets.

According to one aspect of the present disclosure, the first quantitative value, the second quantitative value and the target factor are used together for determining a first parameter: the first parameter is used with a second parameter for determining the first threshold and the second threshold: the second parameter is a positive integer.

According to one aspect of the present disclosure, the first parameter is a ratio of a target sum value to a characteristic sum value, the target sum value being no greater than the characteristic sum value: the characteristic sum value is linear with a number of serving cells comprised in the first cell group being associated with at least one control channel candidate, and the characteristic sum value is linear with a product of a number of serving cells comprised in the second cell group being associated with at least one control channel candidate and the target factor: the target sum value is linear with the first quantitative value, and the target sum value is linear with a product of the second quantitative value and the target factor.

According to one aspect of the present disclosure, comprising:
receiving a fifth information block:
herein, the fifth information block is used to indicate the second parameter.

According to one aspect of the present disclosure, the second parameter is linear with a number of serving cells comprised in the first cell group, and the second parameter is linear with a product of a number of serving cells comprised in the second cell group and the target factor.

According to one aspect of the present disclosure, the first SCS is one of X candidate SCSs, X being a positive integer greater than 1: the X candidate SCSs respectively correspond to X first-type candidate parameters, any of the X first-type candidate parameters being a positive integer, the X candidate SCSs respectively correspond to X second-type candidate parameters, any of the X second-type candidate parameters being a positive integer: a third parameter is one of the X first-type candidate parameters, and the third parameter is used to determine the first threshold: a fourth parameter is one of the X second-type candidate parameters, and the fourth parameter is used to determine the second threshold: the first SCS is used to determine the third parameter out of the X first-type candidate parameters, and the first SCS is used to determine the fourth parameter out of the X second-type candidate parameters.

According to one aspect of the present disclosure, comprising:

transmitting a sixth information block:

herein, the sixth information block is used to determine at least one of the M1 control channel candidates, the M2 control channel elements, or the number of control resource pools configured by any of the K1 scheduling cells.

According to one aspect of the present disclosure, a first control channel candidate is one of the M1 control channel candidates, and a second control channel candidate is one of the M1 control channel candidates other than the first control channel candidate: a control channel element occupied by the first control channel candidate is different from that occupied by the second control channel candidate, or scrambling employed by the first control channel candidate is different from that employed by the second control channel candidate, or a payload size of a downlink control information (DCI) format corresponding to the first control channel candidate is different from that of a DCI format corresponding to the second control channel candidate.

According to one aspect of the present disclosure, a first control channel element is one of the M2 control channel elements, and a second control channel element is one of the M2 control channel elements other than the first control channel element: the first control channel element and the second control channel element respectively belong to different control resource sets, or a control channel candidate occupying the first control channel element and a control channel candidate occupying the second control channel element respectively start with different symbols.

According to one aspect of the present disclosure, a scheduling cell set comprises scheduling cells for serving cells comprised by the scheduled cell set, and the scheduling cell set comprises a positive integer number of serving cell(s): the M1 control channel candidates are monitored in (a) sub-band(s) comprised by the first sub-band set, the first sub-band set comprising a positive integer number of sub-band(s): a serving cell to which any sub-band comprised by the first sub-band set belongs in frequency domain belongs to the scheduling cell set: an SCS of subcarriers comprised in any sub-band comprised by the first sub-band set is equal to the first SCS.

According to one aspect of the present disclosure, comprising:

transmitting a first signaling in the M1 control channel candidates:

herein, the first signaling is a physical layer.

The present disclosure provides a first node for wireless communications, comprising:

a first transceiver, which receives a first information block; and a first receiver, which monitors M1 control channel candidates in a first time window, the M1 control channel candidates occupying M2 control channel elements, M1 being a positive integer greater than 1, and M2 being a positive integer greater than 1:

herein, the first information block is used to indicate a scheduled cell set, and serving cells comprised by the scheduled cell set are divided into a first cell group and a second cell group: the first cell group is different from the second cell group: the scheduled cell set comprises a target cell, and any of K1 scheduling cells is a scheduling cell for the target cell, K1 being a positive integer greater than 1: one of the M1 control channel candidates employs a first subcarrier spacing (SCS), and the first SCS is used to determine a length of the first time window: a number of control resource pool(s) comprised by at least one of the K1 scheduling cells is used to determine a cell group to which the target cell belongs from the first cell group and the second cell group: a first quantitative value is a number of serving cells comprised in the first cell group being associated with at least one of the M1 control channel candidates, and a second quantitative value is a number of serving cells comprised in the second cell group being associated with at least one of the M1 control channel candidates: the first quantitative value, the second quantitative value and the target factor are used together for determining a first threshold and a second threshold: the target factor is a positive number: M1 is no greater than the first threshold, and M2 is no greater than the second threshold: both the first threshold and the second threshold are positive integers greater than 1.

The present disclosure provides a second node for wireless communications, comprising:

a second transceiver, which transmits a first information block; and a first transmitter, which determines M1 control channel candidates in a first time window, the M1 control channel candidates occupying M2 control channel elements, M1 being a positive integer greater than 1, and M2 being a positive integer greater than 1:

herein, the first information block is used to indicate a scheduled cell set, and serving cells comprised by the scheduled cell set are divided into a first cell group and a second cell group: the first cell group is different from the second cell group: the scheduled cell set comprises a target cell, and any of K1 scheduling cells is a scheduling cell for the target cell, K1 being a positive integer greater than 1: one of the M1 control channel candidates employs a first subcarrier spacing (SCS), and the first SCS is used to determine a length of the first time window: a number of control resource pool(s) comprised by at least one of the K1 scheduling cells is used to determine a cell group to which the target cell belongs from the first cell group and the second cell group: a first quantitative value is a number of serving cells comprised in the first cell group being associated with at least one of the M1 control channel candidates, and a second quantitative value is a number of serving cells comprised in the second cell group being associated with at least one of the M1 control channel candidates: the first quantitative value, the second quantitative value and the target factor are used together for determining a first threshold and a second threshold: the target factor is a positive number: M1 is no greater than the first threshold, and M2 is no greater than the second threshold: both the first threshold and the second threshold are positive integers greater than 1.

In one embodiment, the present disclosure has the following advantages over the prior art:

For a scheduled cell capable of being scheduled by multiple scheduling cells, a cell group to which a scheduled cell belongs is determined based on CORESET pool configurations on multiple scheduling cells associated with the scheduled cell, which in turn determines a coefficient multiplied when calculating the maximum PDCCH candidate number and the maximum Non-overlapped CCE number, thus optimizing blind detection distribution: in addition, for a scheduled cell configured with multiple scheduling cells, where the scenario of multiple TRPs exist, there will be an increase in the number of blind detections to make sure the PDCCH receiving performance is well, and diversity gains from multi-TRP scenario can be achieved.

By dividing all serving cells into just two cell groups, namely, a first cell group and a second cell group, without adding extra cell groups, the dynamic blind detection capability sharing can be implemented more easily and with better forward compatibility and backward compatibility.

The present disclosure provides a method in a first node for wireless communications, comprising:

receiving first information, the first information being used to indicate a first search space set and a second search space set, the first search space set comprising a positive integer number of control signaling candidate(s), and the second search space set comprising a positive integer number of control signaling candidate(s), a first Search Space Set ID and a second Search Space Set ID being used to respectively identify the first search space set and the second search space set:

monitoring a target control signaling candidate set in a first time window, the target control signaling candidate set comprising a positive integer number of control signaling candidate(s):

herein, time-frequency resources occupied by control signaling candidate(s) comprised in the first search space set belong to a first resource pool, while time-frequency resources occupied by control signaling candidate(s) comprised in the second search space set belong to a second resource pool: the first resource pool and the second resource pool are respectively associated with a first index and a second index, the first index and the second index being non-negative integers, respectively: any control signaling candidate comprised by the second search space set belongs to the target control signaling candidate set: the first index and the second index are jointly used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, a technical feature of the above method lies in that when multiple scheduling cells schedule a scheduled cell, the principle of search space set dropping shall take into account the practical condition of a cell scheduled by a search space.

In one embodiment, another technical feature of the above method lies in that when multiple search space sets are associated with multiple TRPs, the principle of search space set dropping shall take into account the practical condition of an associated TRP.

According to one aspect of the present disclosure, the first index is a serving cell ID of a serving cell where frequency-domain resources occupied by the first resource pool are comprised, while the second index is a serving cell ID of a serving cell where frequency-domain resources occupied by the second resource pool are comprised, a relative magnitude of the first index and the second index is used to determine whether a control signaling candidate comprised by the first search space set belongs to the target control signaling candidate set.

In one embodiment, a technical feature of the above method lies in that a connection is created between a priority of a search space set and a serving cell ID of a serving cell where the search space set is located: the smaller the serving cell ID of the serving cell the better channel conditions of a corresponding serving cell are deemed, and the more unlikely it is that a corresponding search space set is to be dropped: the larger the serving cell ID of the serving cell is, the poorer channel conditions of the corresponding serving cell are deemed, and the more likely it is that the corresponding search space set is to be dropped.

According to one aspect of the present disclosure, the first index is a serving cell ID of a serving cell capable of being scheduled by a control signaling candidate in the first search space set, while the second index is a serving cell ID of a serving cell capable of being scheduled by a control signaling candidate in the second search space set, a relative magnitude of the first index and the second index is used to determine whether a control signaling candidate comprised by the first search space set belongs to the target control signaling candidate set.

In one embodiment, a technical feature of the above method lies in that a connection is created between a priority of a search space set and a serving cell ID of a serving cell scheduled by the search space set: the smaller the serving cell ID of the scheduled cell the more important a corresponding search space set is deemed, and the more unlikely it is that a corresponding search space set is to be dropped: the larger the serving cell ID of the scheduled cell the less important the corresponding search space set is deemed, and the more likely it is that the corresponding search space set is to be dropped.

According to one aspect of the present disclosure, the first resource pool is associated with a first control resource set pool, while the second resource pool is associated with a second control resource set pool; an index of the first control resource set pool is the first index, and an index of the second control resource set pool is the second index: a relative magnitude of the first index and the second index is used to determine whether a control signaling candidate comprised by the first search space set belongs to the target control signaling candidate set.

In one embodiment, a technical feature of the above method lies in that when the first search space set and the second search space set are respectively associated with two TRPs, and the first index and the second index are respectively employed to identify the two TRPs, a TRP employing the smaller index is seen as a primary TRP, and the other TRP employing the larger index is seen as a secondary TRP; and a search space set associated with the primary TRP will be of more importance, making it less likely to be dropped in blind detection.

According to one aspect of the present disclosure, the first index is a serving cell ID corresponding to a secondary cell, while the second index is a serving cell ID corresponding to a primary cell.

In one embodiment, a technical effect of the above method lies in that when the first search space set is located in a secondary cell, and the second search space set is located in a primary cell, the second search space set is of higher priority in blind detection, and therefore is less likely to be dropped.

According to one aspect of the present disclosure, a serving cell scheduled by the first search space set is a secondary cell, while a serving cell scheduled by the second search space set is a primary cell.

In one embodiment, a technical effect of the above method lies in that when the first search space set schedules a secondary cell, and the second search space set schedules a primary cell, the second search space set is of higher priority in blind detection, and therefore is less likely to be dropped.

According to one aspect of the present disclosure, comprising:

receiving target information:

herein, the target information is used to determine a target search space set group, and search space sets comprised by the target search space set group make up a common search space, the target search space set group comprising P1 control channel candidate(s), and the P1 control channel candidate(s) occupying Q1 CCE(s): any of the P1 control channel candidate(s) is one of a positive integer number of control signaling candidate(s) comprised by the target control signaling candidate set.

According to one aspect of the present disclosure, the first search space set comprises M1 control channel candidates, and a number of Non-overlapped CCEs in the first search space set is equal to N1, M1 being a positive integer greater than 1. N1 being a positive integer greater than 1: the second search space set comprises M2 control channel candidates, and a number of Non-overlapped CCEs in the second search space set is equal to N2. M2 being a positive integer greater than 1, N2 being a positive integer greater than 1: a sum of the P1, the M1 and the M2 is greater than a first threshold, and a sum of the P1 and the M2 is no greater than the first threshold: a sum of the Q1, the N1 and the N2 is greater than a second threshold, and a sum of the Q1 and the N2 is no greater than the second threshold: an SCS of subcarriers occupied by a control signaling candidate comprised in the target control signaling candidate set in frequency domain is a first SCS: the first threshold is a maximum number of control channel candidates monitored by the first node for a serving cell in a DL BWP under the first SCS and in the first time window: the second threshold is a maximum number of Non-overlapped CCEs monitored by the first node for a serving cell in a DL BWP under the first SCS and in the first time window.

In one embodiment, a technical effect of the above method lies in that both the priority of a blind detection on the first search space set and the priority of a blind detection on the second search space set are smaller than a CSS, only after fulfilling all PDCCH candidates and Non-overlapped CCEs configured will the first node perform blind detections in the first search space set and the second search space set.

According to one aspect of the present disclosure, comprising:

receiving a first signaling; and receiving a first signal in a target cell:

herein, the first signaling occupies a control signaling candidate in the target control signaling candidate set, and the first signaling is used to schedule the first signal: the first signaling indicates the target cell: frequency-domain resources occupied by the first search space set belong to a first serving cell; frequency-domain resources occupied by the second search space set belong to a second serving cell, and both the first serving cell and the second serving cell are scheduling cells of the target cell; the first serving cell is different from the second serving cell.

According to one aspect of the present disclosure, comprising:

receiving a first signaling; and transmitting a first signal in a target cell;

herein, the first signaling occupies a control signaling candidate in the target control signaling candidate set, and the first signaling is used to schedule the first signal: the first signaling indicates the target cell: frequency-domain resources occupied by the first search space set belong to a first serving cell; frequency-domain resources occupied by the second search space set belong to a second serving cell, and both the first serving cell and the second serving cell are scheduling cells of the target cell; the first serving cell is different from the second serving cell.

In one embodiment, a technical effect of the above method lies in that the above scheme illustrates a scenario where the target cell can be scheduled by the first serving cell and the second serving cell, which means that the scheme is applicable to scenarios with a serving cell capable of being scheduled by multiple scheduling cells.

The present disclosure provides a method in a second node for wireless communications, comprising:

transmitting first information, the first information being used to indicate a first search space set and a second search space set, the first search space set comprising a positive integer number of control signaling candidate(s), and the second search space set comprising a positive integer number of control signaling candidate(s), a first Search Space Set ID and a second Search Space Set ID being used to respectively identify the first search space set and the second search space set:

determining a target control signaling candidate set in a first time window, the target control signaling candidate set comprising a positive integer number of control signaling candidate(s);

herein, time-frequency resources occupied by control signaling candidate(s) comprised in the first search space set belong to a first resource pool, while time-frequency resources occupied by control signaling candidate(s) comprised in the second search space set belong to a second resource pool: the first resource pool and the second resource pool are respectively associated with a first index and a second index, the first index and the second index being non-negative integers, respectively: any control signaling candidate comprised by the second search space set belongs to the target control signaling candidate set: the first index and the second index are jointly used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

According to one aspect of the present disclosure, the first index is a serving cell ID of a serving cell where frequency-domain resources occupied by the first resource pool are comprised, while the second index is a serving cell ID of a serving cell where frequency-domain resources occupied by the second resource pool are comprised, a relative magnitude of the first index and the second index is used to determine whether a control signaling candidate comprised by the first search space set belongs to the target control signaling candidate set.

According to one aspect of the present disclosure, the first index is a serving cell ID of a serving cell capable of being scheduled by a control signaling candidate in the first search space set, while the second index is a serving cell ID of a serving cell capable of being scheduled by a control signaling candidate in the second search space set, a relative magnitude of the first index and the second index is used to determine whether a control signaling candidate comprised by the first search space set belongs to the target control signaling candidate set.

According to one aspect of the present disclosure, the first resource pool is associated with a first control resource set pool, while the second resource pool is associated with a second control resource set pool; an index of the first control resource set pool is the first index, and an index of the second control resource set pool is the second index: a relative magnitude of the first index and the second index is used to determine whether a control signaling candidate comprised by the first search space set belongs to the target control signaling candidate set.

According to one aspect of the present disclosure, the first index is a serving cell ID corresponding to a secondary cell, while the second index is a serving cell ID corresponding to a primary cell.

According to one aspect of the present disclosure, a serving cell scheduled by the first search space set is a secondary cell, while a serving cell scheduled by the second search space set is a primary cell. According to one aspect of the present disclosure, comprising:

transmitting target information:

herein, the target information is used to determine a target search space set group, and search space sets comprised by the target search space set group make up a common search space, the target search space set group comprising P1 control channel candidate(s), and the P1 control channel candidate(s) occupying Q1 CCE(s): any of the P1 control channel candidate(s) is one of a positive integer number of control signaling candidate(s) comprised by the target control signaling candidate set.

According to one aspect of the present disclosure, the first search space set comprises M1 control channel candidates, and a number of Non-overlapped CCEs in the first search space set is equal to N1, M1 being a positive integer greater than 1. N1 being a positive integer greater than 1: the second search space set comprises M2 control channel candidates, and a number of Non-overlapped CCEs in the second search space set is equal to N2. M2 being a positive integer greater than 1, N2 being a positive integer greater than 1: a sum of the P1, the M1 and the M2 is greater than a first threshold, and a sum of the P1 and the M2 is no greater than the first threshold: a sum of the Q1, the N1 and the N2 is greater than a second threshold, and a sum of the Q1 and the N2 is no greater than the second threshold: an SCS of subcarriers occupied by a control signaling candidate comprised in the target control signaling candidate set in frequency domain is a first SCS: a receiver of the first information includes a first node: the first threshold is a maximum number of control channel candidates monitored by the first node for a serving cell in a DL BWP under the first SCS and in the first time window: the second threshold is a maximum number of Non-overlapped CCEs monitored by the first node for a serving cell in a DL BWP under the first SCS and in the first time window. According to one aspect of the present disclosure, comprising:

transmitting a first signaling; and
transmitting a first signal in a target cell:

herein, the first signaling occupies a control signaling candidate in the target control signaling candidate set, and the first signaling is used to schedule the first signal: the first signaling indicates the target cell: frequency-domain resources occupied by the first search space set belong to a first serving cell; frequency-domain resources occupied by the second search space set belong to a second serving cell, and both the first serving cell and the second serving cell are scheduling cells of the target cell: the first serving cell is different from the second serving cell.

According to one aspect of the present disclosure, comprising:

transmitting a first signaling; and
receiving a first signal in a target cell;

herein, the first signaling occupies a control signaling candidate in the target control signaling candidate set, and the first signaling is used to schedule the first signal: the first signaling indicates the target cell: frequency-domain resources occupied by the first search space set belong to a first serving cell; frequency-domain resources occupied by the second search space set belong to a second serving cell, and both the first serving cell and the second serving cell are scheduling cells of the target cell: the first serving cell is different from the second serving cell.

The present disclosure provides a first node for wireless communications, comprising:

a first receiver, which receives first information, the first information being used to indicate a first search space set and a second search space set, the first search space set comprising a positive integer number of control signaling candidate(s), and the second search space set comprising a positive integer number of control signaling candidate(s), a first Search Space Set ID and a second Search Space Set ID being used to respectively identify the first search space set and the second search space set:

a first transceiver, which monitors a target control signaling candidate set in a first time window. the target control signaling candidate set comprising a positive integer number of control signaling candidate(s);

herein, time-frequency resources occupied by control signaling candidate(s) comprised in the first search space set belong to a first resource pool, while time-frequency resources occupied by control signaling candidate(s) comprised in the second search space set belong to a second resource pool: the first resource pool and the second resource pool are respectively associated with a first index and a second index, the first index and the second index being non-negative integers, respectively: any control signaling candidate comprised by the second search space set belongs to the target control signaling candidate set: the first index and the second index are jointly used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

The present disclosure provides a second node for wireless communications, comprising:

a first transmitter, which transmits first information, the first information being used to indicate a first search space set and a second search space set, the first search space set comprising a positive integer number of control signaling candidate(s), and the second search space set comprising a positive integer number of control signaling candidate(s), a first Search Space Set ID and a second Search Space Set ID being used to respectively identify the first search space set and the second search space set:

a second transceiver, which determines a target control signaling candidate set in a first time window, the target control signaling candidate set comprising a positive integer number of control signaling candidate(s):

herein, time-frequency resources occupied by control signaling candidate(s) comprised in the first search space set belong to a first resource pool, while time-frequency resources occupied by control signaling candidate(s) comprised in the second search space set belong to a second resource pool: the first resource pool and the second resource pool are respectively associated with a first index and a second index, the first index and the second index being non-negative integers, respectively: any control signaling candidate comprised by the second search space set belongs to the target control signaling candidate set: the first index and the second index are jointly used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, the present disclosure has the following advantages over the prior art:

By associating the priority of a search space set with a serving cell ID of a serving cell scheduled by the search space set: the smaller the serving cell ID, the better the corresponding serving cell's channel quality, and the lower possibility for the corresponding search space set to be dropped: the larger the serving cell ID the poorer the corresponding serving cell's channel quality, and the higher possibility for the corresponding search space set to be dropped.

By associating the priority of a search space set with a serving cell ID of a serving cell scheduled by the search space set: the smaller the serving cell ID of the scheduled cell, the more importance of the corresponding search space set, and the lower possibility for the corresponding search space set to be dropped; the larger the serving cell ID of the scheduled cell, the less importance of the corresponding search space set, and the higher possibility for the corresponding search space set to be dropped.

When the first search space set and the second search space set are respectively associated with two TRPs, and the first index and the second index are respectively employed to identify these two TRPs, the TRP employing a smaller index is seen as a primary TRP, and the TRP employing the larger index is seen as a secondary TRP: so, the search space set associated with the primary TRP is more important, and is less unlikely to be dropped.

The present disclosure provides a method in a first node for wireless communications, comprising:

receiving first information, the first information being used to indicate a first search space set; and monitoring a target control signaling candidate set in a first time window, the target control signaling candidate set comprising a positive integer number of control signaling candidate(s):

herein, the first search space set comprises a positive integer number of control signaling candidate(s): frequency-domain resources occupied by any control signaling candidate comprised by the first search space set belong to a first serving cell, and a first scheduled cell set comprises a scheduled cell of the first serving cell: a target cell is a serving cell other than the first serving cell, whether the first scheduled cell set comprises the target cell is used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, a technical feature of the above method lies in that the method of determining a dropping order of multiple search spaces according to respective priorities is only implemented in a scheduling cell capable of scheduling the target cell: that is, only when one or more scheduling cells are capable of scheduling the target cell can blind detections be shared dynamically and dropped based on some principle between one or more scheduling cells, thus ensuring performance.

According to one aspect of the present disclosure, comprising:

receiving second information:

herein, the second information is used to determine a scheduling cell of the target cell: when the scheduling cell of the target cell includes the first serving cell, the target cell belongs to the first scheduled cell set: when the scheduling cell of the target cell does not include the first serving cell, the target cell does not belong to the first scheduled cell set.

In one embodiment, a technical feature of the above method lies in that the design of search space dropping principle in the present disclosure is applicable to blind detections scheduling the first scheduled cell set.

According to one aspect of the present disclosure, the first serving cell, the target cell and any serving cell comprised in the first scheduled cell set all belong to a first cell group, and the target cell is a primary cell in the first cell group.

In one embodiment, a technical feature of the above method lies in that the design of search space dropping principle in the present disclosure is applied in the first cell group.

According to one aspect of the present disclosure, when the first scheduled cell set does not comprise the target cell, each control signaling candidate comprised by the first search space set belongs to the target control signaling candidate set.

In one embodiment, a technical feature of the above method lies in that when the target cell is a primary cell, in order to ensure scheduling of the target cell, configurations of a corresponding search space set have to be larger than the first node's blind detection capability, hence the issue of dropping arising from excessive search space set configurations: as for those search space sets only used for scheduling a secondary cell, a base station is able to ensure that search space sets configured do not go beyond the first node's processing capability, hence no need for designing a dropping principle.

According to one aspect of the present disclosure, when the first scheduled cell set comprises the target cell: the first information is used for indicating a second search space set, the second search space set comprising a positive integer number of control signaling candidate(s), frequency-domain resources occupied by the second search space set belong to a second serving cell, and any serving cell in a second scheduled cell set can be scheduled by the second serving cell, the second scheduled cell set comprising the target cell: an SCS of subcarriers occupied by a control signaling candidate in the first search space set in frequency domain is a first SCS, and an SCS of subcarriers occupied by a control signaling candidate in the second search space set in frequency domain is a second SCS: the first SCS and the second SCS are jointly used to determine whether a control signaling candidate comprised by the first search space set belongs to the target control signaling candidate set.

In one embodiment, a technical feature of the above method lies in that for multiple search space sets capable of scheduling a primary cell, for example, the first search space set and the second search space set, whether the search space sets can dynamically share blind detections shall be determined according to whether the first search space set and the second search space set employ a same SCS.

According to one aspect of the present disclosure, the first SCS is different from the second SCS, whether a control signaling candidate comprised by the first search space set belongs to the target control signaling candidate set is unrelated to the second search space set.

In one embodiment, a technical feature of the above method lies in that when the first search space set and the second search space set employ different SCSs, the two search space sets won't dynamically share blind detections.

According to one aspect of the present disclosure, the first SCS is the same as the second SCS, a first search space set ID and a second search space set ID are respectively used to identify the first search space set and the second search space set, of which the first search space set is associated with a first index, while the second search space set is associated with a second index, the first index and the second index being non-negative integers: the first index and the second index are jointly used to determine whether a control signaling candidate comprised by the first search space set belongs to the target control signaling candidate set.

In one embodiment, a technical feature of the above method lies in that when the first search space set and the second search space set employ a same SCS, the priorities of the first search space set and the second search space set in dynamic sharing of blind detections are determined by the first index and the second index, and PDCCH candidates and Non-overlapped CCEs in a high-priority search space set will be preserved in preference.

According to one aspect of the present disclosure, a first threshold is a maximum number of control channel candidates monitored by the first node for a serving cell in a DL BWP under the first SCS and in the first time window; and a second threshold is a maximum number of Non-overlapped CCEs monitored by the first node for a serving cell in a DL BWP under the first SCS and in the first time window: a number of control channel candidates monitored by the first node in a DL BWP in the first serving cell is no greater than the first threshold, and a number of Non-overlapped CCEs monitored by the first node in a DL BWP in the first serving cell is no greater than the second threshold: a third threshold is a maximum number of control channel candidates monitored by the first node for a serving cell in a DL BWP under the second SCS and in a second time window; and a fourth threshold is a maximum number of Non-overlapped CCEs monitored by the first node for a serving cell in a DL BWP under the second SCS and in the second time window: a number of control channel candidates monitored by the first node in a DL BWP in the second serving cell is no greater than the third threshold, and a number of Non-overlapped CCEs monitored by the first node in a DL BWP in the second serving cell is no greater than the fourth threshold: the second time window and the first time window are overlapping, and the second SCS is used to determine the second time window.

In one embodiment, a technical feature of the above method lies in that when the first search space set and the second search space set employ different SCSs: blind detections in the first search space set are restricted by a first threshold and a second threshold corresponding to the first SCS, and the second search space set is restricted by a third threshold and a fourth threshold corresponding to the second SCS; and each of PDCCH candidates and Non-overlapped CCEs in the first search space set is unrelated to PDCCH candidates and Non-overlapped CCEs in the second search space set, namely, determining whether the first search space set is dropping is performed independently from determining whether the second search space set is dropping.

According to one aspect of the present disclosure, when the first index is larger than the second index, each control signaling candidate comprised in the second search space set belongs to the target control signaling candidate set, and no control signaling candidate comprised in the first search space set belongs to the target control signaling candidate set: when the first index is smaller than the second index, each control signaling candidate comprised in the first search space set belongs to the target control signaling candidate set, and no control signaling candidate comprised in the second search space set belongs to the target control signaling candidate set.

In one embodiment, a technical feature of the above method lies in that when the first search space set and the second search space set employ a same SCS, the first search space set and the second search space set dynamically share blind detections; and in the dynamic sharing, the first index and the second index are used for identifying the priorities of the first search space set and the second search space set, the smaller index the higher priority, and the lower possibility of being dropped.

According to one aspect of the present disclosure, comprising:

receiving a first signaling:

herein, the first signaling occupies one or more control signaling candidates of a positive integer number of control signaling candidates comprised by the target control signaling candidate set.

The present disclosure provides a method in a second node for wireless communications, comprising:

transmitting first information, the first information being used to indicate a first search space set; and determining a target control signaling candidate set in a first time window, the target control signaling candidate set comprising a positive integer number of control signaling candidate(s):

herein, the first search space set comprises a positive integer number of control signaling candidate(s): frequency-domain resources occupied by any control signaling candidate comprised by the first search space set belong to a first serving cell, and a first scheduled cell set comprises a scheduled cell of the first serving cell: a target cell is a serving cell other than the first serving cell, whether the first scheduled cell set comprises the target cell is used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

According to one aspect of the present disclosure, comprising:

transmitting second information:

herein, the second information is used to determine a scheduling cell of the target cell: when the scheduling cell of the target cell includes the first serving cell, the target cell belongs to the first scheduled cell set: when the scheduling cell of the target cell does not include the first serving cell, the target cell does not belong to the first scheduled cell set.

According to one aspect of the present disclosure, the first serving cell, the target cell and any serving cell comprised in the first scheduled cell set all belong to a first cell group, and the target cell is a primary cell in the first cell group.

According to one aspect of the present disclosure, when the first scheduled cell set does not comprise the target cell, each control signaling candidate comprised by the first search space set belongs to the target control signaling candidate set.

According to one aspect of the present disclosure, when the first scheduled cell set comprises the target cell: the first information is used for indicating a second search space set, the second search space set comprising a positive integer number of control signaling candidate(s), frequency-domain resources occupied by the second search space set belong to a second serving cell, and any serving cell in a second scheduled cell set can be scheduled by the second serving cell, the second scheduled cell set comprising the target cell: an SCS of subcarriers occupied by a control signaling candidate in the first search space set in frequency domain is a first SCS, and an SCS of subcarriers occupied by a control signaling candidate in the second search space set in frequency domain is a second SCS: the first SCS and the second SCS are jointly used to determine whether a control signaling candidate comprised by the first search space set belongs to the target control signaling candidate set.

According to one aspect of the present disclosure, the first SCS is different from the second SCS, whether a control signaling candidate comprised by the first search space set belongs to the target control signaling candidate set is unrelated to the second search space set.

According to one aspect of the present disclosure, the first SCS is the same as the second SCS, a first search space set ID and a second search space set ID are respectively used to identify the first search space set and the second search space set, of which the first search space set is associated with a first index, while the second search space set is associated with a second index, the first index and the second index being non-negative integers: the first index and the second index are jointly used to determine whether a control signaling candidate comprised by the first search space set belongs to the target control signaling candidate set.

According to one aspect of the present disclosure, a receiver of the first information includes a first node: a first threshold is a maximum number of control channel candidates monitored by the first node for a serving cell in a DL BWP under the first SCS and in the first time window, and a second threshold is a maximum number of Non-overlapped CCEs monitored by the first node for a serving cell in a DL BWP under the first SCS and in the first time window: a number of control channel candidates monitored by the first node in a DL BWP in the first serving cell is no greater than the first threshold, and a number of Non-overlapped CCEs monitored by the first node in a DL BWP in the first serving cell is no greater than the second threshold: a third threshold is a maximum number of control channel candidates monitored by the first node for a serving cell in a DL BWP under the second SCS and in a second time window, and a fourth threshold is a maximum number of Non-overlapped CCEs monitored by the first node for a serving cell in a DL BWP under the second SCS and in the second time window: a number of control channel candidates monitored by the first node in a DL BWP in the second serving cell is no greater than the third threshold, and a number of Non-overlapped CCEs monitored by the first node in a DL BWP in the second serving cell is no greater than the fourth threshold: the second time window and the first time window are overlapping, and the second SCS is used to determine the second time window.

According to one aspect of the present disclosure, when the first index is larger than the second index, each control signaling candidate comprised in the second search space set belongs to the target control signaling candidate set, and no control signaling candidate comprised in the first search space set belongs to the target control signaling candidate set: when the first index is smaller than the second index, each control signaling candidate comprised in the first search space set belongs to the target control signaling candidate set, and no control signaling candidate comprised in the second search space set belongs to the target control signaling candidate set.

According to one aspect of the present disclosure, comprising:

transmitting a first signaling:

herein, the first signaling occupies one or more control signaling candidates of a positive integer number of control signaling candidates comprised by the target control signaling candidate set.

The present disclosure provides a first node for wireless communications, comprising:

a first receiver, which receives first information, the first information being used to indicate a first search space set; and a second receiver, which monitors a target control signaling candidate set in a first time window, the target control signaling candidate set comprising a positive integer number of control signaling candidate(s);

herein, the first search space set comprises a positive integer number of control signaling candidate(s): frequency-domain resources occupied by any control signaling candidate comprised by the first search space set belong to a first serving cell, and a first scheduled cell set comprises a scheduled cell of the first serving cell: a target cell is a serving cell other than the first serving cell, whether the first scheduled cell set comprises the target cell is used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

The present disclosure provides a second node for wireless communications, comprising:

a first transmitter, which transmits first information, the first information being used to indicate a first search space set; and a second transmitter, which determines a target control signaling candidate set in a first time window, the target control signaling candidate set comprising a positive integer number of control signaling candidate(s):

herein, the first search space set comprises a positive integer number of control signaling candidate(s): frequency-domain resources occupied by any control signaling candidate comprised by the first search space set belong to a first serving cell, and a first scheduled cell set comprises a scheduled cell of the first serving cell: a target cell is a serving cell other than the first serving cell, whether the first scheduled cell set comprises the target cell is used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, the present disclosure has the following advantages over the prior art:

The method of determining the dropping orders of multiple search spaces is only applicable in a scheduling cell capable of scheduling the target cell: that is, only when one or more scheduling cells are capable of scheduling the target cell can blind detections be dynamically shared and dropped based on a certain principle in one scheduling cell or between the multiple scheduling cells to guarantee performance:

When the target cell is a PCell, in order to ensure the scheduling of the target cell, configurations for a corresponding search space shall be greater than the blind detection capacity of the first node, so that too many search space sets will be configured and some are required to be dropped: for those search space sets only used for scheduling a SCell, the base station can make sure that search space sets configured do not go beyond the first node's processing capability, hence no need for designing a dropping principle.

For multiple search space sets capable of scheduling a PCell, for example, the first search space set and the second search space set, whether the two search space sets can dynamically share blind detections share be determined according to whether the first search space set and the second search space set employ a same SCS: when the first search space set and the second search space set employ different SCSs, the first search space set and the second search space set won't share blind detections dynamically: when the first search space set and the second search space set employ a same SCS, the first search space set and the second search space set will share blind detections dynamically: moreover, in a dynamic sharing, the first index and the second index are used for identifying priorities of the first search space set and the second search space set.

BRIEF DESCRIPTION OF THE DRAWINGS

Other features, objects and advantages of the present disclosure will become more apparent from the detailed description of non-restrictive embodiments taken in conjunction with the following drawings:

FIG. 1A illustrates a flowchart of processing of a first node according to one embodiment of the present disclosure.

FIG. 1B illustrates a flowchart of processing of a first node according to one embodiment of the present disclosure.

FIG. 1C illustrates a flowchart of processing of a first node according to one embodiment of the present disclosure FIG. 2 illustrates a schematic diagram of a network architecture according to one embodiment of the present disclosure.

FIG. 18A illustrates a schematic diagram of relations among a third parameter, a fourth parameter and a first SCS according to one embodiment of the present disclosure.

FIG. 19A illustrates a schematic diagram of a relation between a first control channel candidate and a second control channel candidate according to one embodiment of the present disclosure.

FIG. 20A illustrates a schematic diagram of a relation between a first Control Channel Element (CCE) and a second CCE according to one embodiment of the present disclosure.

DESCRIPTION OF THE EMBODIMENTS

Figure 3:
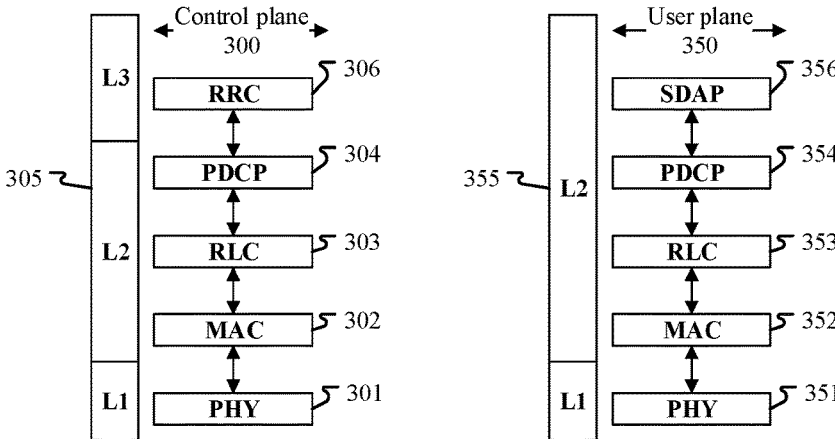
FIG. 3 illustrates a schematic diagram of a radio protocol architecture of a user plane and a control plane according to one embodiment of the present disclosure.

The technical scheme of the present disclosure is described below in further details in conjunction with the drawings. It should be noted that the embodiments of the present disclosure and the characteristics of the embodiments may be arbitrarily combined if no conflict is caused.

Embodiment 1A

Embodiment 1A illustrates a flowchart of processing of a first node, as shown in FIG. 1A. In 100 illustrated by FIG. 1A, each box represents a step. In Embodiment 1A, a first node in the present disclosure receives a first information block in step 101A: monitors M1 control channel candidates in a first time window in step 102A, the M1 control channel candidates occupying M2 control channel elements, M1 being a positive integer greater than 1, and M2 being a positive integer greater than 1.

In Embodiment 1A, the first information block is used to indicate a scheduled cell set, and serving cells comprised by the scheduled cell set are divided into a first cell group and a second cell group: the first cell group is different from the second cell group: the scheduled cell set comprises a target cell, and any of K1 scheduling cells is a scheduling cell for the target cell, K1 being a positive integer greater than 1: one of the M1 control channel candidates employs a first sub-carrier spacing (SCS), and the first SCS is used to determine a length of the first time window: a number of control resource pool(s) comprised by at least one of the K1 scheduling cells is used to determine a cell group to which the target cell belongs from the first cell group and the second cell group: a first quantitative value is a number of serving cells comprised in the first cell group being associated with at least one of the M1 control channel candidates, and a second quantitative value is a number of serving cells comprised in the second cell group being associated with at least one of the M1 control channel candidates: the first quantitative value, the second quantitative value and the target factor are used together for determining a first threshold and a second threshold: the target factor is a positive number: M1 is no greater than the first threshold, and M2 is no greater than the second threshold: both the first threshold and the second threshold are positive integers greater than 1.

In one embodiment, any of the M1 control channel candidates employs the first SCS.

In one embodiment, each of the M1 control channel candidates employs the first SCS.

In one embodiment, at least one of the M1 control channel candidates employs the first SCS.

In one embodiment, the first threshold is a positive integer greater than 1.

In one embodiment, the second threshold is a positive integer greater than 1.

In one embodiment, a PDCCH candidate scheduling a serving cell in the first cell group employs the first SCS.

In one embodiment, a PDCCH candidate scheduling a serving cell in the second cell group employs an SCS other than the first SCS.

In one embodiment, a PDCCH candidate scheduling a serving cell in the second cell group employs the first SCS.

In one embodiment, a PDCCH candidate scheduling a serving cell in the first cell group employs an SCS other than the first SCS.

In one embodiment, the first cell group comprises a positive integer number of serving cell(s), and each of the positive integer number of serving cell(s) is a scheduled cell of the first node.

In one embodiment, the second cell group comprises a positive integer number of serving cell(s), and each of the positive integer number of serving cell(s) is a scheduled cell of the first node.

In one embodiment, the first information block is transmitted via an air interface.

In one embodiment, the first information block is transmitted via a wireless interface.

In one embodiment, the first information block comprises all or part of a higher-layer signaling.

In one embodiment, the first information block comprises all or part of a physical layer signaling.

In one embodiment, the first information block comprises all or part of a Radio Resource Control (RRC) signaling.

In one embodiment, the first information block comprises all or part of a Medium Access Control (MAC) layer signaling.

In one embodiment, the first information block comprises all or part of a System Information Block (SIB).

In one embodiment, the first information block is transmitted through a Physical Downlink Shared Channel (PDSCH).

In one embodiment, the first information block is UE-specific.

In one embodiment, the first information block is specific to the first node.

In one embodiment, the first information block is configured Per Serving Cell.

In one embodiment, the first information block comprises all or part of fields of a Downlink Control Information (DCI) signaling.

In one embodiment, the phrase that the first information block is used to determine a scheduled cell set means that the first information block comprises K1 sub-information-blocks, K1 being smaller than a number of serving cells comprised in the scheduled cell set by 1, the K1 sub-information-blocks are respectively used for determining K1 serving cells, and any of the K1 serving cells belongs to the scheduled cell set.

In one embodiment, the first information block comprises a CellGroupConfig Information Element (IE) in an RRC signaling.

In one embodiment, the first information block comprises a sCellToAddModList field of a CellGroupConfig IE in an RRC signaling.

In one embodiment, the first information block comprises a sCellToReleaseList field of a CellGroupConfig IE in an RRC signaling.

In one embodiment, the phrase that the first information block is used to determine a scheduled cell set means that the first information block comprises K1 sub-information-blocks, K1 being smaller than a number of serving cells comprised in the scheduled cell set by 1, the K1 sub-information-blocks are respectively used for determining K1 serving cells, and any of the K1 serving cells belongs to the scheduled cell set, the K1 sub-information-blocks comprising a SCellConfig IE in an RRC signaling.

In one embodiment, the phrase that the first information block is used to determine a scheduled cell set means that the first information block is used by the first node in the present disclosure for determining the scheduled cell set.

In one embodiment, the phrase that the first information block is used to determine a scheduled cell set means that the first information block is used for explicitly indicating the scheduled cell set.

In one embodiment, the phrase that the first information block is used to determine a scheduled cell set means that the first information block is used for implicitly indicating the scheduled cell set.

In one embodiment, the phrase that the first information block is used to determine a scheduled cell set means that the first information block is used for indirectly indicating the scheduled cell set.

In one embodiment, the scheduled cell set comprises all serving cells configured for the first node.

In one embodiment, the scheduled cell set comprises part of serving cells configured for the first node.

In one embodiment, the number of serving cells comprised by the scheduled cell set is equal to 2.

In one embodiment, the number of serving cells comprised by the scheduled cell set is greater than 2.

In one embodiment, the number of serving cells comprised by the scheduled cell set is no greater than 16.

In one embodiment, the number of serving cells comprised by the scheduled cell set is no greater than 32.

In one embodiment, any two serving cells comprised by the scheduled cell set are different.

In one embodiment, each serving cell comprised by the scheduled cell set corresponds to a Component Carrier (CC).

In one embodiment, the scheduled cell set at least comprises one Primary Cell (Pcell) and one Secondary Cell (Scell).

In one embodiment, any two serving cells comprised by the scheduled cell set correspond to different carriers.

In one embodiment, any serving cell comprised by the scheduled cell set is scheduled by only one scheduling cell.

In one embodiment, a serving cell comprised by the scheduled cell set is scheduled by more than one scheduling cell.

In one embodiment, a PCell comprised by the scheduled cell set is scheduled by an Scell.

In one embodiment, a PCell comprised by the scheduled cell set is merely Self-Scheduled.

In one embodiment, a PCell comprised by the scheduled cell set is Self-Scheduled and Cross Carrier Scheduled simultaneously.

In one embodiment, all serving cells comprised by the scheduled cell set belong to a same cell group.

In one embodiment, the scheduled cell set comprises two serving cells that belong to different cell groups.

In one embodiment, all serving cells comprised by the scheduled cell set belong to a same Master Cell Group (MCG).

In one embodiment, all serving cells comprised by the scheduled cell set belong to a same Secondary Cell Group (SCG).

In one embodiment, the first time window is a slot.

In one embodiment, the first time window is a slot corresponding to the first SCS.

In one embodiment, the first time window comprises a positive integer number of time-domain contiguous Orthogonal Frequency Division Multiplexing (OFDM) Symbols.

In one embodiment, the first time window comprises a positive integer number of time-domain contiguous OFDM Symbols corresponding to the first SCS.

In one embodiment, the first time window is a span.

In one embodiment, the first time window is a span corresponding to the first SCS.

In one embodiment, the first time window is a time interval of minimum length between earliest OFDM symbols in two PDCCH Occasions.

In one embodiment, the first time window is a Mini-slot.

In one embodiment, the first time window is a Sub-slot.

In one embodiment, time-domain resources occupied by any of the M2 control channel elements belong to the first time window.

In one embodiment, time-domain resources occupied by any of the M2 control channel elements are a part of the first time window.

In one embodiment, time-domain resources occupied by any of the M1 control channel candidates are a part of the first time window.

In one embodiment, time-domain resources occupied by any of the M1 control channel candidates belong to the first time window.

In one embodiment, the monitoring on the M1 control channel candidates is implemented by decoding of the M1 control channel candidates.

In one embodiment, the monitoring on the M1 control channel candidates is implemented by Blind Decoding of the M1 control channel candidates.

In one embodiment, the monitoring on the M1 control channel candidates is implemented by decoding and Cyclic Redundancy Check (CRC) of the M1 control channel candidates.

In one embodiment, the monitoring on the M1 control channel candidates is implemented by decoding and Radio-Network-Temporary-Identity (RNTI)-scrambled CRC of the M1 control channel candidates.

In one embodiment, the monitoring on the M1 control channel candidates is implemented by decoding of the M1 control channel candidates based on monitored DCI Format (s).

In one embodiment, the monitoring on the M1 control channel candidates is implemented by decoding of the M1 control channel candidates based on one or more formats of DCI being monitored.

In one embodiment, any of the M1 control channel candidates occupies a positive integer number of control channel element(s) (CCE(s)).

In one embodiment, any of the M1 control channel candidates occupies one of 1 CCE, 2 CCEs, 4 CCEs, 8 CCEs or 16 CCEs.

In one embodiment, any of the M1 control channel candidates occupies a positive integer number of time-frequency Resource Element(s) (RE(s)).

In one embodiment, any of the M1 control channel candidates occupies time-frequency resources in time-frequency domain.

In one embodiment, any of the M1 control channel candidates is a PDCCH candidate.

In one embodiment, any of the M1 control channel candidates is a Monitored PDCCH Candidate.

In one embodiment, any of the M1 control channel candidates is a PDCCH candidate that employs one or more DCI formats.

In one embodiment, any of the M1 control channel candidates is a PDCCH candidate that employs one or more DCI Payload Sizes.

In one embodiment, any of the M1 control channel candidates is a time-frequency resource set carrying specific DCI of one or more formats.

In one embodiment, the M1 control channel candidates comprise two control channel candidates occupying same time-frequency resources.

In one embodiment, control channel elements respectively occupied by any two of the M1 control channel candidates are different.

In one embodiment, among the M1 control channel candidates there are two occupying (a) same control channel element(s).

In one embodiment, any two of the M1 control channel candidates have different properties, including at least one of occupied control channel element(s), employed scrambling, or corresponding DCI payload size.

In one embodiment, any of the M2 control channel elements is occupied by at least one PDCCH.

In one embodiment, any of the M1 control channel candidates occupies one or more of the M2 control channel elements.

In one embodiment, two independent Channel Estimations are required for any two of the M2 control channel elements.

In one embodiment, Channel Estimations respectively used for any two of the M2 control channel elements cannot be mutually reused.

In one embodiment, two independent Channel Equalizations are required for any two of the M2 control channel elements.

In one embodiment, any of the M2 control channel elements is a PDCCH CCE.

In one embodiment, any of the M2 control channel elements is a Non-Overlapped CCE.

In one embodiment, any two of the M2 control channel elements are Non-Overlapped.

In one embodiment, any two of the M2 control channel elements comprise equal numbers of time-frequency resource units.

In one embodiment, any two of the M2 control channel elements comprise equal numbers of REs.

In one embodiment, any of the M2 control channel elements comprises 6 Resource Element Groups (REGs).

In one embodiment, any of the M2 control channel elements comprises 6 Resource Element Groups (REGs), with each REG comprising 9 resource units used for transmitting data modulation symbols and 3 resource units used for transmitting Reference Signals (RS).

In one embodiment, time-frequency resources respectively occupied by any two of the M2 control channel elements are orthogonal.

In one embodiment, among the M2 control channel elements there are two control channel elements occupying time-frequency resources that are non-orthogonal.

In one embodiment, among the M2 control channel elements there are two control channel elements occupying same time-frequency resources.

In one embodiment, time-frequency resources occupied by any two of the M2 control channel elements are not the same.

In one embodiment, any control channel element occupied by one or more of the M1 control channel candidates is one of the M2 control channel elements.

In one embodiment, there is a control channel element occupied by one of the M1 control channel candidates being a control channel element other than the M2 control channel elements.

In one embodiment, any of the M2 control channel elements is occupied by at least one of the M1 control channel candidates.

In one embodiment, the M2 control channel elements comprise each of control channel element(s) occupied by any one of the M1 control channel candidates.

In one embodiment, an SCS of subcarriers occupied by any of the M2 control channel elements in frequency domain is equal to an SCS configured for an active BWP to which the any of the M2 control channel elements belongs in frequency domain.

In one embodiment, the M2 control channel elements respectively belong to M3 active BWP(s) in frequency domain, and an SCS of subcarriers comprised by any active BWP of the M3 active BWP(s) is equal to the first SCS, M3 being a positive integer.

In one embodiment, any of the M2 control channel elements belongs to a sub-band in the first sub-band set of the present disclosure in frequency domain.

In one embodiment, any two subcarriers occupied by the M2 control channel elements are of an equal SCS.

In one embodiment, an SCS of subcarriers occupied by any of the M2 control channel elements in frequency domain is equal to the first SCS.

In one embodiment, an SCS of a subcarrier occupied by any of the M2 control channel elements in frequency domain is equal to the first SCS.

In one embodiment, frequency-domain resources occupied by the M1 control channel candidates are between 450 MHz and 6 GHz.

In one embodiment, frequency-domain resources occupied by the M1 control channel candidates are between 24.25 GHz and 52.6 GHz.

In one embodiment, the first SCS is measured in Hz.

In one embodiment, the first SCS is measured in kHz.

In one embodiment, the first SCS is equal to one of 15 kHz, 30 kHz, 60 kHz, 120 kHz and 240 KHz.

In one embodiment, the phrase that the first SCS is used to determine a length of the first time window means that the first SCS is used by the first node in the present disclosure for determining the length of the first time window.

In one embodiment, the phrase that the first SCS is used to determine a length of the first time window means that the first time window is a slot, the first SCS is used for determining a number of slots comprised by a sub-frame, and the length of the first time window is equal to a ratio of a length of the sub-frame to the number of slots comprised by the sub-frame.

In one embodiment, the phrase that the first SCS is used to determine a length of the first time window means that the first SCS is used for determining a time length of each OFDM symbol comprised by the first time window.

In one embodiment, the phrase that the first SCS is used to determine a length of the first time window means that the first time window is a span, and the first SCS is used for determining a time length of each OFDM symbol comprised by the span.

In one embodiment, the phrase that the first SCS is used to determine a length of the first time window means that a Configuration Index of the first SCS is used for determining the length of the first time window.

In one embodiment, the phrase that the first SCS is used to determine a length of the first time window means that the first SCS is used for determining the length of the first time window according to corresponding relationship.

In one embodiment, the phrase that the first SCS is used to determine a length of the first time window means that the first SCS is used for determining the length of the first time window according to table correspondence relationship.

In one embodiment, further comprising:

receiving a first synchronization signal:

herein, the first synchronization signal is used to determine a time-domain position of the first time window.

In one embodiment, the M1 is less than the first threshold.

In one embodiment, the M1 is equal to the first threshold.

In one embodiment, the M2 is less than the second threshold.

In one embodiment, the M2 is equal to the second threshold.

In one embodiment, the first threshold and the second threshold can be equal or unequal.

In one embodiment, the first threshold and the second threshold are independent.

In one embodiment, the first threshold and the second threshold are unrelated.

In one embodiment, the first threshold and the second threshold are related.

In one embodiment, the first threshold and the second threshold are linearly correlated.

In one embodiment, the first threshold and the second threshold are proportional.

In one embodiment, the first node in the present disclosure is not required to monitor control channel candidates, of which the total number is greater than the first threshold, in an active BWP employing the first SCS in the first time window.

In one embodiment, the first node in the present disclosure is not required to monitor control channel elements, of which the total number is greater than the second threshold, in an active BWP employing the first SCS in the first time window.

In one embodiment, the phrase that the first cell group is different from the second cell group means that there isn't any serving cell that belongs to the first cell group and the second cell group simultaneously.

In one embodiment, the phrase that the first cell group is different from the second cell group means that there is at least one serving cell of serving cell(s) comprised by the first cell group that does not belong to the second cell group.

In one embodiment, the phrase that the first cell group is different from the second cell group means that there is at least one serving cell of serving cell(s) comprised by the second cell group that does not belong to the first cell group.

In one embodiment, the phrase that the first cell group is different from the second cell group means that in the scheduled cell set there isn't any serving cell that belongs to the first cell group and the second cell group simultaneously.

In one embodiment, the first cell group comprises a non-negative integral number of serving cell(s).

In one embodiment, the second cell group comprises a non-negative integral number of serving cell(s).

In one embodiment, either of the first cell group and the second cell group comprises 1 serving cell.

In one embodiment, either of the first cell group and the second cell group comprises 0 serving cell.

In one embodiment, any serving cell comprised by the scheduled cell set belongs to either of the first cell group and the second cell group.

In one embodiment, the target cell can be a given serving cell comprised by the scheduled cell set.

In one embodiment, the target cell is any one of serving cell(s) comprised in the scheduled cell set that can be scheduled by more than one scheduling cell.

In one embodiment, the target cell is one of serving cell(s) comprised in the scheduled cell set that can be scheduled by more than one scheduling cell.

In one embodiment, the target cell is a primary cell comprised by the scheduled cell set.

In one embodiment, the target cell is a secondary cell comprised by the scheduled cell set.

In one embodiment, the K1 is greater than 1.

In one embodiment, the K1 is equal to 2.

In one embodiment, any of the K1 scheduling cells is capable of carrying a PDCCH that schedules the target cell.

In one embodiment, any of the K1 scheduling cells is capable of carrying a PDCCH that schedules a signal on the target cell.

In one embodiment, of the K1 scheduling cells there is one scheduling cell being the target cell.

In one subembodiment, the target cell can be self-scheduled.

In one embodiment, the target cell does not exist in the K1 scheduling cells.

In one subembodiment, the target cell can only be Cross Carrier Scheduled.

In one embodiment, the phrase that control resource pool comprised by one scheduling cell includes a CORESET pool in the scheduling cell.

In one embodiment, the phrase that control resource pool comprised by one scheduling cell includes a Search Space Set Pool in the scheduling cell.

In one embodiment, the phrase that control resource pool comprised by one scheduling cell includes a CORESET in the scheduling cell.

In one embodiment, the phrase that control resource pool comprised by one scheduling cell includes a Search Space Set in the scheduling cell.

In one embodiment, the phrase that a number of control resource pools comprised by a scheduling cell includes a number of CORESET pools in the scheduling cell.

In one embodiment, the phrase that a number of control resource pools comprised by a scheduling cell includes a number of CORESET Pool Index(es) provided in the scheduling cell.

In one embodiment, the phrase that a number of control resource pools comprised by a scheduling cell includes a number of Search Space Set Pool Index(es) provided in the scheduling cell.

In one embodiment, the phrase that a number of control resource pools comprised by a scheduling cell includes a number of CORESET Index(es) provided in the scheduling cell.

In one embodiment, the phrase that a number of control resource pools comprised by a scheduling cell includes a number of Search Space Set Index(es) provided in the scheduling cell.

In one embodiment, the number of control resource pool(s) comprised in any of the K1 scheduling cells is equal to 1 or 2.

In one embodiment, there is at least one scheduling cell of the K1 scheduling cells in which the number of control resource pools comprised is equal to 2.

In one embodiment, there is at least one scheduling cell of the K1 scheduling cells in which the number of control resource pools comprised is greater than 2.

In one embodiment, the phrase that a number of control resource pool(s) comprised by at least one of the K1 scheduling cells is used to determine a cell group to which the target cell belongs from the first cell group and the second cell group means that the number of control resource pool(s) comprised by one of the K1 scheduling cells is used to determine a cell group to which the target cell belongs from the first cell group and the second cell group.

In one embodiment, the phrase that a number of control resource pool(s) comprised by at least one of the K1 scheduling cells is used to determine a cell group to which the target cell belongs from the first cell group and the second cell group means that the number of control resource pool(s) comprised by each of the K1 scheduling cells is used to determine a cell group to which the target cell belongs from the first cell group and the second cell group.

In one embodiment, the first quantitative value is a non-negative integer, and the second quantitative value is a non-negative integer.

In one embodiment, the first quantitative value is a positive integer, and the second quantitative value is a positive integer.

In one embodiment, either the first quantitative value or the second quantitative value is greater than 0.

In one embodiment, either the first quantitative value or the second quantitative value is equal to 0.

In one embodiment, the first quantitative value is equal to the second quantitative value.

In one embodiment, the first quantitative value is unequal to the second quantitative value.

In one embodiment, the first quantitative value is independent of the second quantitative value.

In one embodiment, the first quantitative value is irrelevant to the second quantitative value.

In one embodiment, the phrase that a first quantitative value is a number of serving cells comprised in the first cell group being associated with at least one of the M1 control channel candidates includes a meaning as follows: the first cell group comprises P1 serving cell(s), and Q1 serving cell(s) of the P1 serving cell(s) can be scheduled by at least one of the M1 control channel candidates, the first quantitative value is equal to the Q1. P1 and Q1 are non-negative integers, and the Q1 is no greater than the P1.

In one embodiment, the phrase that a second quantitative value is a number of serving cells comprised in the second cell group being associated with at least one of the M1 control channel candidates includes a meaning as follows: the second cell group comprises P2 serving cell(s), and Q2 serving cell(s) of the P2 serving cell(s) can be scheduled by at least one of the M1 control channel candidates, the second quantitative value is equal to the Q2. P2 and Q2 are non-negative integers, and the Q2 is no greater than the P2.

In one embodiment, the M1 control channel candidates are all control channel candidates that are capable of scheduling any scheduled cell in the scheduled cell set when employing the first SCS.

In one embodiment, the M1 control channel candidates are some of control channel candidates that are capable of scheduling any scheduled cell in the scheduled cell set when employing the first SCS.

In one embodiment, the target factor is no less than 1.

In one embodiment, the target factor can be less than 1.

In one embodiment, the target factor is no greater than 2.

In one embodiment, the target factor is a positive integer.

In one embodiment, the target factor can be non-integral.

In one embodiment, the target factor can be greater than 2.

In one embodiment, the target factor is no greater than 4.

In one embodiment, the target factor is equal to either 1 or 2.

In one embodiment, the target factor is configured by an RRC signaling.

In one embodiment, the phrase that the first quantitative value, the second quantitative value and the target factor are used together for determining a first threshold and a second threshold includes a meaning as follows: the first quantitative value, the second quantitative value and the target factor are used together by the first node in the present disclosure for determining the first threshold and the second threshold.

In one embodiment, the phrase that the first quantitative value, the second quantitative value and the target factor are used together for determining a first threshold and a second threshold includes a meaning as follows: the first quantitative value, the second quantitative value and the target factor are used according to respective given arithmetic functions for determining the first threshold and the second threshold.

In one embodiment, the phrase that the first quantitative value, the second quantitative value and the target factor are used together for determining a first threshold and a second threshold includes a meaning as follows: the first quantitative value, the second quantitative value and the target factor are used according to respectively given mapping relations for determining the first threshold and the second threshold.

In one embodiment, a number of OFDM symbols comprised in the first time window is used to determine a cell group to which the target cell belongs from the first cell group and the second cell group.

In one embodiment, numbers of control resource pools respectively comprised by two different scheduling cells of the K1 scheduling cells are used to determine a cell group to which the target cell belongs from the first cell group and the second cell group.

In one embodiment, a number of control resource pool(s) comprised by one of the K1 scheduling cells is used to determine a cell group to which the target cell belongs from the first cell group and the second cell group.

In one embodiment, numbers of control resource pools respectively comprised by all of the K1 scheduling cells are used to determine a cell group to which the target cell belongs from the first cell group and the second cell group.

Embodiment 1B

Embodiment 1B illustrates a flowchart of processing of a first node, as shown in FIG. 1B. In 100 B illustrated by FIG. 1B, each box represents a step. In Embodiment 1B, a first node in the present disclosure receives first information in step 101B, the first information being used to indicate a first search space set and a second search space set, the first search space set comprising a positive integer number of control signaling candidate(s), and the second search space set comprising a positive integer number of control signaling candidate(s), a first Search Space Set ID and a second Search Space Set ID being used to respectively identify the first search space set and the second search space set; and then monitors a target control signaling candidate set in a first time window, the target control signaling candidate set comprising a positive integer number of control signaling candidate(s).

In Embodiment 1B, time-frequency resources occupied by control signaling candidate(s) comprised in the first search space set belong to a first resource pool, while time-frequency resources occupied by control signaling candidate(s) comprised in the second search space set belong to a second resource pool: the first resource pool and the second resource pool are respectively associated with a first index and a second index, the first index and the second index being non-negative integers, respectively: any control signaling candidate comprised by the second search space set belongs to the target control signaling candidate set: the first index and the second index are jointly used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, it is an RRC signaling that bears the first information.

In one embodiment, the first information is used to indicate time-domain resources, frequency-domain resource or time-frequency resources occupied by the first search space set.

In one embodiment, the first information is used to indicate the number of PDCCH candidates comprised in the first search space set.

In one embodiment, the first information is used to indicate an Aggregation Level (AL) employed by PDCCH candidates comprised in the first search space set.

In one embodiment, the first information is used to indicate a serving cell(s) that can be scheduled by the first search space set.

In one embodiment, the first information is used to indicate time-domain resources, frequency-domain resources or time-frequency resources occupied by the first search space set.

In one embodiment, the first information is used to indicate time-domain resources, frequency-domain resources or time-frequency resources occupied by the second search space set.

In one embodiment, the first information is used to indicate a number of PDCCH candidates comprised in the second search space set.

In one embodiment, the first information is used to indicate an Aggregation Level (AL) employed by PDCCH candidates comprised in the second search space set.

In one embodiment, the first information is used to indicate a serving cell(s) that can be scheduled by the second search space set.

In one embodiment, the first information is UE-specific.

In one embodiment, the first information is specific to the first node.

In one embodiment, the first information comprises a ControlResourceSet IE in the Technical Specification (TS) 38.331.

In one embodiment, the first information comprises a SearchSpace IE in the TS 38.331.

In one embodiment, the first information comprises a ControlResourceSetPool IE in the TS 38.331.

In one embodiment, the first information comprises a CrossCarrierSchedulingConfig IE in the TS 38.331.

In one embodiment, the first information is transmitted via an air interface.

In one embodiment, the first information is transmitted via a wireless interface.

In one embodiment, the first information comprises all or part of a higher layer signaling.

In one embodiment, the first information comprises all or part of a physical layer signaling.

In one embodiment, the first information comprises all or part of an RRC signaling.

In one embodiment, the first information comprises all or part of a MAC layer signaling.

In one embodiment, the first information comprises all or part of a SIB.

In one embodiment, the first information is transmitted through a Physical Downlink Shared Channel (PDSCH).

In one embodiment, the first information is specific to the first node.

In one embodiment, the first information is configured Per Serving Cell.

In one embodiment, the first information comprises all or part of fields of a DCI signaling.

In one embodiment, the first information comprises a CellGroupConfig IE in an RRC signaling.

In one embodiment, the first information comprises a sCellToAddModList field of a CellGroupConfig IE in an RRC signaling.

In one embodiment, the first information comprises a sCellToReleaseList field of a CellGroupConfig IE in an RRC signaling.

In one embodiment, the first search space set is a PDCCH Search Space.

In one embodiment, the second search space set is a PDCCH Search Space.

In one embodiment, the first search space set is a PDCCH Search Space Set.

In one embodiment, the second search space set is a PDCCH Search Space Set.

In one embodiment, any of the positive integer number of control signaling candidate(s) comprised by the first search space set is a PDCCH candidate.

In one embodiment, any of the positive integer number of control signaling candidate(s) comprised by the second search space set is a PDCCH candidate.

In one embodiment, any of the positive integer number of control signaling candidate(s) comprised by the target control signaling candidate set is a PDCCH candidate.

In one embodiment, the first search space set ID is a non-negative integer.

In one embodiment, the second search space set ID is a non-negative integer.

In one embodiment, the first index is unequal to the second index.

In one embodiment, the first index is greater than the second index.

In one embodiment, the first search space set ID is a SearchSpaceId.

In one embodiment, the second search space set ID is a SearchSpaceId.

In one embodiment, the first search space set ID is a SearchSpaceSetId.

In one embodiment, the second search space set ID is a SearchSpaceSetId.

In one embodiment, the first search space set ID is a ControlResourceSetId.

In one embodiment, the second search space set ID is a ControlResourceSetId.

In one embodiment, the first search space set ID is smaller than the second search space set ID.

In one embodiment, the first search space set ID is equal to the second search space set ID.

In one embodiment, a relative magnitude of the first search space set ID and the second search space set ID is unrelated to whether a control signaling candidate(s) comprised by the first search space set belongs to the target control signaling candidate set.

In one embodiment, the first time window is a slot.

In one embodiment, the first time window is a slot corresponding to the first SCS.

In one embodiment, the first time window comprises a positive integer number of time-domain contiguous OFDM symbols.

In one embodiment, the first time window comprises a positive integer number of time-domain contiguous OFDM symbols corresponding to the first SCS.

In one embodiment, the first time window is a span.

In one embodiment, the first time window is a span corresponding to the first SCS.

In one embodiment, the first time window is a time interval of minimum length between earliest OFDM symbols in two PDCCH Occasions.

In one embodiment, the first time window is a Mini-slot.

In one embodiment, the first time window is a Sub-slot.

In one embodiment, an SCS of subcarriers occupied by a control signaling candidate comprised by the target control signaling candidate set in frequency domain is the first SCS.

In one subembodiment, the first SCS is measured in Hz.

In one subembodiment, the first SCS is measured in kHz.

In one subembodiment, the first SCS is equal to one of 15 kHz, 30 kHz, 60 kHz, 120 KHz and 240 KHz.

In one subembodiment, the first SCS is used by the first node in the present disclosure for determining a length of the first time window.

In one subembodiment, the first time window is a slot, the first SCS is used for determining a number of slots comprised by a sub-frame, and the length of the first time window is equal to a ratio of a length of the sub-frame to the number of slots comprised by the sub-frame.

In one subembodiment, the first SCS is used for determining a time length of each OFDM symbol comprised by the first time window.

In one subembodiment, the first time window is a span, and the first SCS is used for determining a time length of each OFDM symbol comprised by the span.

In one subembodiment, a Configuration Index of the first SCS is used for determining the length of the first time window.

In one subembodiment, the first SCS is used for determining the length of the first time window according to corresponding relationship.

In one subembodiment, the first SCS is used for determining the length of the first time window according to table correspondence relationship.

In one embodiment, the first resource pool occupies a positive integer number of RE(s).

In one embodiment, the second resource pool occupies a positive integer number of RE(s).

In one embodiment, the first resource pool occupies a positive integer number of subcarrier(s) in frequency domain, and occupies a positive integer number of OFDM symbol(s) in time domain.

In one embodiment, the second resource pool occupies a positive integer number of subcarrier(s) in frequency domain, and occupies a positive integer number of OFDM symbol(s) in time domain.

In one embodiment, the first resource pool is a CORESET.

In one embodiment, the first resource pool is a CORESET Pool.

In one embodiment, the first resource pool comprises multiple CORESETs.

In one embodiment, the second resource pool is a CORESET.

In one embodiment, the second resource pool is a CORESET Pool.

In one embodiment, the second resource pool comprises multiple CORESETs.

In one embodiment, the phrase that the first resource pool and the second resource pool are respectively associated with a first index and a second index includes a meaning that frequency-domain resources occupied by the first resource pool belong to a first serving cell, and frequency-domain resources occupied by the second resource pool belong to a second serving cell, a ServingCellId of the first serving cell is equal to the first index, and a ServingCellId of the second serving cell is equal to the second index.

In one embodiment, the phrase that the first resource pool and the second resource pool are respectively associated with a first index and a second index includes a meaning that frequency-domain resources occupied by the first resource pool belong to a first serving cell, and frequency-domain resources occupied by the second resource pool belong to a second serving cell, a ServCellIndex for the first serving cell is equal to the first index, and a ServCellIndex for the second serving cell is equal to the second index.

In one embodiment, the phrase that the first resource pool and the second resource pool are respectively associated with a first index and a second index includes a meaning that the first resource pool is a first CORESET, and the second resource pool is a second CORESET, an ID of the first CORESET is equal to the first index, and an ID of the second CORESET is equal to the second index.

In one embodiment, the phrase that the first resource pool and the second resource pool are respectively associated with a first index and a second index includes a meaning that time-frequency resources occupied by the first resource pool belong to a first CORESET pool, and time-frequency resources occupied by the second resource pool belong to a second CORESET pool, an ID of the first CORESET pool is equal to the first index, and an ID of the second CORESET pool is equal to the second index.

In one embodiment, the phrase that the first resource pool and the second resource pool are respectively associated with a first index and a second index includes a meaning that control channel candidates comprised by the first resource pool are capable of scheduling a third serving cell, and control channel candidates comprised by the second resource pool are capable of scheduling a fourth serving cell: a serving cell ID of the third serving cell is the first index, and a serving cell ID of the fourth serving cell is the second index.

In one embodiment, the target control signaling candidate set comprises each control signaling candidate comprised by a third search space set, and the third search space set is a search space set other than the first search space set and the second search space set.

In one subembodiment, the third search space set is a Common Search Space (CSS).

In one subembodiment, the third search space set is a UE-Specific Search Space (USS).

In one subembodiment, the third search space set is a PDCCH Search Space.

In one subembodiment, the third search space set is a PDCCH Search Space Set.

In one embodiment, the first search space set is a USS.

In one embodiment, the second search space set is a USS.

In one embodiment, the first search space set is a CSS.

In one embodiment, the second search space set is a CSS.

In one embodiment, a relative magnitude of the first index and the second index is used to determine whether a control signaling candidate comprised by the first search space set belongs to the target control signaling candidate set.

In one subembodiment, the first index is greater than the second index, and none of control signaling candidate(s) comprised by the first search space set belongs to the target control signaling candidate set.

In one subembodiment, the first index is less than the second index, and each of control signaling candidate(s) comprised by the first search space set belongs to the target control signaling candidate set.

In one embodiment, whether the first index is equal to the second index is used to determine whether a control signaling candidate comprised by the first search space set belongs to the target control signaling candidate set.

In one subembodiment, the first index is equal to the second index, and each of control signaling candidate(s) comprised by the first search space set belongs to the target control signaling candidate set.

In one subembodiment, the first index is unequal to the second index, and none of control signaling candidate(s) comprised by the first search space set belongs to the target control signaling candidate set.

In one embodiment, the first search space set comprises M1 control channel candidates.

In one subembodiment, any of the M1 control channel candidates employs the first SCS.

In one subembodiment, each of the M1 control channel candidates employs the first SCS.

In one subembodiment, there is at least one of the M1 control channel candidates employing the first SCS.

In one subembodiment, any of the M1 control channel candidates occupies a positive integer number of CCE(s).

In one subembodiment, any of the M1 control channel candidates occupies more than one RE.

In one subembodiment, any of the M1 control channel candidates occupies one of 1 CCE, 2 CCEs, 4 CCEs, 8 CCEs, or 16 CCEs.

In one subembodiment, any of the M1 control channel candidates is a PDCCH candidate that employs one or more DCI Payload Sizes.

In one subembodiment, any of the M1 control channel candidates is a time-frequency resource set carrying specific DCI of one or more formats.

In one embodiment, the second search space set comprises M2 control channel candidates.

In one subembodiment, any of the M2 control channel candidates employs the first SCS.

In one subembodiment, each of the M2 control channel candidates employs the first SCS.

In one subembodiment, there is at least one of the M2 control channel candidates employing the first SCS.

In one subembodiment, any of the M2 control channel candidates is a PDCCH candidate that employs one or more DCI Payload Sizes.

In one subembodiment, any of the M2 control channel candidates is a time-frequency resource set carrying specific DCI of one or more formats.

In one subembodiment, any of the M2 control channel candidates occupies a positive integer number of CCE(s).

In one subembodiment, any of the M2 control channel candidates occupies more than one RE.

In one subembodiment, any of the M2 control channel candidates occupies one of 1 CCE, 2 CCEs, 4 CCEs, 8 CCEs, or 16 CCEs.

In one embodiment, the action of monitoring a target control signaling candidate set in a first time window is implemented by decoding of control channel candidate(s) comprised in the target control signaling candidate set.

In one embodiment, the action of monitoring a target control signaling candidate set in a first time window is implemented by Blind Decoding of control channel candidate(s) comprised in the target control signaling candidate set.

In one embodiment, the action of monitoring a target control signaling candidate set in a first time window is implemented by decoding and Cyclic Redundancy Check (CRC) of control channel candidate(s) comprised in the target control signaling candidate set.

In one embodiment, the action of monitoring a target control signaling candidate set in a first time window is implemented by decoding and RNTI-scrambled CRC of control channel candidate(s) comprised in the target control signaling candidate set.

In one embodiment, the action of monitoring a target control signaling candidate set in a first time window is implemented by decoding of control channel candidate(s) comprised in the target control signaling candidate set.

In one embodiment, the target control signaling candidate set comprises more than one control channel candidate.

In one embodiment, any control channel candidate comprised by the target control signaling candidate set occupies a positive integer number of CCE(s).

In one embodiment, any control channel candidate comprised by the target control signaling candidate set occupies more than one RE.

In one embodiment, any control channel candidate comprised by the target control signaling candidate set occupies one of 1 CCE, 2 CCEs, 4 CCEs, 8 CCEs, or 16 CCEs.

In one embodiment, further comprising:

receiving a first synchronization signal:

herein, the first synchronization signal is used to determine a time-domain position of the first time window.

Embodiment 1C

Embodiment 1C illustrates a flowchart of processing of a first node, as shown in FIG. 1C. In 100C illustrated by FIG.

1C, each box represents a step. In Embodiment 1C, the first node in the present disclosure first receives first information in step 101C, the first information being used to indicate a first search space set; and then monitors a target control signaling candidate set in a first time window, the target control signaling candidate set comprising a positive integer number of control signaling candidate(s).

In Embodiment 1C, the first search space set comprises a positive integer number of control signaling candidate(s): frequency-domain resources occupied by any control signaling candidate comprised by the first search space set belong to a first serving cell, and a first scheduled cell set comprises a scheduled cell of the first serving cell: a target cell is a serving cell other than the first serving cell, whether the first scheduled cell set comprises the target cell is used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, it is an RRC signaling that bears the first information.

In one embodiment, the first information is UE-specific.

In one embodiment, the first information is specific to the first node.

In one embodiment, the first information comprises a ControlResourceSet IE in the TS 38.331.

In one embodiment, the first information comprises a SearchSpace IE in the TS 38.331.

In one embodiment, the first information comprises a ControlResourceSetPool IE in the TS 38.331.

In one embodiment, the first information is used to indicate time-domain resources, frequency-domain resource or time-frequency resources occupied by the first search space set.

In one embodiment, the first information is used to indicate the number of PDCCH candidates comprised in the first search space set.

In one embodiment, the first information is used to indicate an AL employed by PDCCH candidates comprised in the first search space set.

In one embodiment, the first information is used to indicate a serving cell(s) that can be scheduled by the first search space set.

In one embodiment, the first information comprises all or part of a higher layer signaling.

In one embodiment, the first information comprises all or part of a physical layer signaling.

In one embodiment, the first information comprises all or part of an RRC signaling.

In one embodiment, the first information comprises all or part of a MAC layer signaling.

In one embodiment, the first information comprises all or part of a SIB.

In one embodiment, the first information is transmitted through a PDSCH.

In one embodiment, the first information comprises a sCellToAddModList field of a CellGroupConfig IE in an RRC signaling.

In one embodiment, the first information comprises a sCellToReleaseList field of a CellGroupConfig IE in an RRC signaling.

In one embodiment, the first search space set is a PDCCH Search Space.

In one embodiment, the first search space set is a PDCCH Search Space Set

In one embodiment, the first search space set is a USS.

In one embodiment, the first search space set is a CSS.

In one embodiment, any of the positive integer number of control signaling candidate(s) comprised by the first search space set is a PDCCH candidate.

In one embodiment, any of the positive integer number of control signaling candidate(s) comprised by the target control signaling candidate set is a PDCCH candidate.

In one embodiment, the first search space set employs a first search space ID, the first search space ID being a non-negative integer.

In one embodiment, the first time window is a slot corresponding to the first SCS.

In one embodiment, the first time window comprises a positive integer number of time-domain contiguous OFDM symbols.

In one embodiment, an SCS of subcarriers occupied by a control signaling candidate in the first search space set in frequency domain is a first SCS.

In one embodiment, an SCS of subcarriers occupied by any control signaling candidate in the first search space set in frequency domain is a first SCS.

In one embodiment, the first time window comprises a positive integer number of time-domain contiguous OFDM symbols corresponding to the first SCS in the present disclosure.

In one embodiment, the first time window is a span.

In one embodiment, the first time window is a span corresponding to the first SCS in the present disclosure.

In one embodiment, the first time window is a time interval of minimum length between earliest OFDM symbols in two PDCCH Occasions.

In one embodiment, the first time window is a Mini-slot.

In one embodiment, the first time window is a Sub-slot.

In one embodiment, the first time window is a slot.

In one embodiment, the first SCS is equal to one of 15 kHz, 30 kHz, 60 kHz, 120 KHz or 240 KHz.

In one embodiment, the target control signaling candidate set comprises each control signaling candidate monitored by the first node in the first time window.

In one embodiment, the target control signaling candidate set comprises each control signaling candidate monitored by the first node in the first time window and in frequency-domain resources comprised by the first serving cell.

In one embodiment, the target control signaling candidate set comprises each control signaling candidate monitored by the first node in the first time window and in a DL BWP comprised by the first serving cell.

In one embodiment, the first node only occupies one active DL BWP on the first serving cell in the first time window, and frequency-domain resources occupied by the first search space set belong to the DL BWP.

In one embodiment, the target control signaling candidate set comprises more than one control signaling candidate.

In one embodiment, the serving cell in the present disclosure is a Serving Cell.

In one embodiment, the serving cell in the present disclosure is a CC.

In one embodiment, the first serving cell is a Secondary Cell.

In one embodiment, the first serving cell is a Secondary Cell in a Master Cell Group (MCG).

In one embodiment, the first serving cell is a Secondary Cell in a Secondary Cell Group (SCG).

In one embodiment, the first serving cell is a Secondary Cell with a minimum ServingCellId.

In one embodiment, the first scheduled cell set only comprises one given serving cell, and the first serving cell is capable of scheduling the given serving cell.

In one subembodiment, the given serving cell is different from the first serving cell.

In one embodiment, the first scheduled cell set comprises Q1 serving cells, and any of the Q1 serving cells can be scheduled by the first serving cell, Q1 being greater than 1.

In one subembodiment, the Q1 serving cells respectively employ Q1 different serving cell IDs.

In one subembodiment, the Q1 serving cells respectively occupy Q1 non-overlapping bands.

In one subembodiment, the Q1 serving cells are Q1 CCs, respectively.

In one embodiment, the phrase that a target cell is a serving cell other than the first serving cell means that the target cell and the first serving cell respectively correspond to different serving cell IDs.

In one embodiment, the phrase that a target cell is a serving cell other than the first serving cell means that the target cell is a Pcell, and the first serving cell is an Scell.

In one embodiment, the phrase that a target cell is a serving cell other than the first serving cell means that frequency-domain resources occupied by the target cell and frequency-domain resources occupied by the first serving cell are orthogonal.

In one embodiment, the phrase that whether the first scheduled cell set comprises the target cell is used to determine whether a control signaling candidate comprised by the first search space set belongs to the target control signaling candidate set includes a meaning as follows: when the first scheduled cell set does not comprise the target cell, each control signaling candidate comprised by the first search space set belongs to the target control signaling candidate set.

In one embodiment, the phrase that whether the first scheduled cell set comprises the target cell is used to determine whether a control signaling candidate comprised by the first search space set belongs to the target control signaling candidate set includes a meaning as follows: when the first scheduled cell set does not comprise the target cell, the first node monitors all control signaling candidates comprised by the first search space set.

In one embodiment, the phrase that whether the first scheduled cell set comprises the target cell is used to determine whether a control signaling candidate comprised by the first search space set belongs to the target control signaling candidate set includes a meaning as follows: when the first scheduled cell set does not comprise the target cell, any control signaling candidate comprised by the first search space set is not to be dropped.

In one embodiment, the phrase that whether the first scheduled cell set comprises the target cell is used to determine whether a control signaling candidate comprised by the first search space set belongs to the target control signaling candidate set includes a meaning as follows: when the first scheduled cell set comprises the target cell, whether a control signaling candidate comprised by the first search space set belongs to the target control signaling candidate set depends on a first index associated with the first search space set.

In one embodiment, the phrase that whether the first scheduled cell set comprises the target cell is used to determine whether a control signaling candidate comprised by the first search space set belongs to the target control signaling candidate set includes a meaning as follows: when the first scheduled cell set comprises the target cell, whether a control signaling candidate comprised by the first search space set belongs to the target control signaling candidate set depends on whether there is a search space of a higher priority than the first search space set.

In one embodiment, the phrase that whether the first scheduled cell set comprises the target cell is used to determine whether a control signaling candidate comprised by the first search space set belongs to the target control signaling candidate set includes a meaning as follows: when the first scheduled cell set comprises the target cell, whether a control signaling candidate comprised by the first search space set belongs to the target control signaling candidate set depends on whether there is any remaining blind detection capacity for the first node to monitor control signaling candidates and Non-overlapped CCEs after completion of a monitoring over all control signaling candidates comprised in a common search space in the first serving cell.

In one embodiment, the phrase that whether the first scheduled cell set comprises the target cell is used to determine whether a control signaling candidate comprised by the first search space set belongs to the target control signaling candidate set includes a meaning as follows: when the first scheduled cell set comprises the target cell, whether a control signaling candidate comprised by the first search space set belongs to the target control signaling candidate set depends on the first node's capability of blind detecting.

In one subembodiment, the blind detection capacity for the first node includes a maximum number of control channel candidates monitored by the first node for a serving cell in a DL BWP under the first SCS of the present disclosure and in the first time window.

In one subembodiment, the blind detection capacity for the first node includes a maximum number of Non-overlapped CCEs monitored by the first node for a serving cell in a DL BWP under the first SCS of the present disclosure and in the first time window In one embodiment, an SCS of subcarriers occupied by a control signaling candidate comprised by the target control signaling candidate set in frequency domain is the first SCS, and the first SCS is used to determine a length of the first time window.

In one subembodiment, the first time window is a slot, the first SCS is used for determining a number of slots comprised by a sub-frame, and the length of the first time window is equal to a ratio of a length of the sub-frame to the number of slots comprised by the sub-frame.

In one subembodiment, the first SCS is used for determining a time length of each OFDM symbol comprised by the first time window.

In one subembodiment, the first time window is a span, and the first SCS is used for determining a time length of each OFDM symbol comprised by the span.

In one subembodiment, a Configuration Index of the first SCS is used for determining the length of the first time window.

In one subembodiment, the first SCS is used for determining the length of the first time window according to corresponding relationship.

In one subembodiment, the first SCS is used for determining the length of the first time window according to table correspondence relationship.

In one embodiment, the first search space set is associated with a CORESET.

In one embodiment, the first search space set is associated with a CORESET Pool.

In one embodiment, there are at least two control signaling candidates among control signaling candidates in the target control signaling candidate set that respectively belong to two different search space sets.

In one subembodiment, either of the two different search space sets is the first search space set.

In one subembodiment, neither of the two different search space sets is the first search space set.

In one embodiment, any control signaling candidate in the target control signaling candidate set belongs to a search space set.

In one embodiment, the first search space set comprises M1 control channel candidates, M1 being a positive integer greater than 1.

In one subembodiment, any of the M1 control channel candidates employs the first SCS.

In one subembodiment, each of the M1 control channel candidates employs the first SCS.

In one subembodiment, there is at least one of the M1 control channel candidates employing the first SCS.

In one subembodiment, any of the M1 control channel candidates occupies a positive integer number of CCE(s).

In one subembodiment, any of the M1 control channel candidates occupies more than one RE.

In one subembodiment, any of the M1 control channel candidates occupies one of 1 CCE, 2 CCEs, 4 CCEs, 8 CCEs, or 16 CCEs.

In one subembodiment, any of the M1 control channel candidates is a PDCCH candidate that employs one or more DCI Payload Sizes.

In one subembodiment, any of the M1 control channel candidates is a time-frequency resource set carrying specific DCI of one or more formats.

In one embodiment, the action of monitoring a target control signaling candidate set in a first time window is implemented by decoding of control channel candidate(s) comprised in the target control signaling candidate set.

In one embodiment, the action of monitoring a target control signaling candidate set in a first time window is implemented by Blind Decoding of control channel candidate(s) comprised in the target control signaling candidate set.

In one embodiment, the action of monitoring a target control signaling candidate set in a first time window is implemented by decoding and Cyclic Redundancy Check (CRC) of control channel candidate(s) comprised in the target control signaling candidate set.

In one embodiment, the action of monitoring a target control signaling candidate set in a first time window is implemented by decoding and RNTI-scrambled CRC of control channel candidate(s) comprised in the target control signaling candidate set.

In one embodiment, the action of monitoring a target control signaling candidate set in a first time window is implemented by decoding of control channel candidate(s) comprised in the target control signaling candidate set.

In one embodiment, frequency-domain resources occupied by control signaling candidates comprised in the target control signaling candidate set are between 450 MHz and 6 GHz.

In one embodiment, frequency-domain resources occupied by control signaling candidates comprised in the target control signaling candidate set are between 24.25 GHz and 52.6 GHz.

In one embodiment, frequency-domain resources occupied by control signaling candidates comprised in the first search space set are between 450 MHz and 6 GHz.

In one embodiment, frequency-domain resources occupied by control signaling candidates comprised in the first search space set are between 24.25 GHz and 52.6 GHz.

Embodiment 2

Embodiment 2 illustrates a schematic diagram of a network architecture, as shown in FIG. 2.

FIG. 2 is a diagram illustrating a network architecture 200 of 5G NR. Long-Term Evolution (LTE), and Long-Term Evolution Advanced (LTE-A) systems. The 5G NR or LTE network architecture 200 may be called an Evolved Packet System (EPS) 200 or any other appropriate term. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones. Session Initiation Protocol (SIP) phones, laptop computers. Personal Digital Assistant (PDA). Satellite Radios. Non-terrestrial base station communications. Stellite mobile communications. Global Positioning Systems (GPSs), multimedia devices, video devices, digital audio players (for example MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 is a terminal supporting Massive MIMO.

In one embodiment, the UE 201 can receive a PDCCH on multiple TRPs.

In one embodiment, the gNB203 corresponds to the second node in the present disclosure.

In one embodiment, the gNB203 supports Massive MIMO.

In one embodiment, the gNB203 comprises multiple TRPs.

In one subembodiment, the multi-TRP is used for multi-beam transmission.

In one subembodiment, the multiple TRPs are connected through X2 interfaces.

In one subembodiment, the multiple TRPs are connected through Ideal Backhaul.

In one subembodiment, Coordination Delay between the multiple TRPs won't affect dynamic scheduling.

In one subembodiment, the multiple TRPs are coordinated by a unified scheduling processor.

In one subembodiment, the multiple TRPs are coordinated by a unified baseband processor.

In one embodiment, the gNB203 supports multi-beam transmission.

In one embodiment, the gNB203 is capable of serving the first node simultaneously on an LTE-A carrier and an NR carrier.

In one embodiment, an air interface between the UE 201 and the gNB203 is a Uu interface.

In one embodiment, a radio link between the UE 201 and the gNB203 is a cellular link.

In one embodiment, the UE 201 supports multicarrier transmissions.

In one embodiment, the UE 201 supports transmissions in which a secondary carrier cross-carrier schedules a primary carrier.

In one embodiment, the UE 201 supports multiple scheduling carriers in scheduling a scheduled carrier.

In one embodiment, the UE gNB203 supports multicarrier transmissions.

In one embodiment, the UE gNB203 supports transmissions in which a secondary carrier cross-carrier schedules a primary carrier.

In one embodiment, the UE gNB203 supports multiple scheduling carriers in scheduling a scheduled carrier.

Embodiment 3

Embodiment 3 illustrates a schematic diagram of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB. UE, or RSU in V2X) is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP 304 in the second communication node is used for generating scheduling of the first communication node.

In one embodiment, the PDCP 354 in the second communication node is used for generating scheduling of the first communication node.

In one embodiment, the first information block in the present disclosure is generated by the RRC 306.

In one embodiment, the first information block in the present disclosure is generated by the MAC302 and the MAC352.

In one embodiment, the first information block in the present disclosure is generated by the PHY301 and the PHY351.

In one embodiment, the second information block in the present disclosure is generated by the RRC 306.

In one embodiment, the second information block in the present disclosure is generated by the MAC302 and the MAC352.

In one embodiment, the second information block in the present disclosure is generated by the PHY301 and the PHY351.

In one embodiment, the third information block in the present disclosure is generated by the RRC 306.

In one embodiment, the third information block in the present disclosure is generated by the MAC302 and the MAC352.

In one embodiment, the third information block in the present disclosure is generated by the PHY301 and the PHY351.

In one embodiment, the fourth information block in the present disclosure is generated by the RRC 306.

In one embodiment, the fourth information block in the present disclosure is generated by the MAC302 and the MAC352.

In one embodiment, the fourth information block in the present disclosure is generated by the PHY301 and the PHY351.

In one embodiment, the fifth information block in the present disclosure is generated by the RRC 306.

In one embodiment, the fifth information block in the present disclosure is generated by the MAC302 and the MAC352.

In one embodiment, the sixth information block in the present disclosure is generated by the RRC 306.

In one embodiment, the sixth information block in the present disclosure is generated by the MAC302 and the MAC352.

In one embodiment, the sixth information block in the present disclosure is generated by the PHY301 and the PHY351.

In one embodiment, the first signaling in the present disclosure is generated by the PHY301 and the PHY351.

In one embodiment, the first information in the present disclosure is generated by the RRC 306. In one embodiment, the first information in the present disclosure is generated by the MAC302 and the MAC352.

In one embodiment, the first information in the present disclosure is generated by the PHY301 and the PHY351.

In one embodiment, the target information in the present disclosure is generated by the RRC 306.

In one embodiment, the target information in the present disclosure is generated by the MAC302 and the MAC352.

In one embodiment, the target information in the present disclosure is generated by the PHY301 and the PHY351.

In one embodiment, the first signal in the present disclosure is generated by the PHY301 and the PHY351.

In one embodiment, the first signal in the present disclosure is generated by the MAC302 and the MAC352.

In one embodiment, the first information in the present disclosure is generated by the RRC 306.

In one embodiment, the first information in the present disclosure is generated by the MAC302 and the MAC352.

In one embodiment, the first information in the present disclosure is generated by the PHY301 and the PHY351.

In one embodiment, the second information in the present disclosure is generated by the RRC 306.

In one embodiment, the second information in the present disclosure is generated by the MAC302 and the MAC352.

In one embodiment, the second information in the present disclosure is generated by the PHY301 and the PHY351.

Embodiment 4

Figure 4:
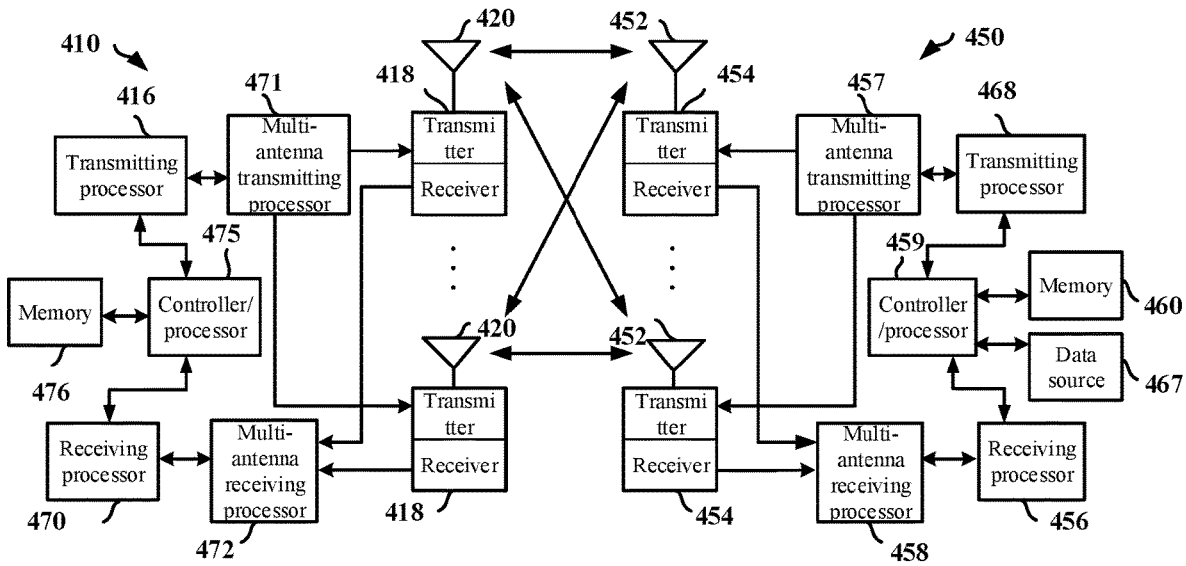
FIG. 4 illustrates a schematic diagram of a first communication device and a second communication device according to one embodiment of the present disclosure.

Embodiment 4 illustrates a schematic diagram of hardcore modules of a communication node according to one embodiment of the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK. QPSK. M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation. while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes: the at least one memory and the computer program codes are configured to be used in collaboration with the at least one processor. The first communication device 450 at least receives a first information block; and monitors M1 control channel candidates in a first time window, the M1 control channel candidates occupying M2 control channel elements. M1 being a positive integer greater than 1, and M2 being a positive integer greater than 1: the first information block is used to indicate a scheduled cell set, and serving cells comprised by the scheduled cell set are divided into a first cell group and a second cell group: the first cell group is different from the second cell group: the scheduled cell set comprises a target cell, and any of K1 scheduling cells is a scheduling cell for the target cell. K1 being a positive integer greater than 1: one of the M1 control channel candidates employs a first subcarrier spacing (SCS), and the first SCS is used to determine a length of the first time window: a number of control resource pool(s) comprised by at least one of the K1 scheduling cells is used to determine a cell group to which the target cell belongs from the first cell group and the second cell group: a first quantitative value is a number of serving cells comprised in the first cell group being associated with at least one of the M1 control channel candidates, and a second quantitative value is a number of serving cells comprised in the second cell group being associated with at least one of the M1 control channel candidates:

the first quantitative value, the second quantitative value and the target factor are used together for determining a first threshold and a second threshold: the target factor is a positive number: M1 is no greater than the first threshold, and M2 is no greater than the second threshold: both the first threshold and the second threshold are positive integers greater than 1.

In one embodiment, the first communication device 450 comprises a memory that stores a computer readable instruction program. The computer readable instruction program generates actions when executed by at least one processor. The actions include: receiving a first information block; and monitoring M1 control channel candidates in a first time window, the M1 control channel candidates occupying M2 control channel elements. M1 being a positive integer greater than 1, and M2 being a positive integer greater than 1: the first information block is used to indicate a scheduled cell set, and serving cells comprised by the scheduled cell set are divided into a first cell group and a second cell group: the first cell group is different from the second cell group: the scheduled cell set comprises a target cell, and any of K1 scheduling cells is a scheduling cell for the target cell. K1 being a positive integer greater than 1: one of the M1 control channel candidates employs a first subcarrier spacing (SCS), and the first SCS is used to determine a length of the first time window: a number of control resource pool(s) comprised by at least one of the K1 scheduling cells is used to determine a cell group to which the target cell belongs from the first cell group and the second cell group: a first quantitative value is a number of serving cells comprised in the first cell group being associated with at least one of the M1 control channel candidates, and a second quantitative value is a number of serving cells comprised in the second cell group being associated with at least one of the M1 control channel candidates: the first quantitative value, the second quantitative value and the target factor are used together for determining a first threshold and a second threshold: the target factor is a positive number: M1 is no greater than the first threshold, and M2 is no greater than the second threshold: both the first threshold and the second threshold are positive integers greater than 1.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a first information block; and determines M1 control channel candidates in a first time window, the M1 control channel candidates occupying M2 control channel elements. M1 being a positive integer greater than 1, and M2 being a positive integer greater than 1: the first information block is used to indicate a scheduled cell set, and serving cells comprised by the scheduled cell set are divided into a first cell group and a second cell group: the first cell group is different from the second cell group: the scheduled cell set comprises a target cell, and any of K1 scheduling cells is a scheduling cell for the target cell. K1 being a positive integer greater than 1: one of the M1 control channel candidates employs a first subcarrier spacing (SCS), and the first SCS is used to determine a length of the first time window: a number of control resource pool(s) comprised by at least one of the K1 scheduling cells is used to determine a cell group to which the target cell belongs from the first cell group and the second cell group: a first quantitative value is a number of serving cells comprised in the first cell group being associated with at least one of the M1 control channel candidates, and a second quantitative value is a number of serving cells comprised in the second cell group being associated with at least one of the M1 control channel candidates; the first quantitative value, the second quantitative value and the target factor are used together for determining a first threshold and a second threshold: the target factor is a positive number: M1 is no greater than the first threshold, and M2 is no greater than the second threshold: both the first threshold and the second threshold are positive integers greater than 1.

In one embodiment, the second communication device 410 comprises a memory that stores a computer readable instruction program. The computer readable instruction program generates actions when executed by at least one processor. The actions include: transmitting a first information block; and determining M1 control channel candidates in a first time window, the M1 control channel candidates occupying M2 control channel elements. M1 being a positive integer greater than 1, and M2 being a positive integer greater than 1: the first information block is used to indicate a scheduled cell set, and serving cells comprised by the scheduled cell set are divided into a first cell group and a second cell group: the first cell group is different from the second cell group: the scheduled cell set comprises a target cell, and any of K1 scheduling cells is a scheduling cell for the target cell. K1 being a positive integer greater than 1: one of the M1 control channel candidates employs a first subcarrier spacing (SCS), and the first SCS is used to determine a length of the first time window: a number of control resource pool(s) comprised by at least one of the K1 scheduling cells is used to determine a cell group to which the target cell belongs from the first cell group and the second cell group: a first quantitative value is a number of serving cells comprised in the first cell group being associated with at least one of the M1 control channel candidates, and a second quantitative value is a number of serving cells comprised in the second cell group being associated with at least one of the M1 control channel candidates: the first quantitative value, the second quantitative value and the target factor are used together for determining a first threshold and a second threshold: the target factor is a positive number: M1 is no greater than the first threshold, and M2 is no greater than the second threshold: both the first threshold and the second threshold are positive integers greater than 1.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the first communication device 450 is a terminal.

In one embodiment, the second communication device 410 is a base station.

In one embodiment, at least the first four of the antenna 452, the receiver 454, the multi-antenna receiving processor 458, the receiving processor 456 and the controller/processor 459 are used for receiving a first information block: at least the first four of the antenna 420, the transmitter 418, the multi-antenna transmitting processor 471, the transmitting processor 416 and the controller/processor 475 are used for transmitting the first information block.

In one embodiment, at least the first four of the antenna 452, the receiver 454, the multi-antenna receiving processor 458, the receiving processor 456 and the controller/processor 459 are used for monitoring M1 control channel candidates in a first time window: at least the first four of the antenna 420, the transmitter 418, the multi-antenna transmitting processor 471, the transmitting processor 416 and the controller/processor 475 are used for determining the M1 control channel candidates in the first time window.

In one embodiment, at least the first four of the antenna 452, the transmitter 454, the multi-antenna transmitting processor 457, the transmitting processor 468 and the controller/processor 459 are used for transmitting a second information block: at least the first four of the antenna 420, the receiver 418, the multi-antenna receiving processor 472, the receiving processor 470 and the controller/processor 475 are used for receiving the second information block in a second time-frequency resource set.

In one embodiment, at least the first four of the antenna 452, the receiver 454, the multi-antenna receiving processor 458, the receiving processor 456 and the controller/processor 459 are used for receiving a third information block: at least the first four of the antenna 420, the transmitter 418, the multi-antenna transmitting processor 471, the transmitting processor 416 and the controller/processor 475 are used for transmitting the third information block.

In one embodiment, at least the first four of the antenna 452, the transmitter 454, the multi-antenna transmitting processor 457, the transmitting processor 468 and the controller/processor 459 are used for transmitting a fourth information block: at least the first four of the antenna 420, the receiver 418, the multi-antenna receiving processor 472, the receiving processor 470) and the controller/processor 475 are used for receiving the fourth information block in a second time-frequency resource set.

In one embodiment, at least the first four of the antenna 452, the transmitter 454, the multi-antenna transmitting processor 457, the transmitting processor 468 and the controller/processor 459 are used for transmitting a fifth information block: at least the first four of the antenna 420, the receiver 418, the multi-antenna receiving processor 472, the receiving processor 470 and the controller/processor 475 are used for receiving the fifth information block in a second time-frequency resource set.

In one embodiment, at least the first four of the antenna 452, the receiver 454, the multi-antenna receiving processor 458, the receiving processor 456 and the controller/processor 459 are used for receiving a sixth information block: at least the first four of the antenna 420, the transmitter 418, the multi-antenna transmitting processor 471, the transmitting processor 416 and the controller/processor 475 are used for transmitting the sixth information block.

In one embodiment, at least the first four of the antenna 452, the receiver 454, the multi-antenna receiving processor 458, the receiving processor 456 and the controller/processor 459 are used for receiving a first signaling in M1 control channel candidates: at least the first four of the antenna 420, the transmitter 418, the multi-antenna transmitting processor 471, the transmitting processor 416 and the controller/processor 475 are used for transmitting the first signaling in the M1 control channel candidates.

In one embodiment, the first communication device 450 comprises at least one processor and at least one memory. The at least one memory comprises computer program codes: the at least one memory and the computer program codes are configured to be used in collaboration with the at least one processor. The first communication device 450 at least firstly receives first information, the first information being used to indicate a first search space set and a second search space set, the first search space set comprising a positive integer number of control signaling candidate(s), and the second search space set comprising a positive integer number of control signaling candidate(s), a first Search Space Set ID and a second Search Space Set ID being used to respectively identify the first search space set and the second search space set; and then monitors a target control signaling candidate set in a first time window, the target control signaling candidate set comprising a positive integer number of control signaling candidate(s): time-frequency resources occupied by control signaling candidate(s) comprised in the first search space set belong to a first resource pool, while time-frequency resources occupied by control signaling candidate(s) comprised in the second search space set belong to a second resource pool: the first resource pool and the second resource pool are respectively associated with a first index and a second index, the first index and the second index being non-negative integers, respectively: any control signaling candidate comprised by the second search space set belongs to the target control signaling candidate set: the first index and the second index are jointly used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, the first communication device 450 comprises a memory that stores a computer readable instruction program. The computer readable instruction program generates actions when executed by at least one processor. The actions include: firstly receiving first information, the first information being used to indicate a first search space set and a second search space set, the first search space set comprising a positive integer number of control signaling candidate(s), and the second search space set comprising a positive integer number of control signaling candidate(s), a first Search Space Set ID and a second Search Space Set ID being used to respectively identify the first search space set and the second search space set; and then monitoring a target control signaling candidate set in a first time window, the target control signaling candidate set comprising a positive integer number of control signaling candidate(s); time-frequency resources occupied by control signaling candidate(s) comprised in the first search space set belong to a first resource pool, while time-frequency resources occupied by control signaling candidate(s) comprised in the second search space set belong to a second resource pool: the first resource pool and the second resource pool are respectively associated with a first index and a second index, the first index and the second index being non-negative integers, respectively: any control signaling candidate comprised by the second search space set belongs to the target control signaling candidate set: the first index and the second index are jointly used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, the second communication device 410 comprises at least one processor and at least one memory. The at least one memory comprises computer program codes. The at least one memory and the computer program codes are configured to be used in collaboration with the at least one processor. The second communication device 410 at least firstly transmits first information, the first information being used to indicate a first search space set and a second search space set, the first search space set comprising a positive integer number of control signaling candidate(s), and the second search space set comprising a positive integer number of control signaling candidate(s), a first Search Space Set ID and a second Search Space Set ID being used to respectively identify the first search space set and the second search space set; and then determines a target control signaling candidate set in a first time window, the target control signaling candidate set comprising a positive integer number of control signaling candidate(s): time-frequency resources occupied by control signaling candidate(s) comprised in the first search space set belong to a first resource pool, while time-frequency resources occupied by control signaling candidate(s) comprised in the second search space set belong to a second resource pool: the first resource pool and the second resource pool are respectively associated with a first index and a second index, the first index and the second index being non-negative integers, respectively: any control signaling candidate comprised by the second search space set belongs to the target control signaling candidate set: the first index and the second index are jointly used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, the second communication device 410 comprises a memory that stores a computer readable instruction program. The computer readable instruction program generates actions when executed by at least one processor. The actions include: firstly transmitting first information, the first information being used to indicate a first search space set and a second search space set, the first search space set comprising a positive integer number of control signaling candidate(s), and the second search space set comprising a positive integer number of control signaling candidate(s), a first Search Space Set ID and a second Search Space Set ID being used to respectively identify the first search space set and the second search space set; and then determining a target control signaling candidate set in a first time window, the target control signaling candidate set comprising a positive integer number of control signaling candidate(s); time-frequency resources occupied by control signaling candidate(s) comprised in the first search space set belong to a first resource pool, while time-frequency resources occupied by control signaling candidate(s) comprised in the second search space set belong to a second resource pool: the first resource pool and the second resource pool are respectively associated with a first index and a second index, the first index and the second index being non-negative integers, respectively: any control signaling candidate comprised by the second search space set belongs to the target control signaling candidate set: the first index and the second index are jointly used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, at least the first four of the antenna 452, the receiver 454, the multi-antenna receiving processor 458, the receiving processor 456 and the controller/processor 459 are used for receiving first information: at least the first four of the antenna 420, the transmitter 418, the multi-antenna transmitting processor 471, the transmitting processor 416 and the controller/processor 475 are used for transmitting first information.

In one embodiment, at least the first four of the antenna 452, the receiver 454, the multi-antenna receiving processor 458, the receiving processor 456 and the controller/processor 459 are used for monitoring a target control signaling candidate set in a first time window: at least the first four of the antenna 420, the transmitter 418, the multi-antenna transmitting processor 471, the transmitting processor 416 and the controller/processor 475 are used for determining the target control signaling candidate set in the first time window.

In one embodiment, at least the first four of the antenna 452, the transmitter 454, the multi-antenna transmitting processor 457, the transmitting processor 468 and the controller/processor 459 are used for transmitting target information: at least the first four of the antenna 420, the receiver 418, the multi-antenna receiving processor 472, the receiving processor 470 and the controller/processor 475 are used for receiving the target information in a second time-frequency resource set.

In one embodiment, at least the first four of the antenna 452, the receiver 454, the multi-antenna receiving processor 458, the receiving processor 456 and the controller/processor 459 are used for receiving a first signaling: at least the first four of the antenna 420, the transmitter 418, the multi-antenna transmitting processor 471, the transmitting processor 416 and the controller/processor 475 are used for transmitting the first signaling.

In one embodiment, at least the first four of the antenna 452, the receiver 454, the multi-antenna receiving processor 458, the receiving processor 456 and the controller/processor 459 are used for receiving a first signal: at least the first four of the antenna 420, the transmitter 418, the multi-antenna transmitting processor 471, the transmitting processor 416 and the controller/processor 475 are used for transmitting the first signal.

In one embodiment, at least the first four of the antenna 452, the transmitter 454, the multi-antenna transmitting processor 457, the transmitting processor 468 and the controller/processor 459 are used for transmitting a first signal: at least the first four of the antenna 420, the receiver 418, the multi-antenna receiving processor 472, the receiving processor 470 and the controller/processor 475 are used for receiving the first signal on a first channel.

In one embodiment, the first communication device 450 comprises at least one processor and at least one memory. The at least one memory comprises computer program codes: the at least one memory and the computer program codes are configured to be used in collaboration with the at least one processor. The first communication device 450 at least firstly receives first information, the first information being used to indicate a first search space set; and then monitors a target control signaling candidate set in a first time window, the target control signaling candidate set comprising a positive integer number of control signaling candidate(s): the first search space set comprises a positive integer number of control signaling candidate(s); frequency-domain resources occupied by any control signaling candidate comprised by the first search space set belong to a first serving cell, and a first scheduled cell set comprises a scheduled cell of the first serving cell: a target cell is a serving cell other than the first serving cell, whether the first scheduled cell set comprises the target cell is used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, the first communication device 450 comprises a memory that stores a computer readable instruction program. The computer readable instruction program generates actions when executed by at least one processor. The actions include: firstly receiving first information, the first information being used to indicate a first search space set; and then monitoring a target control signaling candidate set in a first time window, the target control signaling candidate set comprising a positive integer number of control signaling candidate(s): the first search space set comprises a positive integer number of control signaling candidate(s): frequency-domain resources occupied by any control signaling candidate comprised by the first search space set belong to a first serving cell, and a first scheduled cell set comprises a scheduled cell of the first serving cell: a target cell is a serving cell other than the first serving cell, whether the first scheduled cell set comprises the target cell is used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, the second communication device 410 comprises at least one processor and at least one memory. The at least one memory comprises computer program codes. The at least one memory and the computer program codes are configured to be used in collaboration with the at least one processor. The second communication device 410 at least firstly transmits first information, the first information being used to indicate a first search space set; and then determines a target control signaling candidate set in a first time window, the target control signaling candidate set comprising a positive integer number of control signaling candidate(s): the first search space set comprises a positive integer number of control signaling candidate(s); frequency-domain resources occupied by any control signaling candidate comprised by the first search space set belong to a first serving cell, and a first scheduled cell set comprises a scheduled cell of the first serving cell: a target cell is a serving cell other than the first serving cell, whether the first scheduled cell set comprises the target cell is used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, the second communication device 410 comprises a memory that stores a computer readable instruction program. The computer readable instruction program generates actions when executed by at least one processor. The actions include: firstly transmitting first information, the first information being used to indicate a first search space set; and then determining a target control signaling candidate set in a first time window, the target control signaling candidate set comprising a positive integer number of control signaling candidate(s): the first search space set comprises a positive integer number of control signaling candidate(s); frequency-domain resources occupied by any control signaling candidate comprised by the first search space set belong to a first serving cell, and a first scheduled cell set comprises a scheduled cell of the first serving cell: a target cell is a serving cell other than the first serving cell, whether the first scheduled cell set comprises the target cell is used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, at least the first four of the antenna 452, the receiver 454, the multi-antenna receiving processor 458, the receiving processor 456 and the controller/processor 459 are used for receiving first information, the first information being used to indicate a first search space set: at least the first four of the antenna 420, the transmitter 418, the multi-antenna transmitting processor 471, the transmitting processor 416 and the controller/processor 475 are used for transmitting the first information, the first information being used to indicate a first search space set.

In one embodiment, at least the first four of the antenna 452, the receiver 454, the multi-antenna receiving processor 458, the receiving processor 456 and the controller/processor 459 are used for monitoring a target control signaling candidate set in a first time window, the target control signaling candidate set comprising a positive integer number of control signaling candidate(s): at least the first four of the antenna 420, the transmitter 418, the multi-antenna transmitting processor 471, the transmitting processor 416 and the controller/processor 475 are used for determining the target control signaling candidate set in the first time window, the target control signaling candidate set comprising a positive integer number of control signaling candidate(s).

In one embodiment, at least the first four of the antenna 452, the transmitter 454, the multi-antenna transmitting processor 457, the transmitting processor 468 and the controller/processor 459 are used for transmitting second information: at least the first four of the antenna 420, the receiver 418, the multi-antenna receiving processor 472, the receiving processor 470 and the controller/processor 475 are used for receiving the second information in a second time-frequency resource set.

In one embodiment, at least the first four of the antenna 452, the receiver 454, the multi-antenna receiving processor 458, the receiving processor 456 and the controller/processor 459 are used for receiving a first signaling: at least the first four of the antenna 420, the transmitter 418, the multi-antenna transmitting processor 471, the transmitting processor 416 and the controller/processor 475 are used for transmitting the first signaling.

Embodiment 5A

Figures 5A, 5B:
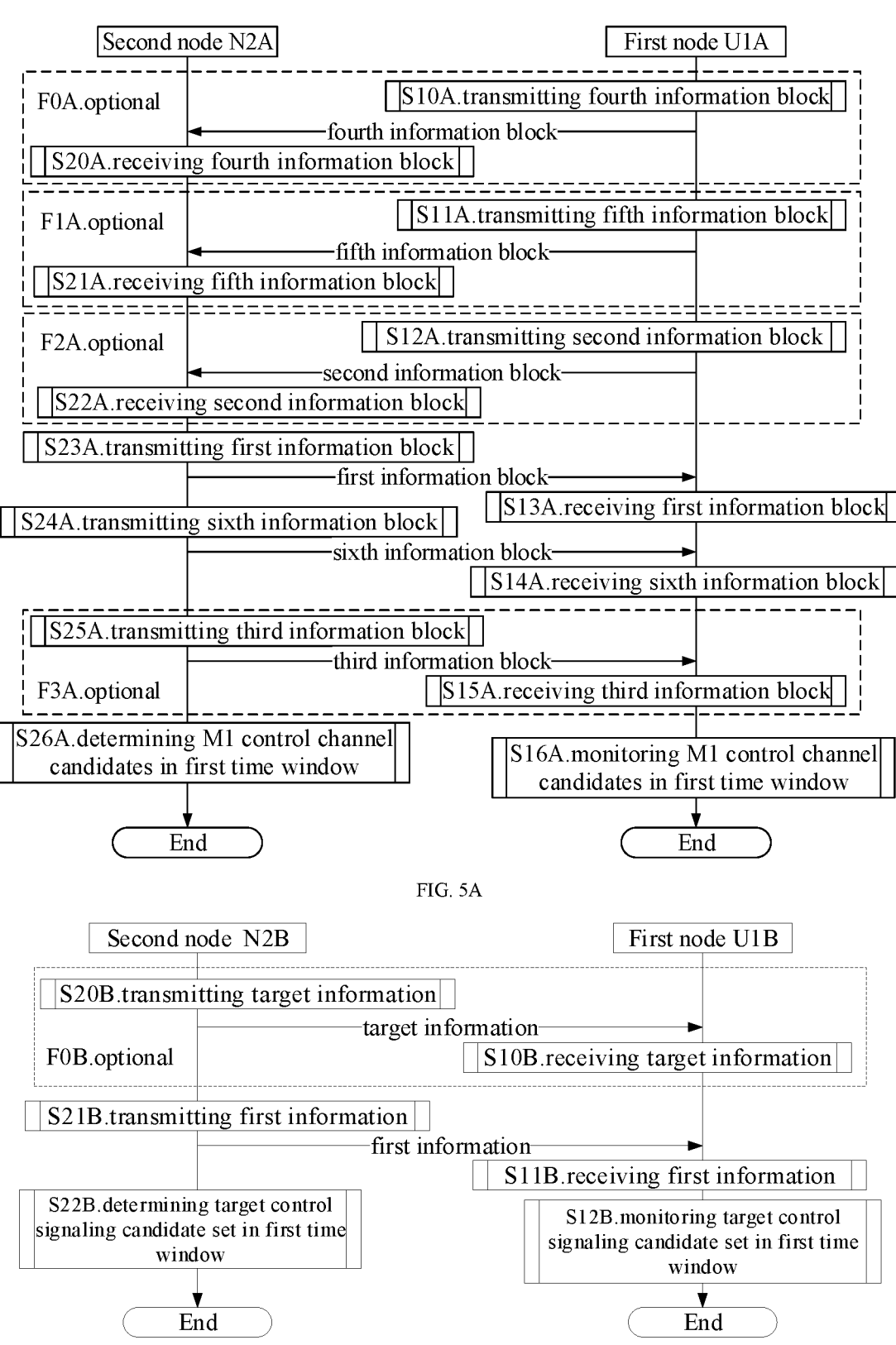
FIG. 5A illustrates a flowchart of a first information block according to one embodiment of the present disclosure.
FIG. 5B illustrates a flowchart of first information according to one embodiment of the present disclosure.

Embodiment 5A illustrates a flowchart of a first information block, as shown in FIG. 5A. In FIG. 5A, a first node U1A and a second node N2A are in communications via a radio link. If no conflict is incurred, embodiments, subembodiments and subsidiary embodiments illustrated in the Embodiment 5A are applicable to Embodiment 6A; and vice versa, embodiments, subembodiments and subsidiary embodiments illustrated in the Embodiment 6A are also applicable to Embodiment 5A. It is particularly noted that the sequences of these embodiments do not set any restriction over the orders of signal transmissions and implementations in the present disclosure. Steps respectively identified by the boxes FOA. FIA. F2A and F3A are optional.

The first node U1A transmits a fourth information block in step S10A, transmits a fifth information block in step S11A, and transmits a second information block in step S12A, receives a first information block in step S13A, receives sixth information in step S14A, receives a third information block in step S15A, and monitors M1 control channel candidates in a first time window in step S16A.

The second node N2A receives a fourth information block in step S20A, receives a fifth information block in step S21A, and receives a second information block in step S22A, transmits a first information block in step S23A, transmits sixth information in step S24A, transmits a third information block in step S25A, and determines M1 control channel candidates in a first time window in step S26A.

In Embodiment 5A, the first information block is used to indicate a scheduled cell set, and serving cells comprised by the scheduled cell set are divided into a first cell group and a second cell group: the first cell group is different from the second cell group: the scheduled cell set comprises a target cell, and any of K1 scheduling cells is a scheduling cell for the target cell. K1 being a positive integer greater than 1: one of the M1 control channel candidates employs a first subcarrier spacing (SCS), and the first SCS is used to determine a length of the first time window: a number of control resource pool(s) comprised by at least one of the K1 scheduling cells is used to determine a cell group to which the target cell belongs from the first cell group and the second cell group: a first quantitative value is a number of serving cells comprised in the first cell group being associated with at least one of the M1 control channel candidates, and a second quantitative value is a number of serving cells comprised in the second cell group being associated with at least one of the M1 control channel candidates: the first quantitative value, the second quantitative value and the target factor are used together for determining a first threshold and a second threshold: the target factor is a positive number: M1 is no greater than the first threshold, and M2 is no greater than the second threshold: both the first threshold and the second threshold are positive integers greater than 1.

In one embodiment, the second information block is transmitted via an air interface.

In one embodiment, the second information block is transmitted via a wireless interface.

In one embodiment, the second information block comprises all or part of a higher layer signaling.

In one embodiment, the second information block comprises all or part of a physical layer signaling.

In one embodiment, the second information block comprises all or part of an RRC signaling.

In one embodiment, the second information block comprises all or part of a MAC layer signaling.

In one embodiment, the second information block is transmitted via an Uplink Shared Channel (UL-SCH).

In one embodiment, the second information block is transmitted via a Physical Uplink Shared Channel (PUSCH).

In one embodiment, the second information block is Carrier-Specific.

In one embodiment, the second information block is used for indicating capabilities of the first node U1A in the present disclosure.

In one embodiment, the phrase that the second information block is used to indicate a first candidate factor from a first candidate factor set includes a meaning as follows: the second information block is used by the first node U1A to indicate a first candidate factor from a first candidate factor set.

In one embodiment, the phrase that the second information block is used to indicate a first candidate factor from a first candidate factor set includes a meaning as follows: the second information block is used to explicitly indicate a first candidate factor from a first candidate factor set.

In one embodiment, the phrase that the second information block is used to indicate a first candidate factor from a first candidate factor set includes a meaning as follows: the second information block is used to implicitly indicate a first candidate factor from a first candidate factor set.

In one embodiment, the second information block is used to indicate CA or Dual Connectivity (DC) capabilities of the first node U1A.

In one embodiment, the second information block comprises one or more fields in a Phy-Parameters IE.

In one embodiment, the second information block comprises a BDFactorR field in a Phy-Parameters IE.

In one embodiment, the third information block is transmitted via an air interface.

In one embodiment, the third information block is transmitted via a wireless interface.

In one embodiment, the third information block comprises all or part of a higher layer signaling.

In one embodiment, the third information block comprises all or part of a physical layer signaling.

In one embodiment, the third information block comprises all or part of an RRC signaling.

In one embodiment, the third information block comprises all or part of a MAC layer signaling.

In one embodiment, the third information block comprises all or part of a SIB.

In one embodiment, the third information block is transmitted through a PDSCH.

In one embodiment, the third information block is UE-specific.

In one embodiment, the third information block is configured Per Serving Cell.

In one embodiment, the third information block comprises all or part of fields of a DCI signaling.

In one embodiment, the phrase that the third information block is used to determine whether the target factor is equal to the first candidate factor includes a meaning as follows: the third information block is used by the first node U1A to determine whether the target factor is equal to the first candidate factor.

In one embodiment, the phrase that the third information block is used to determine whether the target factor is equal to the first candidate factor includes a meaning as follows: the third information block is used to explicitly determine whether the target factor is equal to the first candidate factor.

In one embodiment, the phrase that the third information block is used to determine whether the target factor is equal to the first candidate factor includes a meaning as follows: the third information block is used to implicitly determine whether the target factor is equal to the first candidate factor.

In one embodiment, the third information block comprises a BDFactorR field in an RRC signaling.

In one embodiment, the third information block comprises a CORESETPoolIndex field in a ControlResourceSet IE comprised by a PDCCH-Config IE in an RRC signaling.

In one embodiment, the third information block comprises a PDCCH-Config IE in an RRC signaling.

In one embodiment, the third information block comprises a ControlResourceSet IE comprised by a PDCCH-Config IE in an RRC signaling.

In one embodiment, the third information block comprises a BDFactorR field in a ControlResourceSet IE comprised by a PDCCH-Config IE in an RRC signaling.

In one embodiment, the third information block comprises a BDFactorR field comprised by a PDCCH-Config IE in an RRC signaling.

In one embodiment, the third information block and the first information block in the present disclosure are carried respectively by two different RRC signalings.

In one embodiment, the third information block and the first information block are carried by two different IEs in a same RRC signaling.

In one embodiment, the third information block and the first information block are carried by two different fields of a same IE in a same RRC signaling.

In one embodiment, the fourth information block is transmitted via an air interface.

In one embodiment, the fourth information block is transmitted via a wireless interface.

In one embodiment, the fourth information block comprises all or part of a higher layer signaling.

In one embodiment, the fourth information block comprises all or part of a physical layer signaling.

In one embodiment, the fourth information block comprises all or part of an RRC signaling.

In one embodiment, the fourth information block comprises all or part of a MAC layer signaling.

In one embodiment, the fourth information block is transmitted via a UL-SCH.

In one embodiment, the fourth information block is transmitted via a PUSCH.

In one embodiment, the fourth information block is used for indicating capabilities of the first node U1A in the present disclosure.

In one embodiment, the fourth information block and the second information block in the present disclosure are carried respectively by two different RRC signalings.

In one embodiment, the fourth information block and the second information block are carried by two different IEs in a same RRC signaling.

In one embodiment, the fourth information block and the second information block are carried by two different fields of a same IE in a same RRC signaling.

In one embodiment, the phrase that the fourth information block is used to indicate the first candidate factor set out of the G candidate factor sets includes a meaning that the fourth information block is used by the first node U1A to indicate the first candidate factor set out of the G candidate factor sets.

In one embodiment, the phrase that the fourth information block is used to indicate the first candidate factor set out of the G candidate factor sets includes a meaning that the fourth information block is used to explicitly indicate the first candidate factor set out of the G candidate factor sets.

In one embodiment, the phrase that the fourth information block is used to indicate the first candidate factor set out of the G candidate factor sets includes a meaning that the fourth information block is used to implicitly indicate the first candidate factor set out of the G candidate factor sets.

In one embodiment, the fourth information block is used for indicating CA or DC capability of the first node U1A in the present disclosure.

In one embodiment, the fourth information block comprises one or more fields of a "Phy-Parameters" IE.

In one embodiment, the fourth information block is used for indicating capabilities of the first node U1A in the present disclosure.

In one embodiment, the fourth information block is used for indicating a capability of whether the first node U1A in the present disclosure supports a Scell in cross-carrier scheduling a Pcell.

In one embodiment, the fourth information block is used for indicating a capability of whether the first node U1A in the present disclosure supports more than one serving cell in scheduling a same serving cell.

In one embodiment, the second information block and fourth information block are carried by two different RRC signalings.

In one embodiment, the second information block and fourth information block are carried by two different IEs in a same RRC signaling.

In one embodiment, the second information block and fourth information block are carried by two different fields of a same IE in a same RRC signaling.

In one embodiment, the fifth information block is transmitted via an air interface.

In one embodiment, the fifth information block is transmitted via a wireless interface.

In one embodiment, the fifth information block comprises all or part of a higher layer signaling.

In one embodiment, the fifth information block comprises all or part of a physical layer signaling.

In one embodiment, the fifth information block comprises all or part of an RRC signaling.

In one embodiment, the fifth information block comprises all or part of a MAC layer signaling.

In one embodiment, the fifth information block is transmitted via a UL-SCH.

In one embodiment, the fifth information block is transmitted via a PUSCH.

In one embodiment, the fifth information block is UE-specific.

In one embodiment, the fifth information block is used for indicating capabilities of the first node U1A in the present disclosure.

In one embodiment, the fifth information block is used for indicating CA or DC capability of the first node U1A in the present disclosure.

In one embodiment, the fifth information block is used for indicating blind detection capability of the first node U1A in the present disclosure.

In one embodiment, the fifth information block comprises a Phy-Parameters IE.

In one embodiment, the fifth information block comprises a pdcch-BlindDetectionCA-r16 field of a Phy-Parameters IE.

In one embodiment, the fifth information block comprises a pdcch-BlindDetectionCA-r15 field of a Phy-Parameters IE.

In one embodiment, the fifth information block comprises a pdcch-BlindDetectionCA-r17 field of a Phy-Parameters IE.

In one embodiment, the fifth information block comprises a pdcch-BlindDetectionCA field of a Phy-Parameters IE.

In one embodiment, the fifth information block comprises a pdcch-BlindDetectionNRDC field of a Phy-Parameters IE.

In one embodiment, the fifth information block comprises a pdcch-BlindDetectionMCG-UE field of a Phy-Parameters IE.

In one embodiment, the fifth information block comprises a pdcch-BlindDetectionSCG-UE field of a Phy-Parameters IE.

In one embodiment, the fifth information block and the second information block in the present disclosure are carried by two different RRC signalings.

In one embodiment, the fifth information block and the second information block in the present disclosure are carried by two different IEs in a same RRC signaling.

In one embodiment, the fifth information block and the second information block in the present disclosure are carried by two different fields of a same IE in a same RRC signaling.

In one embodiment, the fifth information block and the fourth information block in the present disclosure are carried by two different RRC signalings.

In one embodiment, the fifth information block and the fourth information block in the present disclosure are carried by two different IEs in a same RRC signaling.

In one embodiment, the fifth information block and the fourth information block in the present disclosure are carried by two different fields of a same IE in a same RRC signaling.

In one embodiment, the phrase that the fifth information block is used to indicate the second parameter includes a meaning that the fifth information block is used by the first node U1A to indicate the second parameter.

In one embodiment, the phrase that the fifth information block is used to indicate the second parameter includes a meaning that the fifth information block is used to explicitly indicate the second parameter.

In one embodiment, the phrase that the fifth information block is used to indicate the second parameter includes a meaning that the fifth information block is used to implicitly indicate the second parameter.

In one embodiment, the sixth information block is transmitted via an air interface.

In one embodiment, the sixth information block is transmitted via a wireless interface.

In one embodiment, the sixth information block comprises all or part of a higher layer signaling.

In one embodiment, the sixth information block comprises all or part of a physical layer signaling.

In one embodiment, the sixth information block comprises all or part of an RRC signaling.

In one embodiment, the sixth information block comprises all or part of a MAC layer signaling.

In one embodiment, the sixth information block comprises all or part of a SIB.

In one embodiment, the sixth information block is transmitted via a Downlink Shared Channel (DL-SCH).

In one embodiment, the sixth information block is transmitted via a PDSCH.

In one embodiment, the sixth information block is cell-specific.

In one embodiment, the sixth information block is UE-specific.

In one embodiment, the sixth information block is specific to the first node U1A.

In one embodiment, the sixth information block is configured Per Serving Cell.

In one embodiment, the sixth information block comprises all or part of fields of a DCI signaling.

In one embodiment, the sixth information block comprises more than one sub-information-block, and each sub-information-block comprised by the sixth information block is an IE or a field in an RRC signaling to which the sixth information block belongs: a sub-information-block comprised by the sixth information block is used for indicating the M1 control channel candidates, a sub-information-block comprised by the sixth information block is used for indicating the M2 CCEs, and a sub-information-block comprised by the sixth information block is used for indicating a number of control resource pools in a scheduling cell of the first serving cell.

In one embodiment, the sixth information block comprises a CORESETPoolIndex field of a ControlResourceSet IE in an RRC signaling.

In one embodiment, the sixth information block comprises all or part of fields of a PDCCH-Config IE in an RRC signaling.

In one embodiment, the sixth information block comprises all or part of fields of a ControlResourceSet IE comprised by a PDCCH-Config IE in an RRC signaling.

In one embodiment, the sixth information block comprises a frequency DomainResources field of a ControlResourceSet IE in an RRC signaling.

In one embodiment, the sixth information block comprises a duration field of a ControlResourceSet IE in an RRC signaling.

In one embodiment, the sixth information block comprises a cce-REG-MappingType field of a ControlResourceSet IE in an RRC signaling.

In one embodiment, the sixth information block comprises all or part of fields of a SearchSpace IE in an RRC signaling.

In one embodiment, the sixth information block comprises a nrofCandidates field of a SearchSpace IE in an RRC signaling.

In one embodiment, the sixth information block comprises a monitoringSlotPeriodicity AndOffset field of a SearchSpace IE in an RRC signaling.

In one embodiment, the sixth information block comprises a monitoringSymbols WithinSlot field of a SearchSpace IE in an RRC signaling.

In one embodiment, the sixth information block comprises a CORESETPoolIndex field of a ControlResourceSet IE in an RRC signaling, and the sixth information block comprises a duration field of a ControlResourceSet IE in an RRC signaling, and the sixth information block comprises all or part of fields of a SearchSpace IE in an RRC signaling.

In one embodiment, the sixth information block and the third information block in the present disclosure are carried by two different RRC signalings.

In one embodiment, the sixth information block and the third information block in the present disclosure are carried by two different IEs in a same RRC signaling.

In one embodiment, the sixth information block and the third information block in the present disclosure are carried by two different fields of a same IE in a same RRC signaling.

In one embodiment, the sixth information block comprises more than one sub-information-block, and each sub-information-block comprised by the sixth information block is an IE or a field in an RRC signaling to which the sixth information block belongs; a sub-information-block comprised by the sixth information block and the third information block of the present disclosure are carried by two different fields of a same IE in a same RRC signaling.

In one embodiment, the sixth information block comprises more than one sub-information-block, and each sub-information-block comprised by the sixth information block is an IE or a field in an RRC signaling to which the sixth information block belongs: a sub-information-block comprised by the sixth information block and the third information block of the present disclosure are carried by two different fields of a ControlResourceSet IE in a same RRC signaling.

In one embodiment, the phrase that the sixth information block is used to determine at least one of the M1 control channel candidates, the M2 control channel elements, or the number of control resource pools configured by any of the K1 scheduling cells means that: the sixth information block is used by the first node U1A to determine at least one of the M1 control channel candidates, the M2 control channel elements, or the number of control resource pools configured by any of the K1 scheduling cells.

In one embodiment, the phrase that the sixth information block is used to determine at least one of the M1 control channel candidates, the M2 control channel elements, or the number of control resource pools configured by any of the K1 scheduling cells means that: the sixth information block is used to explicitly determine at least one of the M1 control channel candidates, the M2 control channel elements, or the number of control resource pools configured by any of the K1 scheduling cells.

In one embodiment, the phrase that the sixth information block is used to determine at least one of the M1 control channel candidates, the M2 control channel elements, or the number of control resource pools configured by any of the K1 scheduling cells means that: the sixth information block is used to implicitly determine at least one of the M1 control channel candidates, the M2 control channel elements, or the number of control resource pools configured by any of the K1 scheduling cells.

In one embodiment, the phrase that the sixth information block is used to determine at least one of the M1 control channel candidates, the M2 control channel elements, or the number of control resource pools configured by any of the K1 scheduling cells means that: the sixth information block is used to determine the M1 control channel candidates, the M2 control channel elements, and the number of control resource pools configured by any of the K1 scheduling cells.

In one embodiment, the phrase that the sixth information block is used to determine at least one of the M1 control channel candidates, the M2 control channel elements, or the number of control resource pools configured by any of the K1 scheduling cells means that: the sixth information block is used to determine one of the M1 control channel candidates, the M2 control channel elements, and the number of control resource pools configured by any of the K1 scheduling cells.

In one embodiment, the phrase that the sixth information block is used to determine at least one of the M1 control channel candidates, the M2 control channel elements, or the number of control resource pools configured by any of the K1 scheduling cells means that: the sixth information block is used to determine the M1 control channel candidates and the M2 control channel elements.

In one embodiment, the phrase that the sixth information block is used to determine at least one of the M1 control channel candidates, the M2 control channel elements, or the number of control resource pools configured by any of the K1 scheduling cells means that: the sixth information block is used to determine the M1 control channel candidates and the number of control resource pools configured by any of the K1 scheduling cells.

In one embodiment, the phrase that the sixth information block is used to determine at least one of the M1 control channel candidates, the M2 control channel elements, or the number of control resource pools configured by any of the K1 scheduling cells means that: the sixth information block is used to determine the M2 control channel elements and the number of control resource pools configured by any of the K1 scheduling cells.

In one embodiment, the phrase that the sixth information block is used to determine the M1 control channel candidates includes a meaning as follows: the sixth information block is used to determine N1 control channel candidates, and any of the M1 control channel candidates is one of the N1 control channel candidates. N1 being a positive integer greater than M1: the M1 is equal to the first threshold, and the first threshold is used to determine the M1 control channel candidates out of the N1 control channel candidates.

In one embodiment, the phrase that the sixth information block is used to determine the M2 control channel elements includes a meaning as follows: the sixth information block is used to determine N2 control channel elements, and any of the M2 control channel elements is one of the N2 control channel elements. N2 being a positive integer greater than M2: the M2 is equal to the second threshold, and the second threshold is used to determine the M2 control channel elements out of the N2 control channel elements.

Embodiment 5B

Embodiment 5B illustrates a flowchart of first information, as shown in FIG. 5B. In FIG. 5B, a first node U1B and a second node N2B are in communications via a radio link. If no conflict is incurred, embodiments, subembodiments and subsidiary embodiments illustrated in the Embodiment 5B are applicable to Embodiment 6B; and vice versa, embodiments, subembodiments and subsidiary embodiments illustrated in the Embodiment 6B are also applicable to Embodiment 5B. It is particularly noted that the sequences of these embodiments do not set any restriction over the orders of signal transmissions and implementations in the present disclosure. Steps identified by the box FOB are optional.

In one embodiment, the first node U2B receives target information in step S10B, receives first information in step S11B, and monitors a target control signaling candidate set in a first time window in step S12B.

In one embodiment, the second node N2B transmits target information in step S20B, transmits first information in step S21B, and determines a target control signaling candidate set in a first time window in step S22B.

In Embodiment 5B, the first information is used to indicate a first search space set and a second search space set, the first search space set comprising a positive integer number of control signaling candidate(s), and the second search space set comprising a positive integer number of control signaling candidate(s), a first Search Space Set ID and a second Search Space Set ID being used to respectively identify the first search space set and the second search space set: the target control signaling candidate set comprises a positive integer number of control signaling candidate(s): time-frequency resources occupied by control signaling candidate(s) comprised in the first search space set belong to a first resource pool, while time-frequency resources occupied by control signaling candidate(s) comprised in the second search space set belong to a second resource pool: the first resource pool and the second resource pool are respectively associated with a first index and a second index, the first index and the second index being non-negative integers, respectively: any control signaling candidate comprised by the second search space set belongs to the target control signaling candidate set: the first index and the second index are jointly used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window: the target information is used to determine a target search space set group, and search space sets comprised by the target search space set group make up a common search space, the target search space set group comprising P1 control channel candidate(s), and the P1 control channel candidate(s) occupying Q1 CCE(s): any of the P1 control channel candidate(s) is one of a positive integer number of control signaling candidate(s) comprised by the target control signaling candidate set.

In one embodiment, the first index is a serving cell ID of a serving cell where frequency-domain resources occupied by the first resource pool are comprised, while the second index is a serving cell ID of a serving cell where frequency-domain resources occupied by the second resource pool are comprised, a relative magnitude of the first index and the second index is used to determine whether a control signaling candidate comprised by the first search space set belongs to the target control signaling candidate set.

In one subembodiment, when the first index is greater than the second index, any control signaling candidate comprised by the first search space set does not belong to the target control signaling candidate set.

In one subembodiment, when the first index is less than the second index, each control signaling candidate comprised by the first search space set belongs to the target control signaling candidate set.

In one subembodiment, when the first index is equal to the second index, a relative magnitude of the first search space set ID and the second search space set ID is used to determine whether a control signaling candidate comprised by the first search space set belongs to the target control signaling candidate set.

In one subsidiary embodiment of the above subembodiment, when the first search space set ID is smaller than the second search space set ID, each control signaling candidate comprised by the first search space set belongs to the target control signaling candidate set.

In one subsidiary embodiment of the above subembodiment, when the first search space set ID is larger than the second search space set ID, no control signaling candidate comprised by the first search space set belongs to the target control signaling candidate set.

In one embodiment, the first index is a serving cell ID of a serving cell capable of being scheduled by a control signaling candidate in the first search space set, while the second index is a serving cell ID of a serving cell capable of being scheduled by a control signaling candidate in the second search space set, a relative magnitude of the first index and the second index is used to determine whether a control signaling candidate comprised by the first search space set belongs to the target control signaling candidate set. In one subembodiment, the first search space set is only capable of scheduling one serving cell, and a serving cell ID of the serving cell is the first index.

In one subembodiment, the second search space set is only capable of scheduling one serving cell, and a serving cell ID of the serving cell is the second index.

In one subembodiment, the first search space set is capable of scheduling K1 serving cells, and the K1 serving cells respectively correspond to K1 serving cell IDs, and the first index is a smallest one of the K1 serving cell IDs: the K1 is a positive integer greater than 1.

In one subembodiment, the second search space set is capable of scheduling K2 serving cells, and the K2 serving cells respectively correspond to K2 serving cell IDs, and the second index is a smallest one of the K2 serving cell IDs: the K2 is a positive integer greater than 1.

In one subembodiment, when the first index is greater than the second index, any control signaling candidate comprised by the first search space set does not belong to the target control signaling candidate set.

In one subembodiment, when the first index is less than the second index, each control signaling candidate comprised by the first search space set belongs to the target control signaling candidate set.

In one subembodiment, when the first index is equal to the second index, a relative magnitude of the first search space set ID and the second search space set ID is used to determine whether a control signaling candidate comprised by the first search space set belongs to the target control signaling candidate set.

In one subsidiary embodiment of the above subembodiment, when the first search space set ID is smaller than the second search space set ID, each control signaling candidate comprised by the first search space set belongs to the target control signaling candidate set.

In one subsidiary embodiment of the above subembodiment, when the first search space set ID is larger than the second search space set ID, no control signaling candidate comprised by the first search space set belongs to the target control signaling candidate set.

In one embodiment, the first resource pool is associated with a first control resource set pool, while the second resource pool is associated with a second control resource set pool: an index of the first control resource set pool is the first index, and an index of the second control resource set pool is the second index: a relative magnitude of the first index and the second index is used to determine whether a control signaling candidate comprised by the first search space set belongs to the target control signaling candidate set.

In one subembodiment, the first control resource set pool only comprises one control resource set, and the first resource pool is the control resource set comprised by the first control resource set pool.

In one subembodiment, the second control resource set pool only comprises one control resource set, and the second resource pool is the control resource set comprised by the second control resource set pool.

In one subembodiment, the first control resource set pool comprises multiple control resource sets, and the first resource pool is one of the multiple control resource sets comprised by the first control resource set pool.

In one subembodiment, the second control resource set pool comprises multiple control resource sets, and the second resource pool is one of the multiple control resource sets comprised by the second control resource set pool.

In one subembodiment, when the first index is greater than the second index, any control signaling candidate comprised by the first search space set does not belong to the target control signaling candidate set.

In one subembodiment, when the first index is less than the second index, each control signaling candidate comprised by the first search space set belongs to the target control signaling candidate set.

In one subembodiment, when the first index is equal to the second index, a relative magnitude of the first search space set ID and the second search space set ID is used to determine whether a control signaling candidate comprised by the first search space set belongs to the target control signaling candidate set.

In one subsidiary embodiment of the above subembodiment, when the first search space set ID is smaller than the second search space set ID, each control signaling candidate comprised by the first search space set belongs to the target control signaling candidate set.

In one subsidiary embodiment of the above subembodiment, when the first search space set ID is larger than the second search space set ID, no control signaling candidate comprised by the first search space set belongs to the target control signaling candidate set.

In one subembodiment, the first index is a CORESET Pool ID.

In one subembodiment, the second index is a CORESET Pool ID.

In one subembodiment, the first index is a CORESET Pool Index.

In one subembodiment, the second index is a CORESET Pool Index.

In one embodiment, the first index is a serving cell ID corresponding to a secondary cell, while the second serving cell ID corresponding to a primary cell.

In one subembodiment, the secondary cell is a SCell.

In one subembodiment, the primary cell is a PCell.

In one subembodiment, the first index is a positive integer greater than 0, and the second index is equal to 0.

In one subembodiment, the first index is a positive integer greater than 1.

In one embodiment, a serving cell scheduled by the first search space set is a SCell, and a serving cell scheduled by the second search space set is a PCell.

In one subembodiment, the phrase that a serving cell scheduled by the first search space set is a SCell means that the first search space set is only capable of scheduling a serving cell, and the serving cell is a SCell.

In one subembodiment, the phrase that a serving cell scheduled by the first search space set is a SCell means that the first search space set is capable of scheduling multiple serving cells, and any of the multiple serving cells is a SCell.

In one subembodiment, the phrase that a serving cell scheduled by the second search space set is a PCell means that the second search space set is only capable of scheduling a serving cell, and the serving cell is a PCell.

In one subembodiment, the phrase that a serving cell scheduled by the second search space set is a PCell means that the second search space set is capable of scheduling multiple serving cells, and any of the multiple serving cells is a PCell.

In one embodiment, the target search space set group comprises multiple search space sets, and each of the multiple search space sets is a CSS.

In one embodiment, the target search space set group comprises multiple search space sets, and there is one search space set of the multiple search space sets being a CSS.

In one embodiment, the target search space set group comprises only one search space set, the search space set being a CSS.

In one embodiment, a search space set comprised by the target search space set group is a PDCCH Search Space.

In one embodiment, a search space set comprised by the target search space set group is a PDCCH Search Space Set.

In one embodiment, the target signal comprises an SS/PBCH Block (SSB).

In one embodiment, the target signal comprises a Physical Broadcasting Channel (PBCH).

In one embodiment, the target signal comprises a Primary Synchronization Signal (PSS).

In one embodiment, the target signal comprises a Secondary Synchronization Signal (SSS).

In one embodiment, the target signal comprises a PSS and an SSS.

In one embodiment, the target signal is used for determining a time-domain position of the first time window.

In one embodiment, each control channel candidate comprised by the target search space set group employs the first SCS.

In one embodiment, time-domain resources occupied by the first search space set belong to the first time window.

In one embodiment, time-domain resources occupied by the second search space set belong to the first time window.

In one embodiment, time-domain resources occupied by the target search space set group belong to the first time window.

In one embodiment, the first search space set comprises M1 control channel candidates, and a number of Non-overlapped CCEs in the first search space set is equal to N1, M1 being a positive integer greater than 1, N1 being a positive integer greater than 1: the second search space set comprises M2 control channel candidates, and a number of Non-overlapped CCEs in the second search space set is equal to N2, M2 being a positive integer greater than 1, N2 being a positive integer greater than 1; a sum of the P1, the M1 and the M2 is greater than a first threshold, and a sum of the P1 and the M2 is no greater than the first threshold: a sum of the Q1, the N1 and the N2 is greater than a second threshold, and a sum of the Q1 and the N2 is no greater than the second threshold; an SCS of subcarriers occupied by a control signaling candidate comprised in the target control signaling candidate set in frequency domain is a first SCS; the first threshold is a maximum number of control channel candidates monitored by the first node U1B for a serving cell in a DL BWP under the first SCS and in the first time window; the second threshold is a maximum number of Non-overlapped CCEs monitored by the first node U1B for a serving cell in a DL BWP under the first SCS and in the first time window.

In one subembodiment, the first threshold is a smaller value of a first integer and a second integer.

In one subsidiary embodiment of the above subembodiment, the first integer is $M_{PDCCH}^{max,slot,\mu}$ in TS 38.213, the second integer is $M_{PDCCH}^{total,slot,\mu}$ in TS 38.213, and the first SCS is used for determining $\mu$.

In one subsidiary embodiment of the above subembodiment, the first integer is obtained through table look-up of the first SCS.

In one subsidiary embodiment of the above subembodiment, the second integer is related to CA capability of the first node U1B.

In one subsidiary embodiment of the above subembodiment, the second integer is related to pdcch-BlindDetectionCA of the first node U1B.

In one subsidiary embodiment of the above subembodiment, the second integer is related to a Release of the first node U1B.

In one subsidiary embodiment of the above subembodiment, the second integer is related to Ncen In one subsidiary embodiment of the above subembodiment, the second integer is related to a number of CORESET pools comprised by a scheduling cell of the first node U1B.

In one subembodiment, the first threshold and the second threshold can be equal or unequal.

In one subembodiment, the first threshold and the second threshold are independent.

In one subembodiment, the first threshold and the second threshold are unrelated.

In one subembodiment, the first threshold and the second threshold are related.

In one subembodiment, the first threshold and the second threshold are linearly correlated.

In one subembodiment, the first threshold and the second threshold are proportional.

In one subembodiment, the first node U1B in the present disclosure is not required to monitor control channel candidates, of which the total number is greater than the first threshold, in an active BWP employing the first SCS in the first time window.

In one subembodiment, the first node U1B in the present disclosure is not required to monitor control channel elements, of which the total number is greater than the second threshold, in an active BWP employing the first SCS in the first time window.

In one subembodiment, two independent Channel Estimations are required for any two of the N1 control channel elements, and two independent Channel Estimations are required for any two of the N2 control channel elements.

In one subembodiment, Channel Estimations respectively used for any two of the N1 control channel elements cannot be mutually reused, and Channel Estimations respectively used for any two of the N2 control channel elements cannot be mutually reused.

In one subembodiment, two independent Channel Equalizations are required for any two of the N1 control channel elements, and two independent Channel Equalizations are required for any two of the N2 control channel elements.

In one subembodiment, any of the N1 control channel elements is a PDCCH CCE, and any of the N2 control channel elements is a PDCCH CCE.

In one subembodiment, any of the N1 control channel elements is a Non-overlapped CCE, and any of the N2 control channel elements is a Non-overlapped CCE.

In one subembodiment, any two of the N1 control channel elements are non-overlapped, and any two of the N2 control channel elements are non-overlapped.

In one subembodiment, any two of the N1 control channel elements comprise equal numbers of time-frequency resource units, and any two of the N2 control channel elements comprise equal numbers of time-frequency resource units.

In one subembodiment, any two of the N1 control channel elements comprise equal numbers of REs, and any two of the N2 control channel elements comprise equal numbers of REs.

In one subembodiment, any of the N1 control channel elements comprises 6 REGs, and any of the N2 control channel elements comprises 6 REGs.

In one subembodiment, any of the N1 control channel elements comprises 6 REGs, and any of the N2 control channel elements comprises 6 REGs, each REG comprising 9 resource units used for transmitting data modulation symbols and 3 resource units used for transmitting Reference Signals (RS).

In one subembodiment, time-frequency resources respectively occupied by any two of the N1 control channel elements are orthogonal, and time-frequency resources respectively occupied by any two of the N2 control channel elements are orthogonal.

In one subembodiment, there are two control channel elements of the N1 control channel elements occupying time-frequency resources that are Non-Orthogonal, and there are two control channel elements of the N2 control channel elements occupying time-frequency resources that are Non-Orthogonal.

In one subembodiment, there are two control channel elements of the N1 control channel elements occupying same time-frequency resources, and there are two control channel elements of the N2 control channel elements occupying same time-frequency resources.

In one subembodiment, time-frequency resources respectively occupied by any two of the N1 control channel elements are different, and time-frequency resources respectively occupied by any two of the N2 control channel elements are different.

In one subembodiment, any control channel element occupied by the M1 control channel candidates is one of the N1 control channel elements.

In one subembodiment, any control channel element occupied by the M2 control channel candidates is one of the N2 control channel elements.

In one subembodiment, there is one control channel candidate of the M1 control channel candidates occupying a control channel element that is a control channel element other than the N1 control channel elements.

In one subembodiment, there is one control channel candidate of the M2 control channel candidates occupying a control channel element that is a control channel element other than the N2 control channel elements.

In one subembodiment, any of the N1 control channel elements is occupied by at least one of the M1 control channel candidates.

In one subembodiment, any of the N2 control channel elements is occupied by at least one of the M2 control channel candidates.

In one subembodiment, the N1 control channel elements comprise each control channel element occupied by any of the M1 control channel candidates.

In one subembodiment, the N2 control channel elements comprise each control channel element occupied by any of the M2 control channel candidates.

In one subembodiment, an SCS of subcarriers occupied by any one of the N1 control channel elements in frequency domain is equal to an SCS configured for an active BWP to which any of the N1 control channel elements belongs in frequency domain.

In one subembodiment, an SCS of subcarriers occupied by any one of the N2 control channel elements in frequency domain is equal to an SCS configured for an active BWP to which any of the N2 control channel elements belongs in frequency domain.

In one subembodiment, the N1 control channel elements respectively belong to N3 active BWPs in frequency domain, and an SCS of subcarriers comprised by any of the N3 active BWPs is equal to the first SCS, N3 being a positive integer.

In one subembodiment, the N2 control channel elements respectively belong to N3 active BWPs in frequency domain, and an SCS of subcarriers comprised by any of the N3 active BWPs is equal to the first SCS, N3 being a positive integer.

In one subembodiment, any of the N1 control channel elements belongs to a sub-band in the first sub-band set of the present disclosure in frequency domain.

In one subembodiment, any of the N2 control channel elements belongs to a sub-band in the first sub-band set of the present disclosure in frequency domain.

In one subembodiment, any two subcarriers occupied by the N1 control channel elements are spaced by an equal SCS, and any two subcarriers occupied by the N2 control channel elements are spaced by an equal SCS.

In one subembodiment, an SCS of subcarriers occupied by any one of the N1 control channel elements in frequency domain is equal to the first SCS, and an SCS of subcarriers occupied by any one of the N2 control channel elements in frequency domain is equal to the first SCS.

In one subembodiment, an SCS of any subcarrier occupied by any one of the N1 control channel elements in frequency domain is equal to the first SCS, and an SCS of any subcarrier occupied by any one of the N2 control channel elements in frequency domain is equal to the first SCS.

In one subembodiment, frequency-domain resources occupied by the M1 control channel candidates are between 450 MHz and 6 GHz.

In one subembodiment, frequency-domain resources occupied by the M1 control channel candidates are between 24.25 GHz and 52.6 GHz.

In one subembodiment, frequency-domain resources occupied by the M2 control channel candidates are between 450 MHz and 6 GHz.

In one subembodiment, frequency-domain resources occupied by the M2 control channel candidates are between 24.25 GHz and 52.6 GHz.

In one embodiment, the first information comprises a PDCCH-Config IE in TS 38.331.

Embodiment 5C

Figures 5C, 6A, 6B, 6C, 7A:
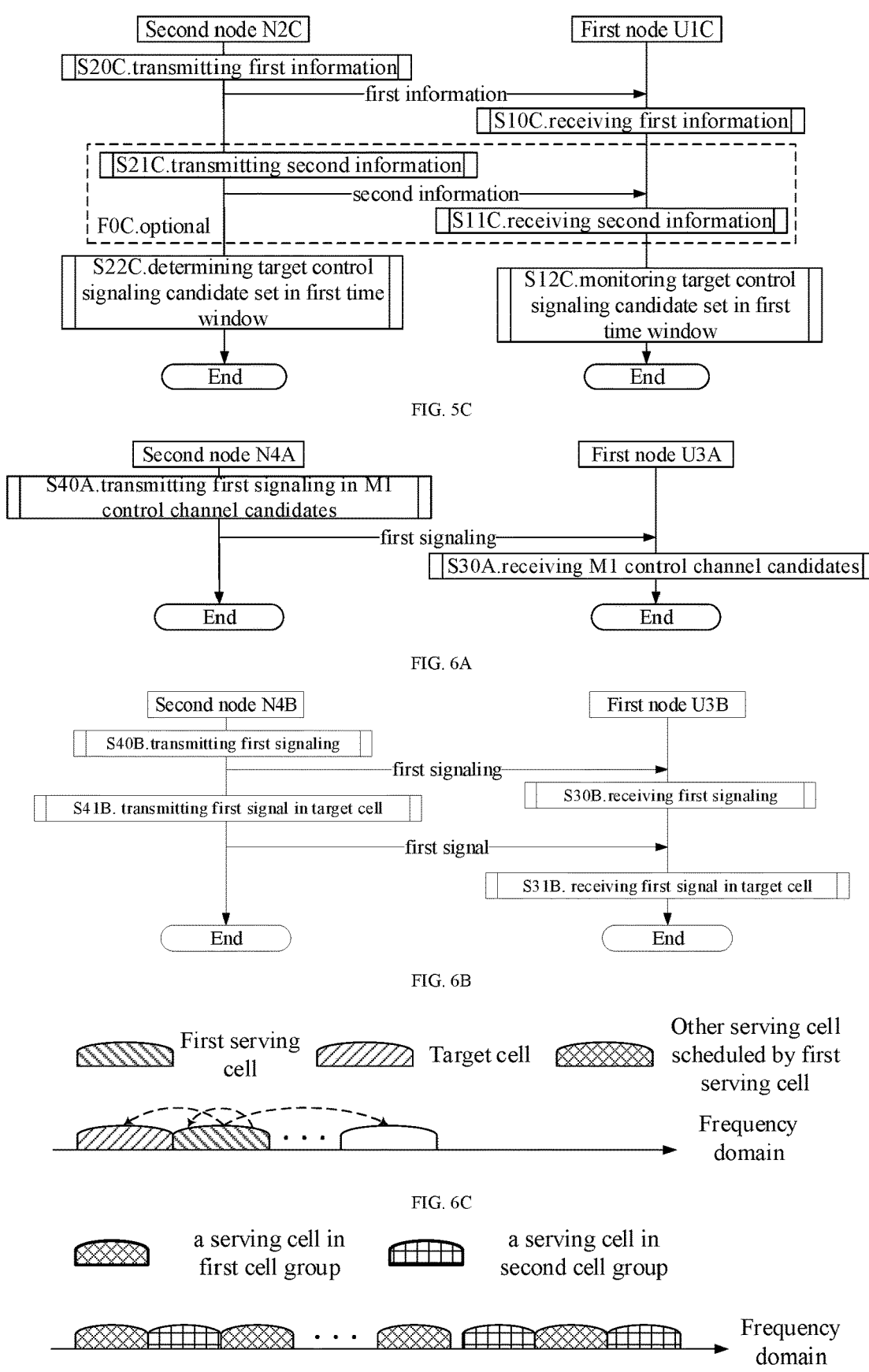
FIG. 5C illustrates a flowchart of first information according to one embodiment of the present disclosure.
FIG. 6A illustrates a flowchart of a first signaling according to one embodiment of the present disclosure.
FIG. 6B illustrates a flowchart of a first signaling according to one embodiment of the present disclosure.
FIG. 6C illustrates a schematic diagram of a first serving cell according to one embodiment of the present disclosure.
FIG. 7A illustrates a schematic diagram of a first cell group and a second cell group according to one embodiment of the present disclosure.

Embodiment 5C illustrates a flowchart of first information, as shown in FIG. 5C. In FIG. 5C, a first node U1C and a second node N2C are in communications via a radio link. It is particularly noted that the sequences of these embodiments do not set any restriction over the orders of signal transmissions and implementations in the present disclosure. Steps identified by the box FOC are optional.

The first node U1C receives first information in step S10C, receives second information in step S11C, and monitors a target control signaling candidate set in a first time window in step S12C.

The second node N2C transmits first information in step S20C, transmits second information in step S21C, and determines a target control signaling candidate set in a first time window in step S22C.

In Embodiment 5C, the first search space set comprises a positive integer number of control signaling candidate(s): frequency-domain resources occupied by any control signaling candidate comprised by the first search space set belong to a first serving cell, and a first scheduled cell set comprises a scheduled cell of the first serving cell: a target cell is a serving cell other than the first serving cell, whether the first scheduled cell set comprises the target cell is used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window; the second information is used to determine a scheduling cell of the target cell: when the scheduling cell of the target cell includes the first serving cell, the target cell belongs to the first scheduled cell set: when the scheduling cell of the target cell does not include the first serving cell, the target cell does not belong to the first scheduled cell set.

In one embodiment, the phrase that the second node N2C determines a target control signaling candidate set in a first time window means that the second node N2C determines a position of time-domain resources occupied by a control signaling candidate comprised by the target control signaling candidate set in the first time window.

In one embodiment, the phrase that the second node N2C determines a target control signaling candidate set in a first time window means that the second node N2C determines a position of frequency-domain resources occupied by a control signaling candidate comprised by the target control signaling candidate set in the first time window.

In one embodiment, the phrase that the second node N2C determines a target control signaling candidate set in a first time window means that the second node N2C determines a position of time-domain resources occupied by any control signaling candidate comprised by the target control signaling candidate set in the first time window.

In one embodiment, the phrase that the second node N2C determines a target control signaling candidate set in a first time window means that the second node N2C determines a position of frequency-domain resources occupied by any control signaling candidate comprised by the target control signaling candidate set in the first time window.

In one embodiment, it is an RRC signaling that bears the second information.

In one embodiment, the second information is UE-specific.

In one embodiment, the second information is specific to the first node U1C.

In one embodiment, the second information is specific to the target cell.

In one embodiment, the second information comprises a CrossCarrierSchedulingConfig IE in TS 38.331.

In one embodiment, the second information is configured for a serving cell group.

In one subembodiment, the serving cell group comprises an MCG.

In one subembodiment, the serving cell group comprises an SCG.

In one embodiment, the first serving cell, the target cell and any serving cell comprised in the first scheduled cell set all belong to a first cell group, and the target cell is a primary cell in the first cell group.

In one subembodiment, the first cell group comprises K2 serving cells, K2 being a positive integer greater than 1.

In one subsidiary embodiment of the above subembodiment, the first serving cell is one of the K2 serving cells.

In one subsidiary embodiment of the above subembodiment, the target cell is one of the K2 serving cells.

In one subsidiary embodiment of the above subembodiment, any serving cell comprised by the first scheduled cell set is one of the K2 serving cells.

In one subembodiment, the target cell is the only one PCell in the first cell group.

In one subembodiment, the first cell group is an MCG.

In one subembodiment, the first cell group is an SCG.

In one subembodiment, the first cell group comprises all serving cells of the first node U1C.

In one subembodiment, the first cell group comprises all serving cells comprised in a sCellToAddModList in a CellGroupConfig IE in TS 38.331.

In one embodiment, when the first scheduled cell set does not comprise the target cell, a control signaling candidate comprised by the first search space set belongs to the target control signaling candidate set.

In one subembodiment, the second node N2C ensures that when a control signaling candidate comprised by the first search space set belongs to the target control signaling candidate set, the blind detection capability of the first node U1C can support monitoring all control signaling candidate(s) in the target control signaling candidate set.

In one subembodiment, the phrase that the first scheduled cell set does not comprise the target cell means that the first serving cell can only schedule a serving cell other than the target cell.

In one embodiment, when the first scheduled cell set comprises the target cell; the first information is used for indicating a second search space set, the second search space set comprising a positive integer number of control signaling candidate(s), frequency-domain resources occupied by the second search space set belong to a second serving cell, and any serving cell in a second scheduled cell set can be scheduled by the second serving cell, the second scheduled cell set comprising the target cell: an SCS of subcarriers occupied by a control signaling candidate in the first search space set in frequency domain is a first SCS, and an SCS of subcarriers occupied by a control signaling candidate in the second search space set in frequency domain is a second SCS: the first SCS and the second SCS are jointly used to determine whether a control signaling candidate comprised by the first search space set belongs to the target control signaling candidate set.

In one subembodiment, the first information is used to indicate time-domain resources, frequency-domain resource or time-frequency resources occupied by the second search space set.

In one subembodiment, the first information is used to indicate a number of PDCCH candidates comprised by the second search space set.

In one subembodiment, the first information is used to indicate an Aggregation Level (AL) employed by (a) PDCCH candidate(s) comprised by the second search space set.

In one subembodiment, the first information is used to indicate a serving cell that the second search space set can schedule.

In one subembodiment, the second search space set is a PDCCH Search Space.

In one subembodiment, the second search space set is a PDCCH Search Space Set.

In one subembodiment, the second search space set is a USS.

In one subembodiment, the second search space set is a CSS.

In one subembodiment, any of the positive integer number of control signaling candidate(s) comprised by the second search space set is a PDCCH candidate.

In one subembodiment, the second search space set corresponds to a second search space ID, the second search space ID being a non-negative integer.

In one subembodiment, an SCS of subcarriers occupied by a control signaling candidate in the second search space set in frequency domain is the second SCS.

In one subembodiment, an SCS of subcarriers occupied by any control signaling candidate in the second search space set in frequency domain is the second SCS.

In one subembodiment, the second scheduled cell set comprises Q2 serving cells, and any of the Q2 serving cells can be scheduled by the second serving cell, Q2 being greater than 1.

In one subsidiary embodiment of the above subembodiment, the Q2 serving cells respectively employ Q2 different serving cell IDs.

In one subsidiary embodiment of the above subembodiment, the Q2 serving cells respectively occupy Q2 non-overlapped bands.

In one subsidiary embodiment of the above subembodiment, the Q2 serving cells are respectively Q2 CCs.

In one subembodiment, the second search space set is associated with a CORESET.

In one subembodiment, the second search space set is associated with a CORESET pool.

In one subembodiment, the second search space set comprises M2 control channel candidates, M2 being a positive integer greater than 1.

In one subsidiary embodiment of the above subembodiment, any of the M2 control channel candidates employs the second SCS.

In one subsidiary embodiment of the above subembodiment, all of the M2 control channel candidates employ the second SCS.

In one subsidiary embodiment of the above subembodiment, at least one of the M2 control channel candidates employs the second SCS.

In one subsidiary embodiment of the above subembodiment, any of the M2 control channel candidates occupies a positive integer number of CCE(s).

In one subsidiary embodiment of the above subembodiment, any of the M2 control channel candidates occupies more than one RE.

In one subsidiary embodiment of the above subembodiment, any of the M2 control channel candidates occupies one of 1 CCE, 2 CCEs, 4 CCEs, 8 CCEs, or 16 CCEs.

In one subsidiary embodiment of the above subembodiment, any of the M2 control channel candidates is a PDCCH candidate that employs one or more DCI Payload Sizes.

In one subsidiary embodiment of the above subembodiment, any of the M2 control channel candidates is a time-frequency resource set carrying specific DCI of one or more formats.

In one embodiment, the first SCS is different from the second SCS, whether a control signaling candidate comprised by the first search space set belongs to the target control signaling candidate set is unrelated to the second search space set.

In one subembodiment, the first search space set is not to be dropped due to existence of the second search space set.

In one subembodiment, the second search space set is not to be dropped due to existence of the first search space set.

In one subembodiment, whether a control signaling candidate comprised by the first search space set belongs to the target control signaling candidate set is related to both a first threshold and a second threshold, the first threshold is a maximum number of control channel candidates monitored by the first node for a serving cell in a DL BWP under the first SCS and in the first time window: the second threshold is a maximum number of Non-overlapped CCEs monitored by the first node for a serving cell in a DL BWP under the first SCS and in the first time window.

In one subembodiment, whether a control signaling candidate comprised by the second search space set belongs to the target control signaling candidate set is related to both a third threshold and a fourth threshold, the third threshold is a maximum number of control channel candidates monitored by the first node for a serving cell in a DL BWP under the second SCS and in the first time window: the fourth threshold is a maximum number of Non-overlapped CCEs monitored by the first node for a serving cell in a DL BWP under the second SCS and in the first time window.

In one subembodiment, whether the first search space set is dropped is related to configurations of (a) search space set(s) employing the first SCS, and unrelated to configurations of (a) search space set(s) employing the second SCS.

In one subsidiary embodiment of the above subembodiment, the configurations of (a) search space set(s) employing the first SCS include a number of search space set(s) employing the first SCS.

In one subsidiary embodiment of the above subembodiment, the configurations of (a) search space set(s) employing the first SCS include a number of PDCCH candidate(s) comprised by one of search space set(s) employing the first SCS.

In one subsidiary embodiment of the above subembodiment, the configurations of (a) search space set(s) employing the first SCS include a search space set ID employed by one of search space set(s) employing the first SCS.

In one subsidiary embodiment of the above subembodiment, the configurations of (a) search space set(s) employing the second SCS include a number of search space set(s) employing the second SCS.

In one subsidiary embodiment of the above subembodiment, the configurations of (a) search space set(s) employing the second SCS include a number of PDCCH candidate(s) comprised by one of search space(s) employing the second SCS.

In one subsidiary embodiment of the above subembodiment, the configurations of (a) search space set(s) employing the second SCS include a search space set ID employed by one of search space set(s) employing the second SCS.

In one embodiment, the first SCS is the same as the second SCS, a first search space set ID and a second search space set ID are respectively used to identify the first search space set and the second search space set, of which the first search space set is associated with a first index, while the second search space set is associated with a second index, the first index and the second index being non-negative integers: the first index and the second index are jointly used to determine whether a control signaling candidate comprised by the first search space set belongs to the target control signaling candidate set.

In one subembodiment, the first index is larger than the second index, and the first search space set is of a lower priority than the second search space set.

In one subembodiment, the first index is larger than the second index, any control signaling candidate comprised by the first search space set does not belong to the target control signaling candidate set, and any control signaling candidate comprised by the second search space set belongs to the target control signaling candidate set.

In one subembodiment, the first index is smaller than the second index, and the first search space set is of a higher priority than the second search space set.

In one subembodiment, the first index is smaller than the second index, any control signaling candidate comprised by the first search space set belongs to the target control signaling candidate set, and any control signaling candidate comprised by the second search space set does not belong to the target control signaling candidate set.

In one subembodiment, the first node U1C is configured with a target search space set group, and a search space set(s) comprised by the target search space set group is (are) a common search space, the target search space set group comprises P1 control channel candidate(s), and the P1 control channel candidate(s) occupies (occupy) R1 control channel element(s): any of the P1 control channel candidate(s) is a control signaling candidate of a positive integer number of control channel candidate(s) comprised by the target control signaling candidate set, and each control signaling candidate comprised by the target search space set group employs the first SCS.

In one subsidiary embodiment of the above subembodiment, the first search space set comprises M1 control channel candidates, and a number of Non-overlapped CCEs in the first search space set is equal to N1, M1 being a positive integer greater than 1, N1 being a positive integer greater than 1: the second search space set comprises M2 control channel candidates, and a number of Non-overlapped CCEs in the second search space set is equal to N2, M2 being a positive integer greater than 1, N2 being a positive integer greater than 1: a sum of the P1, the M1 and the M2 is greater than a first threshold, and a sum of the P1 and the M2 is no greater than the first threshold: a sum of the R1, the N1 and the N2 is greater than a second threshold, and a sum of the R1 and the N2 is no greater than the second threshold: the first threshold is a maximum number of control channel candidates monitored by the first node U1C for a serving cell in a DL BWP under the first SCS and in the first time window: the second threshold is a maximum number of Non-overlapped CCEs monitored by the first node U1C for a serving cell in a DL BWP under the first SCS and in the first time window.

In one subembodiment, the first search space set comprises M1 control channel candidates, and a number of Non-overlapped CCEs in the first search space set is equal to N1, M1 being a positive integer greater than 1. N1 being a positive integer greater than 1: the second search space set comprises M2 control channel candidates, and a number of Non-overlapped CCEs in the second search space set is equal to N2, M2 being a positive integer greater than 1, N2 being a positive integer greater than 1: a sum of the P1, the M1 and the M2 is greater than a first threshold, and a sum of the P1 and the M1 is no greater than the first threshold: a sum of the R1, the N1 and the N2 is greater than a second threshold, and a sum of the R1 and the N1 is no greater than the second threshold: the first threshold is a maximum number of control channel candidates monitored by the first node U1C for a serving cell in a DL BWP under the first SCS and in the first time window: the second threshold is a maximum number of Non-overlapped CCEs monitored by the first node U1C for a serving cell in a DL BWP under the first SCS and in the first time window.

In one subembodiment, the first index is a serving cell ID of the first serving cell, and the second index is a serving cell ID of the second serving cell.

In one subembodiment, the first index is equal to the first search space set ID, and the second index is equal to the second search space set ID.

In one subembodiment, the first index is a CORESET ID of a CORESET associated with the first search space set, and the second index is a CORESET ID of a CORESET associated with the second search space set.

In one subembodiment, the first search is associated with a first CORESET, the first CORESET belonging to a first CORESET pool, and the first index being an ID of the first CORESET pool: the second search is associated with a second CORESET, the second CORESET belonging to a second CORESET pool, and the second index being an ID of the second CORESET pool.

In one embodiment, a first threshold is a maximum number of control channel candidates monitored by the first node U1C for a serving cell in a DL BWP under the first SCS and in the first time window, and a second threshold is a maximum number of Non-overlapped CCEs monitored by the first node U1C for a serving cell in a DL BWP under the first SCS and in the first time window; the number of control channel candidates monitored by the first node U1C in a DL BWP of the first serving cell is no greater than the first threshold, and the number of Non-overlapped CCEs monitored by the first node U1C in a DL BWP of the first serving cell is no greater than the second threshold; a third threshold is a maximum number of control channel candidates monitored by the first node U1C for a serving cell in a DL BWP under the second SCS and in a second time window, and a fourth threshold is a maximum number of Non-overlapped CCEs monitored by the first node U1C for a serving cell in a DL BWP under the second SCS and in the second time window; the number of control channel candidates monitored by the first node U1C in a DL BWP of the second serving cell is no greater than the third threshold, and the number of Non-overlapped CCEs monitored by the first node U1C in a DL BWP of the second serving cell is no greater than the fourth threshold; the second time window and the first time window are overlapping, and the second SCS is used to determine the second time window.

In one subembodiment, the second time window is a slot corresponding to the second SCS.

In one subembodiment, the second time window comprises a positive integer number of time-domain contiguous OFDM symbols.

In one subembodiment, the second time window comprises a positive integer number of time-domain contiguous OFDM symbols corresponding to the second SCS in the present disclosure.

In one subembodiment, the second time window is a span.

In one subembodiment, the second time window is a span corresponding to the second SCS in the present disclosure.

In one subembodiment, the second time window is a time interval of minimum length between earliest OFDM symbols in two PDCCH Occasions.

In one subembodiment, the second time window is a Mini-slot.

In one subembodiment, the second time window is a Sub-slot.

In one subembodiment, the second time window is a slot.

In one subembodiment, the second SCS is equal to one of 15 kHz, 30 kHz, 60 kHz, 120 kHz and
240 KHz.

In one embodiment, the first SCS in the present disclosure is different from the second SCS.

In one embodiment, a duration of the first time window of the present disclosure in time domain is different from a duration of the second time window in time domain.

In one embodiment, when the first index is larger than the second index, each control signaling candidate comprised in the second search space set belongs to the target control signaling candidate set, and no control signaling candidate comprised in the first search space set belongs to the target control signaling candidate set: when the first index is smaller than the second index, each control signaling candidate comprised in the first search space set belongs to the target control signaling candidate set, and no control signaling candidate comprised in the second search space set belongs to the target control signaling candidate set.

In one embodiment, the first threshold in the present disclosure is a smaller value of a first integer and a second integer.

In one subembodiment, the first integer is $$M_{PDCCH}^{max,slot,\mu}$$

in TS 38.213, the second integer is $$M_{PDCCH}^{total,slot,\mu}$$

in TS 38.213, and the first SCS is used for determining $\mu$.

In one subembodiment, the first integer is obtained through table look-up of the first SCS.

In one subembodiment, the second integer is related to CA capability of the first node U1C.

In one subembodiment, the second integer is related to pdcch-BlindDetectionCA of the first node U1C.

In one subembodiment, the second integer is related to a Release of the first node U1C.

In one subembodiment, the second integer is related to $$N_{cells}^{cap}.$$

In one subembodiment, the third threshold in the present disclosure is a smaller value of a third integer and a fourth integer.

In one subembodiment, the third integer is $$M_{PDCCH}^{max,slot,\mu}$$

in TS 38.213, the fourth integer is $$M_{PDCCH}^{total,slot,\mu}$$

in TS 38.213, and the second SCS is used for determining $\mu$.

In one subembodiment, the third integer is obtained through table look-up of the second SCS.

In one subembodiment, the third integer is related to CA capability of the first node U1C.

In one subembodiment, the fourth integer is related to pdcch-BlindDetectionCA of the first node U1C.

In one subembodiment, the fourth integer is related to a Release of the first node U1C.

In one subembodiment, the fourth integer is related to $$N_{cells}^{cap}.$$

In one embodiment, the second threshold in the present disclosure is a smaller value of a fifth integer and a sixth integer.

In one subembodiment, the fifth integer is $$C_{PDCCH}^{max,slot,\mu}$$

in TS 38.213, the sixth integer is $$C_{PDCCH}^{totalslot,\mu}$$

in TS 38.213, and the first SCS is used for determining $\mu$.

In one subembodiment, the fifth integer is obtained through table look-up of the first SCS.

In one subembodiment, the sixth integer is related to CA capability of the first node U1C.

In one subembodiment, the sixth integer is related to pdcch-BlindDetectionCA of the first node U1C.

In one subembodiment, the sixth integer is related to a Release of the first node U1C.

In one subembodiment, the sixth integer is related to $$N_{cells}^{cap}.$$

In one embodiment, the fourth threshold in the present disclosure is a smaller value of a seventh integer and an eighth integer.

In one subembodiment, the seventh integer is $$C_{PDCCH}^{max,slot,\mu}$$

in TS 38.213, the eighth integer is $$C_{PDCCH}^{total,slot,\mu}$$

In one subembodiment, the seventh integer is obtained through table look-up of the second SCS.

In one subembodiment, the seventh integer is related to CA capability of the first node U1C.

In one subembodiment, the eighth integer is related to pdcch-BlindDetectionCA of the first node U1C.

In one subembodiment, the eighth integer is related to a Release of the first node U1C.

In one subembodiment, the eighth integer is related to $$N_{cells}^{cap}.$$

In one embodiment, the first node U1C in the present disclosure is not required to monitor control channel candidates, of which the total number is greater than the first threshold, in an active BWP employing the first SCS in the first time window.

In one embodiment, the first node U1C in the present disclosure is not required to monitor control channel elements, of which the total number is greater than the second threshold, in an active BWP employing the first SCS in the first time window.

In one embodiment, the first node U1C in the present disclosure is not required to monitor control channel candidates, of which the total number is greater than the third threshold, in an active BWP employing the second SCS in the second time window.

In one embodiment, the first node U1C in the present disclosure is not required to monitor control channel elements, of which the total number is greater than the fourth threshold, in an active BWP employing the second SCS in the second time window.

Embodiment 6A

Embodiment 6A illustrates a flowchart of a first signaling, as shown in FIG. 6A. In FIG. 6A, a first node U3A and a second node N4A are in communications via a radio link. If no conflict is incurred, embodiments, subembodiments and subsidiary embodiments illustrated in the Embodiment 6A are applicable to Embodiment 5A; and vice versa, embodiments, subembodiments and subsidiary embodiments illustrated in the Embodiment 5A are also applicable to Embodiment 6A.

The first node U3A receives a first signaling in the M1 control channel candidates in step S30A.

The second node N4A transmits a first signaling in the M1 control channel candidates in step S40A.

In Embodiment 6A, the first signaling is a physical layer signaling.

In one embodiment, the step S26A in Embodiment 5A includes the step S40A.

In one embodiment, the step S16A in Embodiment 5A includes the step S30A.

In one embodiment, the first signaling is used for scheduling a PDSCH on the target cell.

In one embodiment, the first signaling is used for scheduling a PUSCH on the target cell.

In one embodiment, the first signaling is used for scheduling a DL-SCH on the target cell.

In one embodiment, the first signaling is used for scheduling a UL-SCH on the target cell.

In one embodiment, the first signaling is DCI.

In one embodiment, the first signaling is a PDCCH.

Embodiment 6B

Embodiment 6B illustrates a flowchart of a first signaling, as shown in FIG. 6B. In FIG. 6B, a first node U3B and a second node N4B are in communications via a radio link. If no conflict is incurred, embodiments, subembodiments and subsidiary embodiments illustrated in the Embodiment 6B are applicable to Embodiment 5B; and vice versa, embodiments, subembodiments and subsidiary embodiments illustrated in the Embodiment 5B are also applicable to Embodiment 6B.

The first node U3B receives a first signaling in step S30B, and receives a first signal in a target cell in step S31B.

The second node N4B transmits a first signaling in step S40B, and transmits a first signal in a target cell in step S41B.

In Embodiment 6B, the first signaling occupies a control signaling candidate in the target control signaling candidate set, and the first signaling is used to schedule the first signal: the first signaling indicates the target cell; frequency-domain resources occupied by the first search space set belong to a first serving cell; frequency-domain resources occupied by the second search space set belong to a second serving cell, and both the first serving cell and the second serving cell are scheduling cells of the target cell: the first serving cell is different from the second serving cell.

In one embodiment, the step S22B in Embodiment 5B includes the step S40B.

In one embodiment, the step S12B in Embodiment 5B includes the step S30B.

In one embodiment, the first signaling is a PDCCH.

In one embodiment, the first signaling is DCI.

In one embodiment, the first signaling comprises a first field, the first field being used to indicate the target cell.

In one embodiment, the first signaling is used to indicate an MCS employed by the first signal.

In one embodiment, the first signaling is used to indicate time-frequency resources occupied by the first signal.

In one embodiment, the first signaling is Downlink Grant, and a physical layer channel carrying the first signal is a PDSCH.

In one embodiment, the first signaling is Downlink Grant, and a transmission channel carrying the first signal is a DL-SCH.

In one embodiment, the target cell is a Pcell.

In one embodiment, the first serving cell is a SCell, and the second serving cell is a Pcell.

In one embodiment, the first serving cell is a SCell, and the second serving cell is a Scell.

In one embodiment, the first signaling occupies a control signaling candidate comprised in the target control signaling set.

In one embodiment, the first signaling occupies a control signaling candidate, the control signaling candidate being a control signaling candidate other than control signaling candidate(s) comprised in the target search space set.

In one embodiment, the first signal is a radio signal.

In one embodiment, the first signal is a baseband signal.

Embodiment 6C

Embodiment 6C illustrates a schematic diagram of a first serving cell according to the present disclosure: as shown in FIG. 6C. In FIG. 6C, the horizontal axis represents frequency, a slash-filled box and a backslash-filled box with circular arc top respectively represent a first serving cell and a target cell; a box with circular arc top represents serving cell(s) belonging to the first scheduled cell set other than the target cell in the present disclosure: each curved dotted line with an arrow represents a scheduling and scheduled relation, with the arrow starting with a scheduling cell and pointing at a scheduled cell. As illustrated in FIG. 6C, the first serving cell is capable of scheduling multiple serving cells.

In one embodiment, frequency-domain resources occupied by the target cell belong to LTE or LTE-A spectrum resources.

In one embodiment, frequency-domain resources occupied by the first serving cell belong to 5G spectrum resources.

In one embodiment, frequency-domain resources occupied by the target cell are between 450 MHz and 6 GHz, and frequency-domain resources occupied by the first serving cell are between 24.25 GHz and 52.6 GHz.

Embodiment 7A

Embodiment 7A illustrates a schematic diagram of a first cell group and a second cell group according to the present disclosure: as shown in FIG. 7A. In FIG. 7A, the horizontal axis represents frequency, and each cross-filled box with circular arc top represents a serving cell comprised by a first cell group, while each reticle-filled box with circular arc top represents a serving cell comprised by a second cell group.

In one embodiment, the target cell in the present disclosure is any of serving cell(s) comprised in the scheduled cell set that can be scheduled by more than one scheduling cell, and there are K1 scheduling cells capable of scheduling the target cell.

In one subembodiment, the K1 scheduling cells respectively correspond to K1 identities, and a scheduling cell corresponding to a smallest one of the K1 identities is a first scheduling cell of the K1 scheduling cells: when a number of control resource pools provided in the first scheduling cell is equal to 1 or there is no control resource pool being provided in the first scheduling cell, the target cell belongs to the first cell group: when the number of control resource pools provided in the first scheduling cell is greater than 1, the target cell belongs to the second cell group.

In one subembodiment, when the number of control resource pools provided in any of the K1 scheduling cells is less than 2, the target cell belongs to the first cell group: when among the K1 scheduling cells there is a scheduling cell in which the number of control resource pools provided is greater than 1, the target cell belongs to the second cell group.

In one subembodiment, the K1 scheduling cells respectively correspond to K1 first coefficients, and each of the K1 first coefficients is a positive integer, and a quotient of a sum of the K1 first coefficients and K1 is equal to a target value: when the target value is less than a target threshold, the target cell belongs to the first cell group: when the target value is no less than the target threshold, the target cell belongs to the second cell group: the target threshold is a positive real number.

In one embodiment, a first serving cell is any of serving cell(s) comprised in the scheduled cell set that can only be scheduled by one scheduling cell: when the number of control resource pool(s) provided in the scheduling cell for the first serving cell is equal to 1 or there is no control resource pool being provided in the scheduling cell for the first serving cell, the first serving cell belongs to the first cell group: when the number of control resource pools provided in the scheduling cell for the first serving cell is greater than 1, the first serving cell belongs to the second cell group.

In one embodiment, as long as either of "the number of control resource pool(s) provided in the scheduling cell for the first serving cell is equal to 1" or "there is no control resource pool being provided in the scheduling cell for the first serving cell" is fulfilled, the first serving cell belongs to the first cell group.

In one embodiment, the phrase that "there is no control resource pool being provided in the scheduling cell for the first serving cell" means that no control resource pool index is not provided in the scheduling cell for the first serving cell.

In one embodiment, the phrase that "there is no control resource pool being provided in the scheduling cell for the first serving cell" means that no signaling of control resource pool index is provided in the scheduling cell for the first serving cell.

In one embodiment, the phrase that "there is no control resource pool being provided in the scheduling cell for the first serving cell" means that the first node does not support providing a control resource pool index in the scheduling cell for the first serving cell.

In one embodiment, the phrase that "there is no control resource pool being provided in the scheduling cell for the first serving cell" means that the first node only supports R15 rather than support providing a control resource pool index in the scheduling cell for the first serving cell.

In one embodiment, the phrase that "there is no control resource pool being provided in the scheduling cell for the first serving cell" means that a field providing a control resource pool index is absent in the scheduling cell for the first serving cell.

In one embodiment, the first serving cell belongs to one of the first cell group and the second cell group.

In one embodiment, when control resource pool(s) is (are) provided in the scheduling cell for the first serving cell, the number of control resource pool index(es) provided in the scheduling cell for the first serving cell is equal to 1 or 2.

In one embodiment, when control resource pool(s) is (are) provided in the scheduling cell for the first serving cell, the number of control resource pool index(es) provided in the scheduling cell for the first serving cell is equal to 1 or 2 or 3.

In one embodiment, when control resource pool(s) is (are) provided in the scheduling cell for the first serving cell, the number of control resource pool indexes provided in the scheduling cell for the first serving cell can be greater than 3.

In one embodiment, when control resource pool(s) is (are) provided in the scheduling cell for the first serving cell, the number of control resource pool index(es) provided in the scheduling cell for the first serving cell is equal to 1 or 2; the phrase that "when the number of control resource pools provided in the scheduling cell for the first serving cell is greater than 1" means when the number of control resource pool indexes provided in the scheduling cell for the first serving cell is equal to 2.

Embodiment 7B

Figures 7B, 7C, 8A, 8B, 8C:
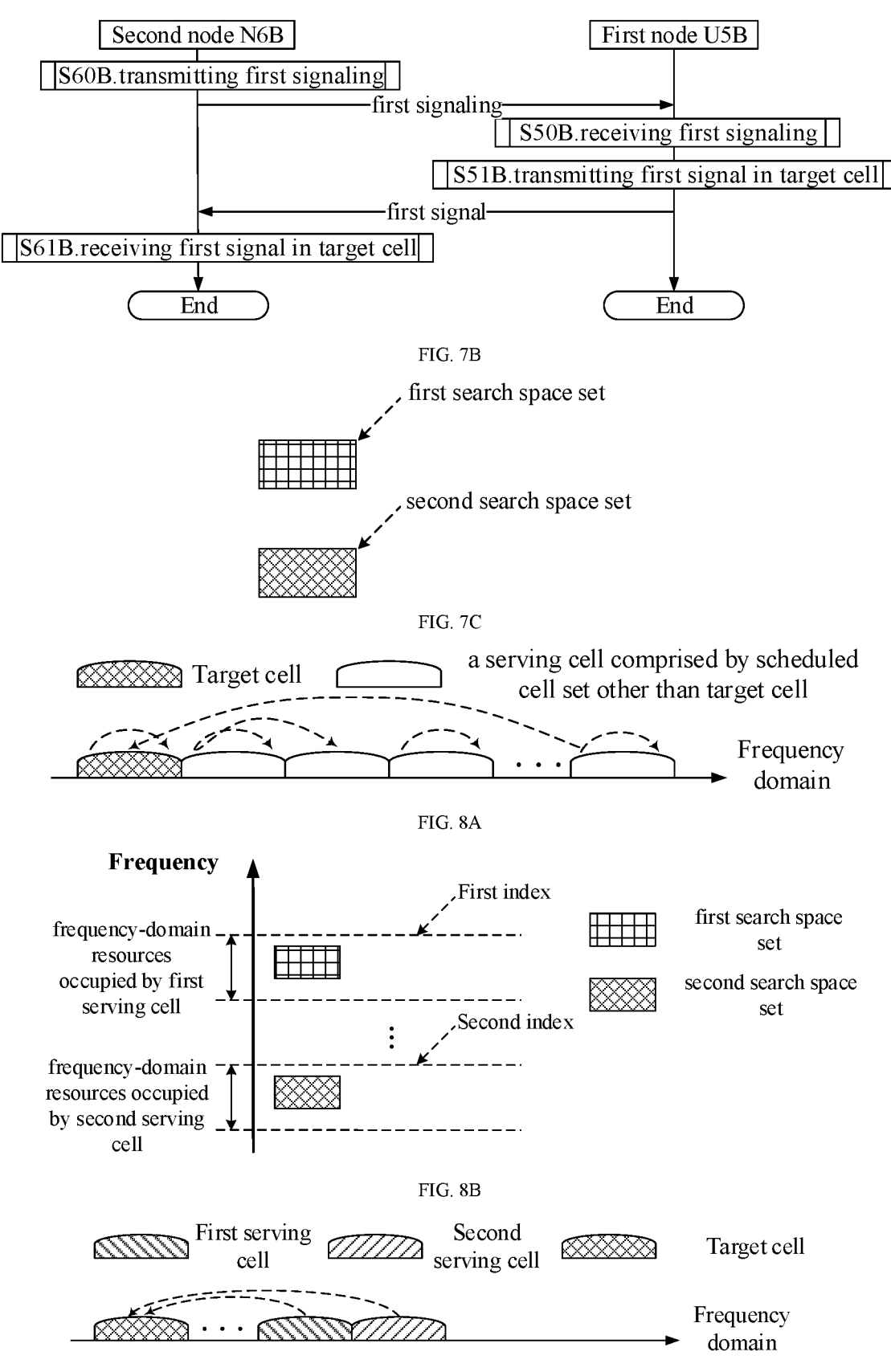
FIG. 7B illustrates a flowchart of a first signaling according to another embodiment of the present disclosure.
FIG. 7C illustrates a schematic diagram of a first search space set and a second search space set according to one embodiment of the present disclosure.
FIG. 8A illustrates a schematic diagram of a scheduling cell of a target cell according to one embodiment of the present disclosure.
FIG. 8B illustrates a schematic diagram of a first search space set and a second search space set according to one embodiment of the present disclosure.
FIG. 8C illustrates a schematic diagram of a first serving cell and a second serving cell according to one embodiment of the present disclosure.

Embodiment 7B illustrates another flowchart of a first signaling, as shown in FIG. 7B. In FIG. 7B, a first node U5B and a second node N6B are in communications via a radio link. If no conflict is incurred, embodiments, subembodiments and subsidiary embodiments illustrated in the Embodiment 7B are applicable to Embodiment 5B; and vice versa, embodiments, subembodiments and subsidiary embodiments illustrated in the Embodiment 5B are also applicable to Embodiment 7B.

The first node USB receives a first signaling in step S50B, and transmits a first signal in a target cell in step S51B.

The second node N6B transmits a first signaling in step S60B, and receives a first signal in a target cell in step S61B.

In Embodiment 7B, the first signaling occupies a control signaling candidate in the target control signaling candidate set, and the first signaling is used to schedule the first signal: the first signaling indicates the target cell: frequency-domain resources occupied by the first search space set belong to a first serving cell; frequency-domain resources occupied by the second search space set belong to a second serving cell, and both the first serving cell and the second serving cell are scheduling cells of the target cell: the first serving cell is different from the second serving cell.

In one embodiment, the step S22B in Embodiment 5B includes the step S60B.

In one embodiment, the step S12B in Embodiment 5B includes the step S50B.

In one embodiment, the first signaling is a PDCCH.

In one embodiment, the first signaling is DCI.

In one embodiment, the first signaling is used to indicate an MCS employed by the first signal.

In one embodiment, the first signaling is used to indicate time-frequency resources occupied by the first signal.

In one embodiment, the first signaling is Uplink Grant, and a physical layer channel carrying the first signal is a PUSCH.

In one embodiment, the first signaling is Uplink Grant, and a transmission channel carrying the first signal is a UL-SCH.

In one embodiment, the target cell is a Pcell.

In one embodiment, the first serving cell is a SCell, and the second serving cell is a Pcell.

In one embodiment, the first serving cell is a SCell, and the second serving cell is a Scell.

In one embodiment, the first signaling occupies a control signaling candidate comprised in the target control signaling set.

In one embodiment, the first signaling occupies a control signaling candidate, the control signaling candidate being a control signaling candidate other than control signaling candidate(s) comprised in the target search space set.

In one embodiment, the first signal is a radio signal.

In one embodiment, the first signal is a baseband signal.

Embodiment 7C

Embodiment 7C illustrates a schematic diagram of a first search space set and a second search space set according to the present disclosure: as shown in FIG. 7C. In FIG. 7C, REs occupied by the first search space set and REs occupied by the second search space set are orthogonal.

In one embodiment, the first search space set and the second search space set occupy same time-domain resources.

In one embodiment, the first search space set and the second search space set occupy same frequency-domain resources.

In one embodiment, there isn't a RE belonging to the first search space set and the second search space set simultaneously.

In one embodiment, time-domain resources occupied by the first search space set and time-domain resources occupied by the second search space set belong to a same time unit.

In one subembodiment, the time unit lasts Ims.

In one subembodiment, the time unit lasts as long as a slot.

In one subembodiment, a duration of the time unit is related to a smaller one of the first SCS and the second SCS.

In one subembodiment, a duration of the time unit is related to a larger one of the first SCS and the second SCS.

Embodiment 8A

Embodiment 8A illustrates a schematic diagram of a scheduling cell of a target cell according to the present disclosure: as shown in FIG. 8A. In FIG. 8A, the horizontal axis represents frequency, each box with circular arc top represents a serving cell comprised in a scheduled cell set, each blank box with circular arc top represents a serving cell comprised in a scheduled cell set other than a target cell, and a cross-filled box with circular arc top represents a target cell, a curved dotted line with an arrow represents a scheduling and scheduled relation between two serving cells. As illustrated in FIG. 8A, there is more than one scheduling cell capable of scheduling the target cell.

Embodiment 8B

Embodiment 8B illustrates a schematic diagram of a first search space set and a second search space set according to the present disclosure: as shown in FIG. 8B. In FIG. 8B, frequency-domain resources occupied by the first search space set belong to a first serving cell, and frequency-domain resources occupied by the second search space set belong to a second serving cell: a serving cell ID of the first serving cell is a first index, and a serving cell ID of the second serving cell is a second index.

In one embodiment, the first search space set and the second search space set occupy same time-domain resources.

In one embodiment, frequency-domain resources occupied by the first serving cell belong to LTE or LTE-A spectrum resources.

In one embodiment, frequency-domain resources occupied by the second serving cell belong to LTE or LTE-A spectrum resources.

In one embodiment, frequency-domain resources occupied by the first serving cell belong to 5G spectrum resources.

In one embodiment, frequency-domain resources occupied by the second serving cell belong to 5G spectrum resources.

In one embodiment, frequency-domain resources occupied by the first serving cell are between 450 MHz and 6 GHz, and frequency-domain resources occupied by the second serving cell are between 24.25 GHz and 52.6 GHz.

In one embodiment, frequency-domain resources occupied by the second serving cell are between 450 MHz and 6

GHz, and frequency-domain resources occupied by the first serving cell are between 24.25 GHz and 52.6 GHz.

Embodiment 8C

Embodiment 8C illustrates a schematic diagram of a first serving cell and a second serving cell according to the present disclosure: as shown in FIG. 8C. In FIG. 8C, the horizontal axis represents frequency, a slash-filled box and a backslash-filled box with circular arc top respectively represent a first serving cell and a second serving cell, a grid-filled box with circular arc top respectively represent a target cell in the present disclosure, each curved dotted line with an arrow represents a scheduling and scheduled relation, with the arrow starting with a scheduling cell and pointing at a scheduled cell. As illustrated in FIG. 8C, the first serving cell and the second serving cell are capable of scheduling the target cell.

In one embodiment, frequency-domain resources occupied by the target cell belong to LTE or LTE-A spectrum resources.

In one embodiment, frequency-domain resources occupied by the first serving cell belong to 5G spectrum resources.

In one embodiment, frequency-domain resources occupied by the second serving cell belong to 5G spectrum resources.

In one embodiment, frequency-domain resources occupied by the target cell are between 450 MHz and 6 GHz, frequency-domain resources occupied by the first serving cell are between 24.25 GHz and 52.6 GHz, and frequency-domain resources occupied by the second serving cell are between 24.25 GHz and 52.6 GHz.

Embodiment 9A

Figures 9A, 9B, 9C, 10A:
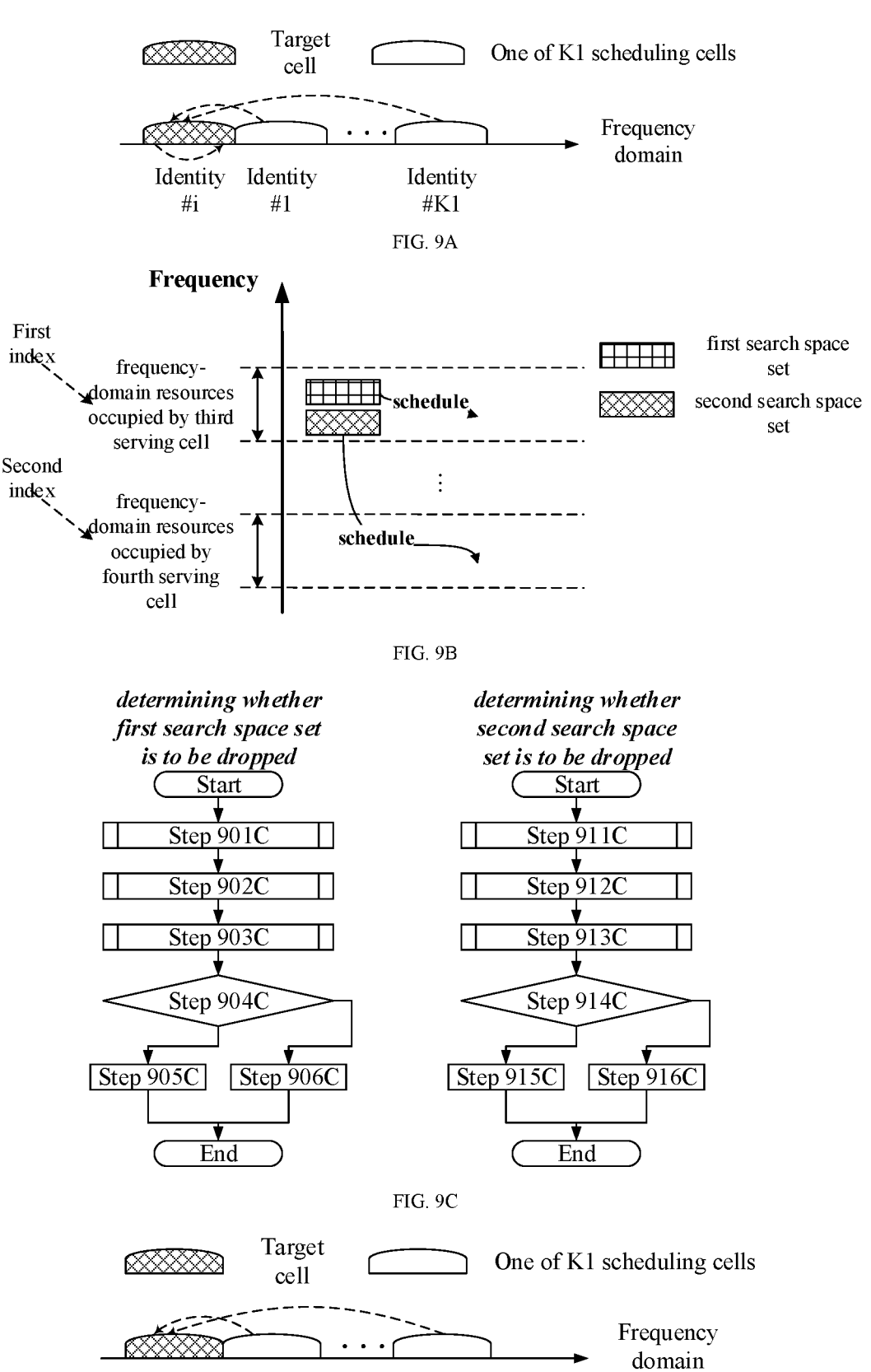
FIG. 9A illustrates a schematic diagram of K1 identities according to one embodiment of the present disclosure.
FIG. 9B illustrates a schematic diagram of a first search space set and a second search space set according to another embodiment of the present disclosure.
FIG. 9C illustrates a schematic diagram of sorting of blind detections of search spaces according to one embodiment of the present disclosure.
FIG. 10A illustrates a schematic diagram of K1 scheduling cells according to one embodiment of the present disclosure.

Embodiment 9A illustrates a schematic diagram of K1 identities according to the present disclosure; as shown in FIG. 9A. In FIG. 9A, the K1 identities range from identity #1 to identity #K1, which are respectively IDs of K1 scheduling carriers for the target cell: a scheduling cell corresponding to a smallest one of the K1 identities is a first scheduling cell of the K1 scheduling cells: when a number of control resource pool(s) provided in the first scheduling cell is equal to 1 or there is no control resource pool being provided in the first scheduling cell, the target cell belongs to the first cell group: when the number of control resource pools provided in the first scheduling cell is greater than 1, the target cell belongs to the second cell group. An identity corresponding to the target cell in this figure is identity #i, and the target cell can be self-scheduled, i being a positive integer between 1 and K1. A curved dotted line with an arrow represents a scheduling and scheduled relation between two serving cells.

In one embodiment, the K1 identities are respectively K1 ServingCellIds.

In one embodiment, the K1 identities are respectively K1 ServCellIndex.

In one embodiment, the first scheduling cell is a PCell.

In one embodiment, the first scheduling cell is an SCell.

In one embodiment, any of the K1 identities is a non-negative integer.

In one embodiment, an identity corresponding to the first scheduling cell is equal to 0.

In one embodiment, an identity corresponding to the first scheduling cell is equal to 1, and none of the K1 identities is equal to 0.

In one embodiment, the K1 scheduling cells comprise the target cell.

In one embodiment, a smallest one of the K1 identities refers to an identity of a minimum value among the K1 identities.

In one embodiment, a smallest one of the K1 identities refers to an identity of a minimum number among the K1 identities.

Embodiment 9B

Embodiment 9B illustrates another schematic diagram of a first search space set and a second search space set according to the present disclosure: as shown in FIG. 9B. In FIG. 9B, the first search space set is capable of scheduling a third serving cell, while the second search space set is capable of scheduling a fourth serving cell: a serving cell ID of the third serving cell is a first index, and a serving cell ID of the fourth serving cell is a second index.

In one embodiment, the first search space set and the second search space set are Frequency Division Multiplexing (FDM).

In one embodiment, frequency-domain resources occupied by the first search space set and frequency-domain resources occupied by the second search space set belong to a same serving cell.

In one embodiment, the third serving cell is an SCell.

In one embodiment, the fourth serving cell is a PCell.

In one embodiment, frequency-domain resources occupied by the third serving cell belong to LTE or LTE-A spectrum resources.

In one embodiment, frequency-domain resources occupied by the fourth serving cell belong to LTE or LTE-A spectrum resources.

In one embodiment, frequency-domain resources occupied by the third serving cell belong to 5G spectrum resources.

In one embodiment, frequency-domain resources occupied by the fourth serving cell belong to 5G spectrum resources.

In one embodiment, frequency-domain resources occupied by the third serving cell are between 450 MHz and 6 GHz, and frequency-domain resources occupied by the fourth serving cell are between 24.25 GHz and 52.6 GHz.

In one embodiment, frequency-domain resources occupied by the third serving cell are between 450 MHz and 6 GHz, and frequency-domain resources occupied by the fourth serving cell are between 24.25 GHz and 52.6 GHz.

In one embodiment, frequency-domain resources occupied by the fourth serving cell are between 450 MHz and 6 GHz, and frequency-domain resources occupied by the third serving cell are between 24.25 GHz and 52.6 GHz.

Embodiment 9C

Embodiment 9C illustrates a schematic diagram of sorting of blind detections according to the present disclosure: as shown in FIG. 9C. In FIG. 9C, the first search space set and the second search space set respectively employ a first SCS and a second SCS, the first SCS being different from the second SCS; the first node is also configured with a third search space set and a fourth search space set; the third search space set and the fourth search space set respectively employ a first SCS and a second SCS: a first threshold is a maximum number of control channel candidates monitored by the first node for a serving cell in a DL BWP under the first SCS and in the first time window, and a second threshold is a maximum number of Non-overlapped CCEs monitored by the first node for a serving cell in a DL BWP under the first SCS and in the first time window: a third threshold is a maximum number of control channel candidates monitored by the first node for a serving cell in a DL BWP under the second SCS and in a second time window, and a fourth threshold is a maximum number of Non-overlapped CCEs monitored by the first node for a serving cell in a DL BWP under the second SCS and in the second time window: the number of control signaling candidates comprised by the first search space set is equal to M1, and the number of Non-overlapped CCEs comprised by the first search space set is equal to N1: the number of control signaling candidates comprised by the second search space set is equal to M2, and the number of Non-overlapped CCEs comprised by the second search space set is equal to N2: the M1, the N1, the M2 and the N2 are positive integers greater than 1.

The first node determines whether to monitor control signaling candidate(s) in the first search space set according to the following steps:

In step 901C, determining a first threshold and a second threshold:

In step 902C, determining that a CSS employing the first SCS occupies P1 control signaling candidates and R1 non-overlapped CCEs to complete the CSS monitoring: P1 and R1 are positive integers greater than 1.

In step 903C, determining that the first threshold being subtracted by P1 is equal to a first value, and that the second threshold being subtracted by R1 is equal to a second value:

In step 904C, comparing the priority of a third search space set and the first search space set: if the third search space set is of a higher priority, enter the step 905C: or, if the first search space set is of a higher priority, enter the step 906C:

In step 905C, preferentially assigning control signaling candidates of which the number is the first value and non-overlapped CCEs of which the number is the second value to the third search space set, and monitoring the third search space set; and then judging whether remaining control signaling candidates and non-overlapped CCEs are sufficient for use for the first search space, if so, monitoring the first search space; if not, dropping the monitoring of the first search space:

In step 906C, preferentially assigning control signaling candidates of which the number is the first value and non-overlapped CCEs of which the number is the second value to the first search space set, and monitoring the first search space set; and then judging whether remaining control signaling candidates and non-overlapped CCEs are sufficient for use for the third search space, if so, monitoring the third search space; if not, dropping the monitoring of the third search space.

Similarly, the first node determines whether to monitor control signaling candidate(s) in the second search space set according to the following steps:

In step 911C, determining a third threshold and a fourth threshold:

In step 912C, determining that a CSS employing the second SCS occupies P2 control signaling candidates and R2 non-overlapped CCEs to complete the CSS monitoring: P2 and R2 are positive integers greater than 1.

In step 913C, determining that the third threshold being subtracted by P2 is equal to a third value, and that the fourth threshold being subtracted by R2 is equal to a fourth value:

In step 914C, comparing the priority of a fourth search space set and the second search space set: if the fourth search space set is of a higher priority, enter the step 915C: or, if the second search space set is of a higher priority, enter the step 916C:

In step 915C, preferentially assigning control signaling candidates of which the number is the third value and non-overlapped CCEs of which the number is the fourth value to the fourth search space set, and monitoring the fourth search space set; and then judging whether remaining control signaling candidates and non-overlapped CCEs are sufficient for use for the second search space, if so, monitoring the second search space: if not, dropping the monitoring of the second search space:

In step 916C, preferentially assigning control signaling candidates of which the number is the third value and non-overlapped CCEs of which the number is the fourth value to the second search space set, and monitoring the second search space set; and then judging whether remaining control signaling candidates and non-overlapped CCEs are sufficient for use for the fourth search space, if so, monitoring the fourth search space: if not, dropping the monitoring of the fourth search space:

In one embodiment, operations respectively marked by the steps 901C-906C and the steps 911C-916C are independent.

Embodiment 10A

Embodiment 10A illustrates a schematic diagram of K1 scheduling cells according to of the present disclosure: as shown in FIG. 10A. In FIG. 10A, when the number of control resource pools provided in any of the K1 scheduling cells is less than 2, the target cell belongs to the first cell group: when among the K1 scheduling cells there is a scheduling cell in which the number of control resource pools provided is greater than 1, the target cell belongs to the second cell group.

In one embodiment, the target cell in the present disclosure does not support self-scheduling.

In one embodiment, the K1 scheduling cells do not comprise the target cell.

Embodiment 10B

Figures 10B, 10C, 11A:
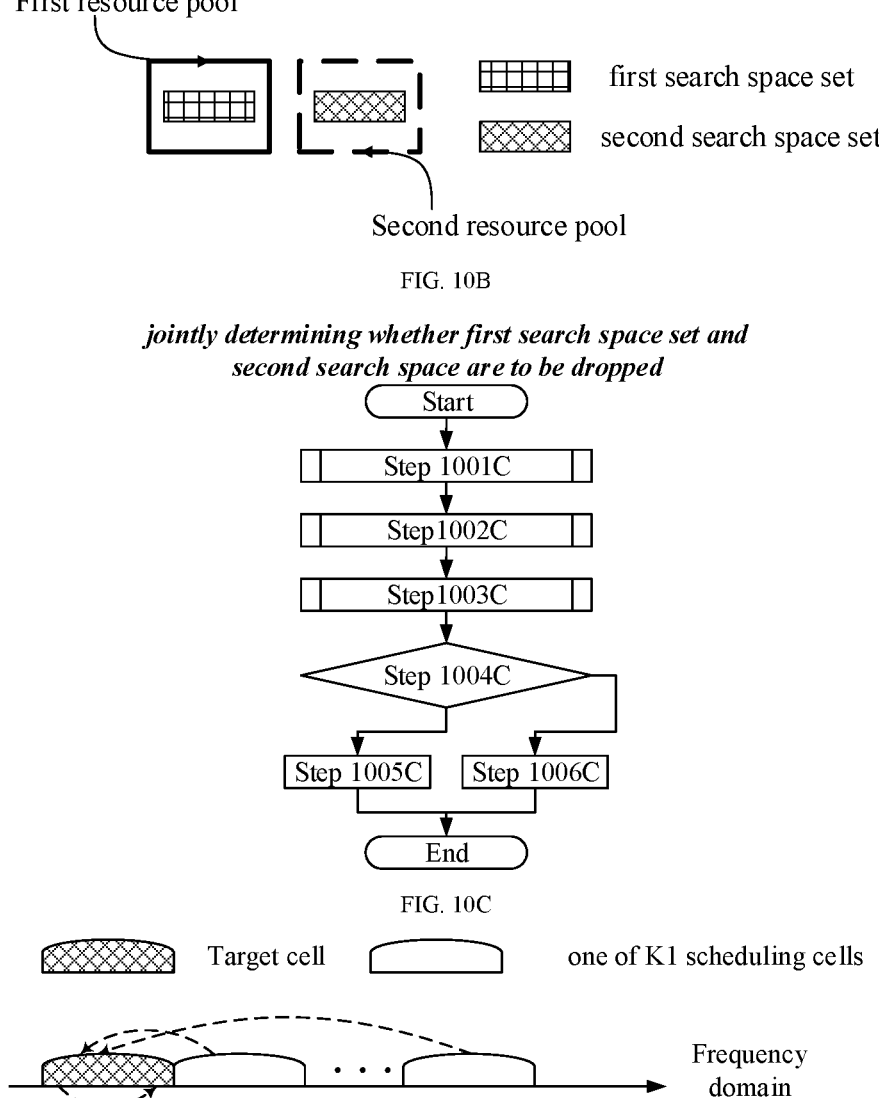
FIG. 10B illustrates a schematic diagram of a first search space set and a second search space set according to another embodiment of the present disclosure.
FIG. 10C illustrates a schematic diagram of sorting of blind detections of search spaces according to another embodiment of the present disclosure.
FIG. 11A illustrates a schematic diagram of K1 scheduling cells according to another embodiment of the present disclosure.

Embodiment 10B illustrates another schematic diagram of a first search space set and a second search space set according to the present disclosure: as shown in FIG. 10B. In FIG. 10B, time-frequency resources occupied by the first search space set belong to a first resource pool, the first resource pool being associated with a first control resource set pool, while time-frequency resources occupied by the second search space set belong to a second resource pool, the second resource pool being associated with a second control resource set pool: an index of the first control resource set pool is the first index, and an index of the second control resource set pool is the second index: the box framed with thick solid lines is the first resource pool, and the box framed with thick broken lines is the second resource pool.

In one embodiment, the first control resource set pool is associated with a first TRP, while the second control resource set pool is associated with a second TRP.

In one subembodiment, the first TRP and the second TRP belong to a same base station.

In one subembodiment, the first TRP and the second TRP belong to a same serving cell.

In one subembodiment, the first TRP and the second TRP belong to different serving cells respectively.

In one embodiment, the first control resource set pool is a CORESET Pool, and the second control resource set pool is a CORESET Pool.

In one subembodiment, the first resource pool is a CORESET in the CORESET Pool.

In one subembodiment, the second resource pool is a CORESET in the CORESET Pool.

Embodiment 10C

Embodiment 10C illustrates another schematic diagram of sorting of blind detections of search spaces according to the present disclosure: as shown in FIG. 10C. In FIG. 10C, both the first search space set and the second search space set employ a first SCS: a first threshold is a maximum number of control channel candidates monitored by the first node for a serving cell in a DL BWP under the first SCS and in the first time window, and a second threshold is a maximum number of Non-overlapped CCEs monitored by the first node for a serving cell in a DL BWP under the first SCS and in the first time window: the number of control signaling candidates comprised by the first search space set is equal to M1, and the number of Non-overlapped CCEs comprised by the first search space set is equal to N1: the number of control signaling candidates comprised by the second search space set is equal to M2, and the number of Non-overlapped CCEs comprised by the second search space set is equal to N2: the M1, the N1, the M2 and the N2 are positive integers greater than 1.

The first node determines whether to monitor control signaling candidate(s) in the first search space set according to the following steps:

In step 1001C, determining a first threshold and a second threshold:

In step 1002C, determining that a CSS employing the first SCS occupies P1 control signaling candidates and R1 non-overlapped CCEs to complete the CSS monitoring: P1 and R1 are positive integers greater than 1:

In step 903C, determining that the first threshold being subtracted by P1 is equal to a first value, and that the second threshold being subtracted by R1 is equal to a second value:

In step 1004C, comparing the priority of a second search space set and the first search space set: if the second search space set is of a higher priority, enter the step 1005C: or, if the first search space set is of a higher priority, enter the step 1006C:

In step 1005C, preferentially assigning control signaling candidates of which the number is the first value and non-overlapped CCEs of which the number is the second value to the second search space set, and monitoring the second search space set; and then judging whether remaining control signaling candidates and non-overlapped CCEs are sufficient for use for the first search space, if so, monitoring the first search space; if not, dropping the monitoring of the first search space:

In step 1006C, preferentially assigning control signaling candidates of which the number is the first value and non-overlapped CCEs of which the number is the second value to the first search space set, and monitoring the first search space set; and then judging whether remaining control signaling candidates and non-overlapped CCEs are sufficient for use for the second search space, if so, monitoring the second search space: if not, dropping the monitoring of the second search space.

Embodiment 11A

Embodiment 11A illustrates another schematic diagram of K1 scheduling cells according to the present disclosure: as shown in FIG. 11A. In FIG. 11A, the K1 scheduling cells respectively correspond to K1 first coefficients, and each of the K1 first coefficients is a positive integer, and a quotient of a sum of the K1 first coefficients and K1 is equal to a target value: when the target value is less than a target threshold, the target cell belongs to the first cell group: when the target value is no less than the target threshold, the target cell belongs to the second cell group: the target threshold is a positive real number. First coefficient #1 to first coefficient #K1 illustrated in the figure correspond to the K1 scheduling cells.

In one embodiment, a given scheduling cell is any one of the K1 scheduling cells, and the given scheduling cell corresponds to a given first coefficient of the K1 first coefficients: when a number of control resource pool(s) provided in the given scheduling cell is less than 2, the given first coefficient is equal to 1; when the number of control resource pools provided in the given scheduling cell is greater than or equal to 2, the given first coefficient is equal to 2.

In one embodiment, the K1 first coefficients are configured through a higher-layer signaling.

In one embodiment, a given scheduling cell is any one of the K1 scheduling cells, and the given scheduling cell corresponds to a given first coefficient of the K1 first coefficients: the given coefficient is equal to the number of control resource pool(s) provided in the given scheduling cell.

In one embodiment, the target threshold is pre-defined.

In one embodiment, the target threshold is configured through a higher-layer signaling.

In one embodiment, the target threshold is greater than 1.

In one embodiment, the target threshold is equal to 2.

Embodiment 11B

Figures 11B, 11C:
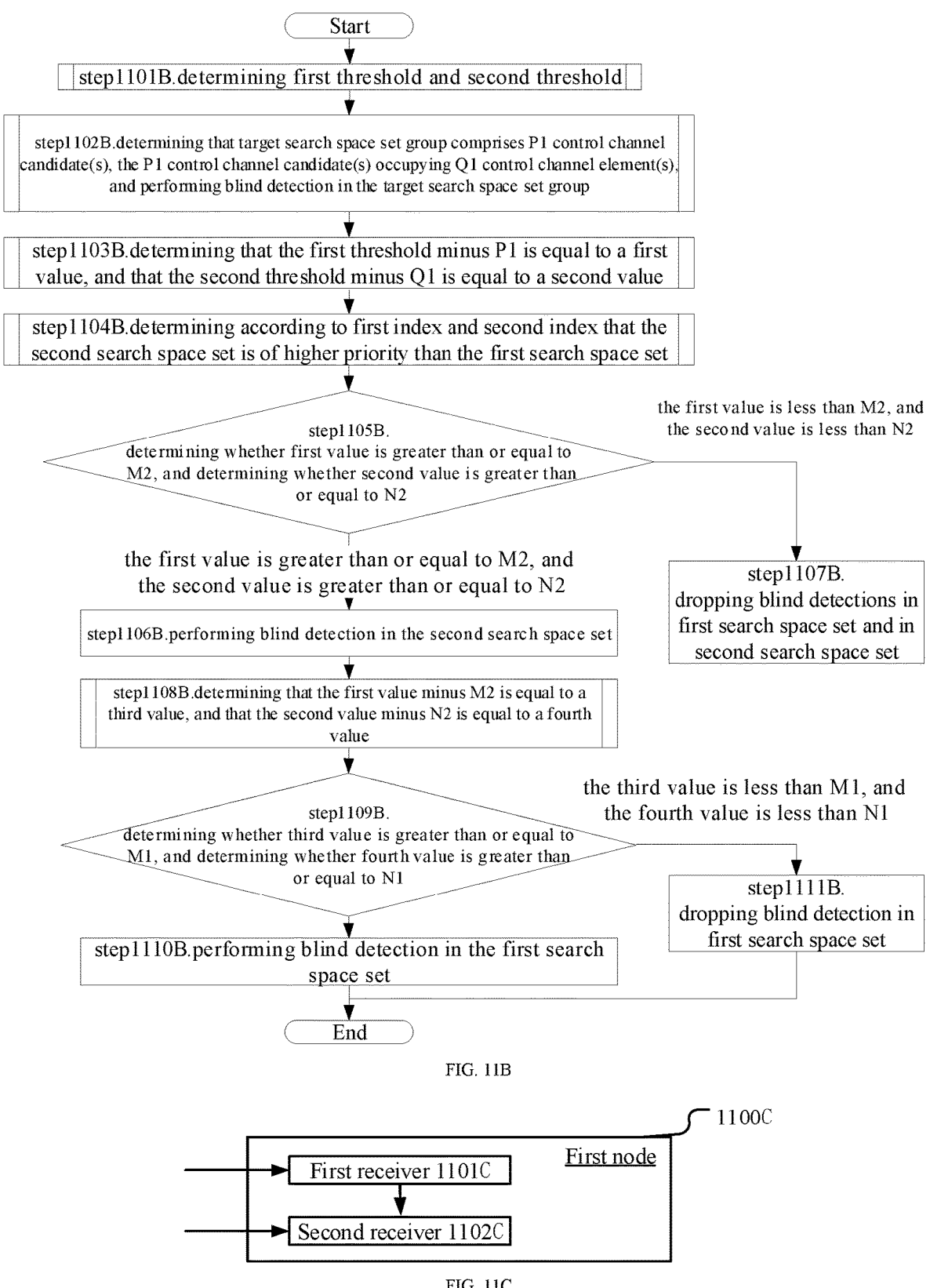
FIG. 11B illustrates a schematic diagram of sorting of blind detections of search spaces according to one embodiment of the present disclosure.
FIG. 11C illustrates a structure block diagram of a processing device in a first node according to one embodiment of the present disclosure.

Embodiment 11B illustrates a schematic diagram of sorting of blind detections according to the present disclosure: as shown in FIG. 11B. In FIG. 11B, the first node determines a search space to be dropped in blind detections according to the following steps:

In step 1101B, determining a first threshold and a second threshold:

In step 1102B, determining that a target search space set group comprises P1 control channel candidates, the P1 control channel candidates occupying Q1 CCEs, and performing blind detections in the target search space set group:

In step 1103B, determining that the first threshold being subtracted by P1 is equal to a first value, and the second threshold being subtracted by Q1 is equal to a second value:

In step 1104B, determining that the second search space set is of a higher priority than the first search space set according to a first index and a second index:

In step 1105B, determining whether the first value is greater than or equal to M2, and whether the second value is greater than or equal to N2: when the first value is greater than or equal to M2, and the second value is greater than or equal to N2, enter step 1106B; otherwise enter step 1107B;

In step 1106B, performing blind detection in the second search space set:

In step 1107B, dropping blind detections in the first search space set and the second search space set:

In step 1108B, determining that the first value being subtracted by M2 is equal to a third value, and the second value being subtracted by N2 is equal to a fourth value:

In step 1109B, determining whether the third value is greater than or equal to M1, and whether the fourth value is greater than or equal to N1: when the third value is greater than or equal to M1, and the fourth value is greater than or equal to N1, enter step 1110B; otherwise enter step 1111B.

In step 11010B, performing blind detection in the first search space set:

In step 1111B, dropping blind detection in the first search space set.

In one embodiment, the first value is a non-negative integer.

In one embodiment, the second value is a non-negative integer.

In one embodiment, the third value is a non-negative integer.

In one embodiment, the fourth value is a non-negative integer.

In one embodiment, the second node in the present disclosure ensures that the first threshold is greater than P1, and the second threshold is greater than Q1.

Embodiment 11C

Embodiment 11C illustrates a structure block diagram of a processing device in a first node, as shown in FIG. 11C. In FIG. 11C, a first node 1100C comprises a first receiver 1101C and a second receiver 1102C.

The first receiver 1101C receives first information, the first information being used to indicate a first search space set:

The second receiver 1102C monitors a target control signaling candidate set in a first time window, the target control signaling candidate set comprising a positive integer number of control signaling candidate(s).

In Embodiment 11C, the first search space set comprises a positive integer number of control signaling candidate(s); frequency-domain resources occupied by any control signaling candidate comprised by the first search space set belong to a first serving cell, and a first scheduled cell set comprises a scheduled cell of the first serving cell: a target cell is a serving cell other than the first serving cell, whether the first scheduled cell set comprises the target cell is used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, the first receiver 1102C receives second information: the second information is used to determine a scheduling cell of the target cell: when the scheduling cell of the target cell includes the first serving cell, the target cell belongs to the first scheduled cell set: when the scheduling cell of the target cell does not include the first serving cell, the target cell does not belong to the first scheduled cell set.

In one embodiment, the first serving cell, the target cell and any serving cell comprised in the first scheduled cell set all belong to a first cell group, and the target cell is a primary cell in the first cell group.

In one embodiment, when the first scheduled cell set does not comprise the target cell, a control signaling candidate comprised by the first search space set belongs to the target control signaling candidate set.

In one embodiment, when the first scheduled cell set comprises the target cell: the first information is used for indicating a second search space set, the second search space set comprising a positive integer number of control signaling candidate(s), frequency-domain resources occupied by the second search space set belong to a second serving cell, and any serving cell in a second scheduled cell set can be scheduled by the second serving cell, the second scheduled cell set comprising the target cell: an SCS of subcarriers occupied by a control signaling candidate in the first search space set in frequency domain is a first SCS, and an SCS of subcarriers occupied by a control signaling candidate in the second search space set in frequency domain is a second SCS: the first SCS and the second SCS are jointly used to determine whether a control signaling candidate comprised by the first search space set belongs to the target control signaling candidate set.

In one embodiment, the first SCS is different from the second SCS, whether a control signaling candidate comprised by the first search space set belongs to the target control signaling candidate set is unrelated to the second search space set.

In one embodiment, the first SCS is the same as the second SCS, a first search space set ID and a second search space set ID are respectively used to identify the first search space set and the second search space set, of which the first search space set is associated with a first index, while the second search space set is associated with a second index, the first index and the second index being non-negative integers: the first index and the second index are jointly used to determine whether a control signaling candidate comprised by the first search space set belongs to the target control signaling candidate set.

In one embodiment, a first threshold is a maximum number of control channel candidates monitored by the first node for a serving cell in a DL BWP under the first SCS and in the first time window, and a second threshold is a maximum number of Non-overlapped CCEs monitored by the first node for a serving cell in a DL BWP under the first SCS and in the first time window: a number of control channel candidates monitored by the first node in a DL BWP in the first serving cell is no greater than the first threshold, and a number of Non-overlapped CCEs monitored by the first node in a DL BWP in the first serving cell is no greater than the second threshold: a third threshold is a maximum number of control channel candidates monitored by the first node for a serving cell in a DL BWP under the second SCS and in a second time window, and a fourth threshold is a maximum number of Non-overlapped CCEs monitored by the first node for a serving cell in a DL BWP under the second SCS and in the second time window: a number of control channel candidates monitored by the first node in a DL BWP in the second serving cell is no greater than the third threshold, and a number of Non-overlapped CCEs monitored by the first node in a DL BWP in the second serving cell is no greater than the fourth threshold: the second time window and the first time window are overlapping, and the second SCS is used to determine the second time window.

In one embodiment, when the first index is larger than the second index, each control signaling candidate comprised in the second search space set belongs to the target control signaling candidate set, and no control signaling candidate comprised in the first search space set belongs to the target control signaling candidate set: when the first index is smaller than the second index, each control signaling candidate comprised in the first search space set belongs to the target control signaling candidate set, and no control signaling candidate comprised in the second search space set belongs to the target control signaling candidate set.

In one embodiment, the second receiver 1102C receives a first signaling: the first signaling occupies one or more control signaling candidates of a positive integer number of control signaling candidates comprised by the target control signaling candidate set.

In one embodiment, the first receiver 1101C comprises at least the first four of the antenna 452, the receiver 454, the multi-antenna receiving processor 458, the receiving processor 456 and the controller/processor 459 in Embodiment 4.

In one embodiment, the second receiver 1102C comprises at least the first four of the antenna 452, the receiver 454, the multi-antenna receiving processor 458, the receiving processor 456 and the controller/processor 459 in Embodiment 4.

Embodiment 12A

Figures 12A, 12B, 12C, 13A, 13B:
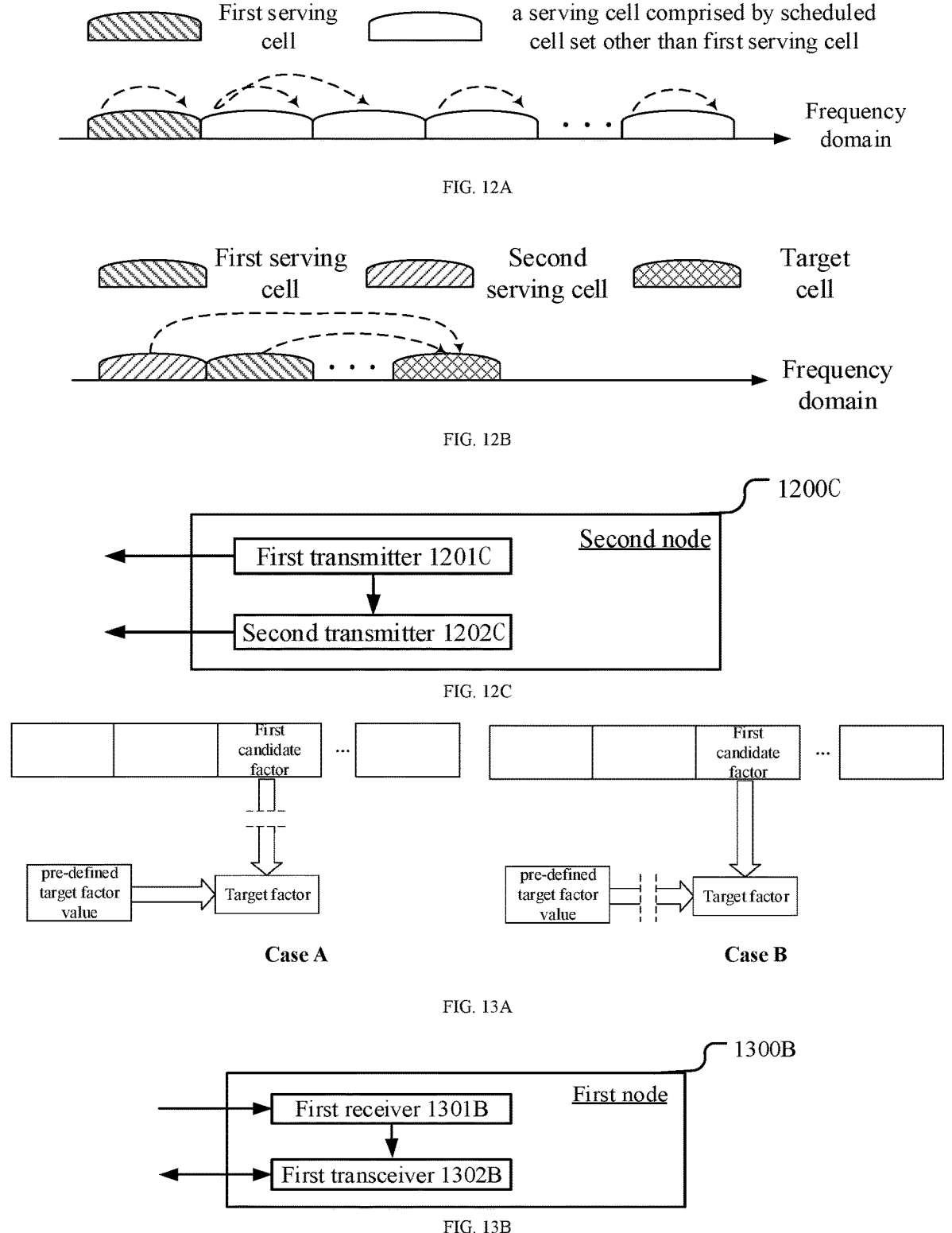
FIG. 12A illustrates a schematic diagram of a first serving cell according to one embodiment of the present disclosure.
FIG. 12B illustrates a schematic diagram of a target cell according to one embodiment of the present disclosure.
FIG. 12C illustrates a structure block diagram of a processing device in a second node according to one embodiment of the present disclosure.
FIG. 13A illustrates a schematic diagram of a relation between a first candidate factor and a target factor according to one embodiment of the present disclosure.
FIG. 13B illustrates a structure block diagram of a processing device in a first node according to one embodiment of the present disclosure.

Embodiment 12A illustrates a schematic diagram of a first serving cell according to the present disclosure: as shown in FIG. 12A. In FIG. 12A, the horizontal axis represents frequency, each box with a circular arc top represents a serving cell comprised by a scheduled cell set, each blank box with a circular arc top represents a serving cell comprised by a scheduled cell set other than a first serving cell, and the slash-filled box with a circular arc top represents the first serving cell, and a curved dotted line with an arrow represents a scheduling and scheduled relation between two serving cells. As illustrated in FIG. 12A, the first serving cell is only scheduled by one scheduling cell.

In one embodiment, when the number of control resource pool(s) provided in the scheduling cell for the first serving cell is equal to 1 or there is no control resource pool being provided in the scheduling cell for the first serving cell, the first serving cell belongs to the first cell group: when the number of control resource pools provided in the scheduling cell for the first serving cell is greater than 1, the first serving cell belongs to the second cell group.

Embodiment 12B

Embodiment 12B illustrates a schematic diagram of a target cell according to the present disclosure; as shown in FIG. 12B. In FIG. 12B, the horizontal axis represents frequency, the slash-filled and backslash-filled boxes with circular arc top respectively represent a first serving cell and a second serving cell, the cross-filled box with circular arc top represents a target cell, and each of the curved dotted lines with an arrow represents a scheduling and scheduled relation between any two of the first serving cell, the second serving cell and the target cell. As illustrated in FIG. 12B, there is more than one scheduling cell capable of scheduling the target cell.

Embodiment 12C

Embodiment 12C illustrates a structure block diagram of a processing device in a second node, as shown in FIG. 12C. In FIG. 12C, a second node 1200C comprises a first transmitter 1201C and a second transmitter 1202C.

The first transmitter 1201C transmits first information, the first information being used to indicate a first search space set:

The second transmitter 1202C determines a target control signaling candidate set in a first time window, the target control signaling candidate set comprising a positive integer number of control signaling candidate(s).

In Embodiment 12C, the first search space set comprises a positive integer number of control signaling candidate(s): frequency-domain resources occupied by any control signaling candidate comprised by the first search space set belong to a first serving cell, and a first scheduled cell set comprises a scheduled cell of the first serving cell: a target cell is a serving cell other than the first serving cell, whether the first scheduled cell set comprises the target cell is used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, the first transmitter 1201C transmits second information: the second information is used to determine a scheduling cell of the target cell: when the scheduling cell of the target cell includes the first serving cell, the target cell belongs to the first scheduled cell set: when the scheduling cell of the target cell does not include the first serving cell, the target cell does not belong to the first scheduled cell set.

In one embodiment, the first serving cell, the target cell and any serving cell comprised in the first scheduled cell set all belong to a first cell group, and the target cell is a primary cell in the first cell group.

In one embodiment, when the first scheduled cell set does not comprise the target cell, a control signaling candidate comprised by the first search space set belongs to the target control signaling candidate set.

In one embodiment, when the first scheduled cell set comprises the target cell: the first information is used for indicating a second search space set, the second search space set comprising a positive integer number of control signaling candidate(s), frequency-domain resources occupied by the second search space set belong to a second serving cell, and any serving cell in a second scheduled cell set can be scheduled by the second serving cell, the second scheduled cell set comprising the target cell: an SCS of subcarriers occupied by a control signaling candidate in the first search space set in frequency domain is a first SCS, and an SCS of subcarriers occupied by a control signaling candidate in the second search space set in frequency domain is a second SCS: the first SCS and the second SCS are jointly used to determine whether a control signaling candidate comprised by the first search space set belongs to the target control signaling candidate set.

In one embodiment, the first SCS is different from the second SCS, whether a control signaling candidate comprised by the first search space set belongs to the target control signaling candidate set is unrelated to the second search space set.

In one embodiment, the first SCS is the same as the second SCS, a first search space set ID and a second search space set ID are respectively used to identify the first search space set and the second search space set, of which the first search space set is associated with a first index, while the second search space set is associated with a second index, the first index and the second index being non-negative integers: the first index and the second index are jointly used to determine whether a control signaling candidate comprised by the first search space set belongs to the target control signaling candidate set.

In one embodiment, a receiver of the first information includes a first node: a first threshold is a maximum number of control channel candidates monitored by the first node for a serving cell in a DL BWP under the first SCS and in the first time window, and a second threshold is a maximum number of Non-overlapped CCEs monitored by the first node for a serving cell in a DL BWP under the first SCS and in the first time window: a number of control channel candidates monitored by the first node in a DL BWP in the first serving cell is no greater than the first threshold, and a number of Non-overlapped CCEs monitored by the first node in a DL BWP in the first serving cell is no greater than the second threshold: a third threshold is a maximum number of control channel candidates monitored by the first node for a serving cell in a DL BWP under the second SCS and in a second time window, and a fourth threshold is a maximum number of Non-overlapped CCEs monitored by the first node for a serving cell in a DL BWP under the second SCS and in the second time window: a number of control channel candidates monitored by the first node in a DL BWP in the second serving cell is no greater than the third threshold, and a number of Non-overlapped CCEs monitored by the first node in a DL BWP in the second serving cell is no greater than the fourth threshold: the second time window and the first time window are overlapping, and the second SCS is used to determine the second time window.

In one embodiment, when the first index is larger than the second index, each control signaling candidate comprised in the second search space set belongs to the target control signaling candidate set, and no control signaling candidate comprised in the first search space set belongs to the target control signaling candidate set: when the first index is smaller than the second index, each control signaling candidate comprised in the first search space set belongs to the target control signaling candidate set, and no control signaling candidate comprised in the second search space set belongs to the target control signaling candidate set.

In one embodiment, the second transmitter 1202C transmits a first signaling: the first signaling occupies one or more control signaling candidates of a positive integer number of control signaling candidates comprised by the target control signaling candidate set.

In one embodiment, the first transmitter 1201C comprises at least the first four of the antenna 420, the transmitter 418, the multi-antenna transmitting processor 471, the transmitting processor 416 and the controller/processor 475 in Embodiment 4.

In one embodiment, the first transmitter 1201C comprises at least the first four of the antenna 420, the transmitter 418, the multi-antenna transmitting processor 471, the transmitting processor 416 and the controller/processor 475 in Embodiment 4.

Embodiment 13A

Embodiment 13A illustrates a schematic diagram of a relation between a first candidate factor and a target factor according to the present disclosure, as shown in FIG. 13A. In FIG. 13A, each identified box represents a candidate factor in a first candidate factor set other than a first candidate factor; in Case A, a target factor is equal to a pre-defined value: in Case B, the target factor is equal to a first candidate factor.

In Embodiment 13A, the second information block in the present disclosure is used for indicating a first candidate factor from a first candidate factor set, the first candidate factor set comprising more than one candidate factor, the first candidate factor is a candidate factor comprised in the first candidate factor set, and any candidate factor comprised by the first candidate factor set is greater than 0; the third information block in the present disclosure is used for determining whether the target factor is equal to the first candidate factor; when the target factor is unequal to the first candidate factor, the target factor is equal to a predefined value.

In one embodiment, when the first node does not transmit indication information of the first candidate factor, the first candidate factor is equal to a default value.

In one embodiment, when the first node does not transmit indication information of the first candidate factor, the first candidate factor is equal to a predefined value.

In one embodiment, the first candidate factor set is predefined.

In one embodiment, the first candidate factor set is fixed.

In one embodiment, the first candidate factor set is configurable.

In one embodiment, any two candidate factors comprised by the first candidate factor set are unequal.

In one embodiment, the phrase that the target factor is equal to a predefined value means that the target factor is equal to 1.

In one embodiment, the phrase that the target factor is equal to a predefined value means that the target factor is equal to a fixed value other than 1.

In one embodiment, when the first node in the present disclosure is not provided information of whether the target factor is equal to the first candidate factor, the target factor is equal to a predefined value.

In one embodiment, when the first node in the present disclosure is not provided information of whether the target factor is equal to the first candidate factor, the target factor is equal to 1.

In one embodiment, when the first node in the present disclosure does not transmit indication information of the second parameter in the present disclosure, the target factor is equal to a predefined value.

In one embodiment, when the first node in the present disclosure does not transmit indication information of the second parameter in the present disclosure, the target factor is equal to 1.

Embodiment 13B

Embodiment 13B illustrates a structure block diagram of a processing device in a first node, as shown in FIG. 13B. In FIG. 13B, a first node 1300B comprises a first receiver 1301B and a first transceiver 1302B.

The first receiver 1301B receives first information, and the first information is used to indicate a first search space set and a second search space set, the first search space set comprising a positive integer number of control signaling candidate(s), and the second search space set comprising a positive integer number of control signaling candidate(s), a first Search Space Set ID and a second Search Space Set ID being used to respectively identify the first search space set and the second search space set;

The first transceiver 1302B monitors a target control signaling candidate set in a first time window, the target control signaling candidate set comprising a positive integer number of control signaling candidate(s).

In Embodiment 13B, time-frequency resources occupied by control signaling candidate(s) comprised in the first search space set belong to a first resource pool, while time-frequency resources occupied by control signaling candidate(s) comprised in the second search space set belong to a second resource pool: the first resource pool and the second resource pool are respectively associated with a first index and a second index, the first index and the second index being non-negative integers, respectively: any control signaling candidate comprised by the second search space set belongs to the target control signaling candidate set: the first index and the second index are jointly used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, the first index is a serving cell ID of a serving cell where frequency-domain resources occupied by the first resource pool are comprised, while the second index is a serving cell ID of a serving cell where frequency-domain resources occupied by the second resource pool are comprised, a relative magnitude of the first index and the second index is used to determine whether a control signaling candidate comprised by the first search space set belongs to the target control signaling candidate set.

In one embodiment, the first index is a serving cell ID of a serving cell capable of being scheduled by a control signaling candidate in the first search space set, while the second index is a serving cell ID of a serving cell capable of being scheduled by a control signaling candidate in the second search space set, a relative magnitude of the first index and the second index is used to determine whether a control signaling candidate comprised by the first search space set belongs to the target control signaling candidate set.

In one embodiment, the first resource pool is associated with a first control resource set pool, while the second resource pool is associated with a second control resource set pool: an index of the first control resource set pool is the first index, and an index of the second control resource set pool is the second index: a relative magnitude of the first index and the second index is used to determine whether a control signaling candidate comprised by the first search space set belongs to the target control signaling candidate set.

In one embodiment, the first index is a serving cell ID corresponding to a secondary cell, while the second serving cell ID corresponding to a primary cell.

In one embodiment, a serving cell scheduled by the first search space set is a SCell, and a serving cell scheduled by the second search space set is a PCell.

In one embodiment, the first receiver 1301B receives target information: the target information is used to determine a target search space set group, and search space sets comprised by the target search space set group make up a common search space, the target search space set group comprising P1 control channel candidate(s), and the P1 control channel candidate(s) occupying Q1 CCE(s): any of the P1 control channel candidate(s) is one of a positive integer number of control signaling candidate(s) comprised by the target control signaling candidate set.

In one embodiment, the first search space set comprises M1 control channel candidates, and a number of Non-overlapped CCEs in the first search space set is equal to N1. M1 being a positive integer greater than 1. N1 being a positive integer greater than 1: the second search space set comprises M2 control channel candidates, and a number of Non-overlapped CCEs in the second search space set is equal to N2, M2 being a positive integer greater than 1, N2 being a positive integer greater than 1: a sum of the P1, the M1 and the M2 is greater than a first threshold, and a sum of the P1 and the M2 is no greater than the first threshold: a sum of the Q1, the N1 and the N2 is greater than a second threshold, and a sum of the Q1 and the N2 is no greater than the second threshold: an SCS of subcarriers occupied by a control signaling candidate comprised in the target control signaling candidate set in frequency domain is a first SCS: the first threshold is a maximum number of control channel candidates monitored by the first node for a serving cell in a DL BWP under the first SCS and in the first time window: the second threshold is a maximum number of Non-overlapped CCEs monitored by the first node for a serving cell in a DL BWP under the first SCS and in the first time window.

In one embodiment, the first transceiver 1302B receives a first signaling, and the first transceiver 1302B receives a first signal in a target cell: the first signaling occupies a control signaling candidate in the target control signaling candidate set, and the first signaling is used to schedule the first signal: the first signaling indicates the target cell: frequency-domain resources occupied by the first search space set belong to a first serving cell: frequency-domain resources occupied by the second search space set belong to a second serving cell, and both the first serving cell and the second serving cell are scheduling cells of the target cell: the first serving cell is different from the second serving cell.

In one embodiment, the first transceiver 1302B receives a first signaling, and the first transceiver 1302B transmits a first signal in a target cell: the first signaling occupies a control signaling candidate in the target control signaling candidate set, and the first signaling is used to schedule the first signal: the first signaling indicates the target cell: frequency-domain resources occupied by the first search space set belong to a first serving cell: frequency-domain resources occupied by the second search space set belong to a second serving cell, and both the first serving cell and the second serving cell are scheduling cells of the target cell: the first serving cell is different from the second serving cell.

In one embodiment, the first receiver 1301B comprises at least the first four of the antenna 452, the receiver 454, the multi-antenna receiving processor 458, the receiving processor 456 and the controller/processor 459 in Embodiment 4.

In one embodiment, the first transceiver 1302B comprises at least the first six of the antenna 452, the receiver 454, the multi-antenna receiving processor 458, the receiving processor 456, the transmitter 454, the multi-antenna transmitting processor 457, the transmitting processor 468 and the controller/processor 459 in Embodiment 4.

Embodiment 13C

Figures 13C, 14A, 14B, 15A, 16A, 17A:
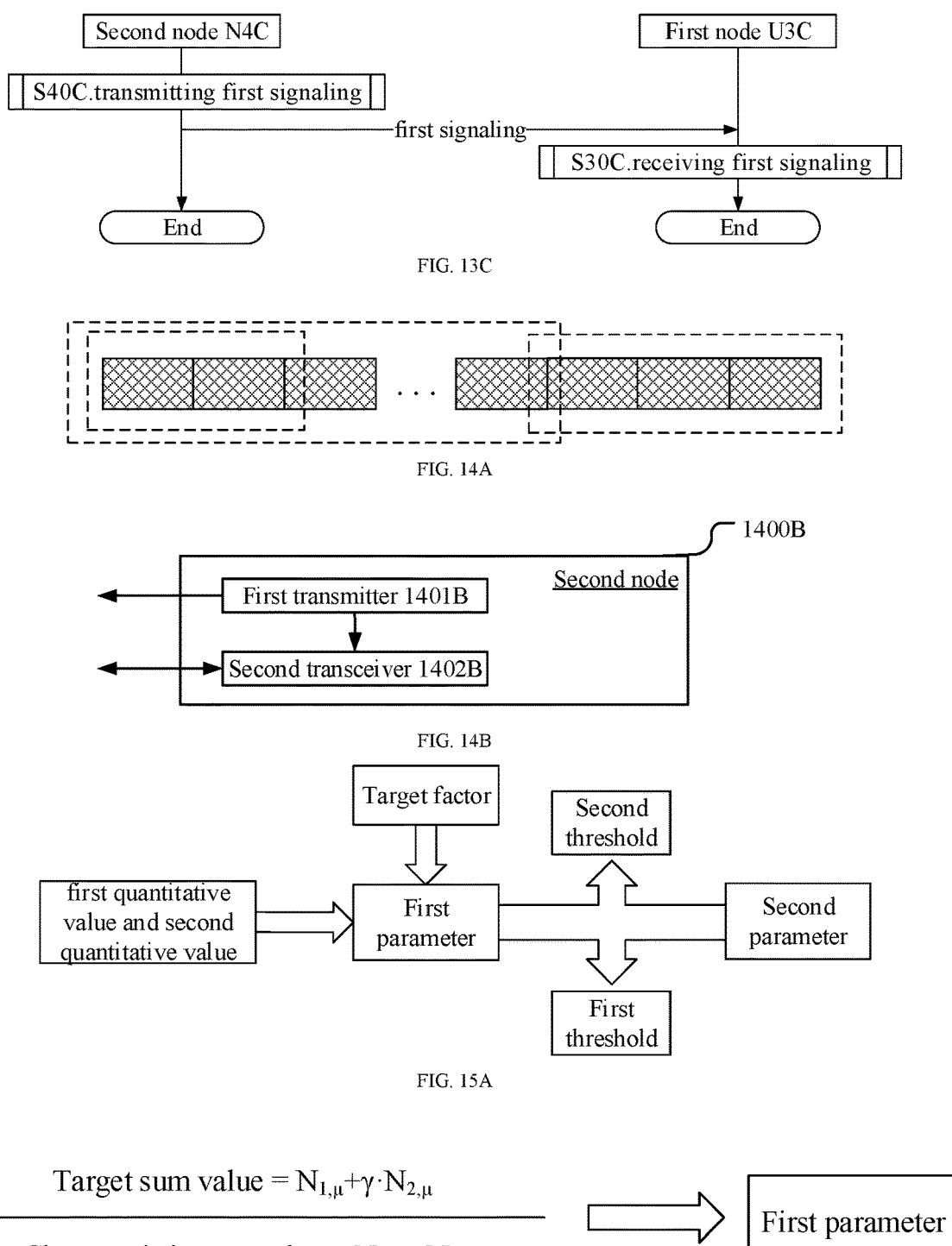
FIG. 13C illustrates a flowchart of a first signaling.
FIG. 14A illustrates a schematic diagram of G candidate factor sets according to one embodiment of the present disclosure.
FIG. 14B illustrates a structure block diagram of a processing device in a second node according to one embodiment of the present disclosure.
FIG. 15A illustrates a schematic diagram of relations among a first parameter, a second parameter, a first threshold and a second threshold according to one embodiment of the present disclosure.
FIG. 16A illustrates a schematic diagram of a target sum value and a characteristic sum value according to one embodiment of the present disclosure.
FIG. 17A illustrates a schematic diagram of a second parameter according to one embodiment of the present disclosure.

Embodiment 13C illustrates a flowchart of a first signaling, as shown in FIG. 13C. In FIG. 13C, a first node U3C and a second node N4C are in communications via a radio link. It is particularly noted that the sequences of these embodiments do not set any restriction over the orders of signal transmissions and implementations in the present disclosure. Steps identified by the box FOC are optional.

The first node U3C receives a first signaling in step S30C.

The second node N4C transmits a first signaling in step S40C.

In Embodiment 13C, the first signaling occupies one or more control signaling candidates of a positive integer number of control signaling candidates comprised by the target control signaling candidate set.

In one embodiment, the first signaling is a PDCCH.

In one embodiment, the first signaling is a DL Grant.

In one embodiment, the first signaling is a UL Grant.

In one embodiment, the first signaling is a physical layer signaling.

In one embodiment, the first signaling is used for scheduling a data channel.

Embodiment 14A

Embodiment 14A illustrates a schematic diagram of G candidate factor sets according to the present disclosure, as shown in FIG. 14A. In FIG. 14A, each cross-filled rectangle represents a candidate factor comprised by G candidate factors sets, and each rectangle framed with dotted lines belongs to one of the G candidate factors sets.

In Embodiment 14A, the first candidate factor set in the present disclosure is one of G candidate factor sets, G being a positive integer greater than 1: any of the G candidate factor sets comprises more than one candidate factor: the fourth information block in the present disclosure is used to indicate the first candidate factor set out of the G candidate factor sets.

In one embodiment, when the first node does not transmit indication information of the first candidate factor set, the first candidate factor set comprises a default candidate factor.

In one embodiment, when the first node does not transmit indication information of the first candidate factor set, the first candidate factor set comprises a predefined candidate factor.

In one embodiment, when the first node in the present disclosure does not transmit indication information of the second parameter in the present disclosure, the first candidate factor set comprises a default candidate factor.

In one embodiment, when the first node in the present disclosure does not transmit indication information of the second parameter in the present disclosure, the first candidate factor set comprises a predefined candidate factor.

In one embodiment, any candidate factor comprised by any one of the G candidate factor sets is greater than 0.

In one embodiment, G is equal to 2.

In one embodiment, G is greater than 2.

In one embodiment, any two candidate factor sets of the G candidate factor sets are different.

In one embodiment, there isn't any candidate factor belonging to two of the G candidate factor sets simultaneously.

In one embodiment, there is a candidate factor belonging to two of the G candidate factor sets simultaneously.

In one embodiment, there is one candidate factor set of the G candidate factor sets in which any candidate factor comprised belongs to the other one of the G candidate factor sets.

In one embodiment, there is one candidate factor set of the G candidate factor sets comprising the other one candidate factor set.

In one embodiment, a second candidate factor set is one of the G candidate factor sets other than the first candidate factor set: the first candidate factor set comprises the second candidate factor set, or, the second candidate factor set comprises the first candidate factor set.

In one embodiment, a second candidate factor set is one of the G candidate factor sets other than the first candidate factor set: any candidate factor comprised by the first candidate factor set belongs to the second candidate factor set, or, any candidate factor comprised by the second candidate factor set belongs to the first candidate factor set.

In one embodiment, the first transceiver receives a seventh information block, the seventh information block being used to indicate the first candidate factor set.

Embodiment 14B

Embodiment 14B illustrates a structure block diagram of a processing device in a second node, as shown in FIG. 14B. In FIG. 14B, a second node 1400B comprises a first transmitter 1401B and a second transceiver 1402B.

The first transmitter 1401B transmits first information, and the first information is used to indicate a first search space set and a second search space set, the first search space set comprising a positive integer number of control signaling candidate(s), and the second search space set comprising a positive integer number of control signaling candidate(s), a first Search Space Set ID and a second Search Space Set ID being used to respectively identify the first search space set and the second search space set:

The second transceiver 1402B determines a target control signaling candidate set in a first time window, the target control signaling candidate set comprising a positive integer number of control signaling candidate(s).

In Embodiment 14B, time-frequency resources occupied by control signaling candidate(s) comprised in the first search space set belong to a first resource pool, while time-frequency resources occupied by control signaling candidate(s) comprised in the second search space set belong to a second resource pool: the first resource pool and the second resource pool are respectively associated with a first index and a second index, the first index and the second index being non-negative integers, respectively: any control signaling candidate comprised by the second search space set belongs to the target control signaling candidate set: the first index and the second index are jointly used to determine whether a control signaling candidate comprised by the first search space set belongs to the target control signaling candidate set: an SCS of subcarriers occupied by a control signaling candidate comprised in the target control signaling candidate set in frequency domain is used to determine a length of the first time window.

In one embodiment, the first index is a serving cell ID of a serving cell where frequency-domain resources occupied by the first resource pool are comprised, while the second index is a serving cell ID of a serving cell where frequency-domain resources occupied by the second resource pool are comprised, a relative magnitude of the first index and the second index is used to determine whether a control signaling candidate comprised by the first search space set belongs to the target control signaling candidate set.

In one embodiment, the first index is a serving cell ID of a serving cell capable of being scheduled by a control signaling candidate in the first search space set, while the second index is a serving cell ID of a serving cell capable of being scheduled by a control signaling candidate in the second search space set, a relative magnitude of the first index and the second index is used to determine whether a control signaling candidate comprised by the first search space set belongs to the target control signaling candidate set.

In one embodiment, the first resource pool is associated with a first control resource set pool, while the second resource pool is associated with a second control resource set pool: an index of the first control resource set pool is the first index, and an index of the second control resource set pool is the second index: a relative magnitude of the first index and the second index is used to determine whether a control signaling candidate comprised by the first search space set belongs to the target control signaling candidate set.

In one embodiment, the first index is a serving cell ID corresponding to a secondary cell, while the second serving cell ID corresponding to a primary cell.

In one embodiment, a serving cell scheduled by the first search space set is a SCell, and a serving cell scheduled by the second search space set is a PCell.

In one embodiment, the first transmitter 1401B transmits target information: the target information is used to determine a target search space set group, and search space sets comprised by the target search space set group make up a common search space, the target search space set group comprising P1 control channel candidate(s), and the P1 control channel candidate(s) occupying Q1 CCE(s): any of the P1 control channel candidate(s) is one of a positive integer number of control signaling candidate(s) comprised by the target control signaling candidate set.

In one embodiment, the first search space set comprises M1 control channel candidates, and a number of Non-overlapped CCEs in the first search space set is equal to N1. M1 being a positive integer greater than 1. N1 being a positive integer greater than 1: the second search space set comprises M2 control channel candidates, and a number of Non-overlapped CCEs in the second search space set is equal to N2. M2 being a positive integer greater than 1. N2 being a positive integer greater than 1: a sum of the P1, the M1 and the M2 is greater than a first threshold, and a sum of the P1 and the M2 is no greater than the first threshold: a sum of the Q1, the N1 and the N2 is greater than a second threshold, and a sum of the Q1 and the N2 is no greater than the second threshold: an SCS of subcarriers occupied by a control signaling candidate comprised in the target control signaling candidate set in frequency domain is a first SCS: a receiver of the first information includes a first node: the first threshold is a maximum number of control channel candidates monitored by the first node for a serving cell in a DL BWP under the first SCS and in the first time window; the second threshold is a maximum number of Non-overlapped CCEs monitored by the first node for a serving cell in a DL BWP under the first SCS and in the first time window.

In one embodiment, the second transceiver 1402B transmits a first signaling, and the second transceiver 1402B transmits a first signal in a target cell: the first signaling occupies a control signaling candidate in the target control signaling candidate set, and the first signaling is used to schedule the first signal: the first signaling indicates the target cell: frequency-domain resources occupied by the first search space set belong to a first serving cell: frequency-domain resources occupied by the second search space set belong to a second serving cell, and both the first serving cell and the second serving cell are scheduling cells of the target cell: the first serving cell is different from the second serving cell.

In one embodiment, the second transceiver 1402B transmits a first signaling, and the second transceiver 1402B receives a first signal in a target cell: the first signaling occupies a control signaling candidate in the target control signaling candidate set, and the first signaling is used to schedule the first signal: the first signaling indicates the target cell: frequency-domain resources occupied by the first search space set belong to a first serving cell: frequency-domain resources occupied by the second search space set belong to a second serving cell, and both the first serving cell and the second serving cell are scheduling cells of the target cell: the first serving cell is different from the second serving cell.

In one embodiment, the first transmitter 1401B comprises at least the first four of the antenna 420, the transmitter 418, the multi-antenna transmitting processor 471, the transmitting processor 416 and the controller/processor 475 in Embodiment 4.

In one embodiment, the second transceiver 1402B comprises at least the first six of the antenna 420, the transmitter 418, the multi-antenna transmitting processor 471, the transmitting processor 416, the receiver 418, the multi-antenna receiving processor 472, the receiving processor 470 and the controller/processor 475 in Embodiment 4.

Embodiment 15A

Embodiment 15A illustrates a schematic diagram of relations among a first parameter, a second parameter, a first threshold and a second threshold according to the present disclosure, as shown in FIG. 15A. In FIG. 15A, a rectangular box represents a first quantitative value and a second quantitative value, a box represents a target factor, a box represents a first parameter, and a box represents a second parameter, a box represents a first threshold, and a box represents a second threshold, with an arrow indicating the procedure of determination.

In Embodiment 15A, the first quantitative value, the second quantitative value in the present disclosure and the target factor in the present disclosure are used together for determining a first parameter:

the first parameter is used with a second parameter for determining the first threshold in the present disclosure and the second threshold in the present disclosure: the second parameter is a positive integer.

In one embodiment, the first parameter is greater than 0.

In one embodiment, the first parameter is less than or equal to 1 and greater than 0.

In one embodiment, the first parameter is equal to 1.

In one embodiment, the first parameter is less than 1 and greater than 0.

In one embodiment, the first parameter is greater than 1.

In one embodiment, the phrase that "the first quantitative value, the second quantitative value and the target factor are used together for determining a first parameter" includes a meaning that the first quantitative value, the second quantitative value and the target factor are used together by the first node in the present disclosure for determining a first parameter.

In one embodiment, the phrase that "the first quantitative value, the second quantitative value and the target factor are used together for determining a first parameter" includes a meaning that the first quantitative value, the second quantitative value and the target factor are used together for determining a first parameter according to a given mapping relation.

In one embodiment, the phrase that "the first quantitative value, the second quantitative value and the target factor are used together for determining a first parameter" includes a meaning that the first quantitative value, the second quantitative value and the target factor are used together for determining a first parameter according to a given arithmetic function.

In one embodiment, the phrase that "the first parameter is used with a second parameter for determining the first threshold and the second threshold" includes a meaning that the first parameter is used with a second parameter by the first node in the present disclosure for determining the first threshold and the second threshold.

In one embodiment, the phrase that "the first parameter is used with a second parameter for determining the first threshold and the second threshold" includes a meaning that the first parameter is used with a second parameter for determining the first threshold and the second threshold according to a given mapping relation.

In one embodiment, the phrase that "the first parameter is used with a second parameter for determining the first threshold and the second threshold" includes a meaning that the first parameter is used with a second parameter for determining the first threshold and the second threshold according to a given functional relation.

In one embodiment, the phrase that "the first parameter is used with a second parameter for determining the first threshold and the second threshold" includes a meaning that the first threshold is proportional to the first parameter, and the first threshold is proportional to the second parameter, the second threshold is proportional to the first parameter, and the second threshold is proportional to the second parameter.

In one embodiment, the phrase that "the first parameter is used with a second parameter for determining the first threshold and the second threshold" includes a meaning that the first threshold is proportional to a product of the first parameter and the second parameter, and the second threshold is proportional to a product of the first parameter and the second parameter.

In one embodiment, the phrase that "the first parameter is used with a second parameter for determining the first threshold and the second threshold" includes a meaning that the first threshold is equal to a first intermediate threshold being rounded down to a nearest integer, the first intermediate threshold being proportional to a product of the first parameter and the second parameter: the second threshold is equal to a second intermediate threshold being rounded down to a nearest integer, the second intermediate threshold being proportional to a product of the first parameter and the second parameter.

In one embodiment, the phrase that "the first parameter is used with a second parameter for determining the first threshold and the second threshold" includes a meaning that the first threshold is equal to a maximum integer no greater than a first intermediate threshold, the first intermediate threshold being proportional to a product of the first parameter and the second parameter: the second threshold is equal to a maximum integer no greater than a second intermediate threshold, the second intermediate threshold being proportional to a product of the first parameter and the second parameter.

In one embodiment, the phrase that "the first parameter is used with a second parameter for determining the first threshold and the second threshold" includes a meaning that the first threshold is equal to a maximum integer no greater than a first intermediate threshold, the first intermediate threshold being proportional to the first parameter and proportional to the second parameter: the second threshold is equal to a maximum integer no greater than a second intermediate threshold, the second intermediate threshold being proportional to the first parameter and proportional to the second parameter.

In one embodiment, the phrase that "the first parameter is used with a second parameter for determining the first threshold and the second threshold" is realized through the following formulas:

$$M_{PDCCH}^{total,slot,\mu} = \left\lfloor N_{cells}^{cap} \cdot M_{PDCCH}^{max,slot,\mu} \cdot P_{cells}^{DL,\mu} \right\rfloor$$

$$C_{PDCCH}^{total,slot,\mu} = \left\lfloor N_{cells}^{cap} \cdot C_{PDCCH}^{max,slot,\mu} \cdot P_{cells}^{DL,\mu} \right\rfloor$$

Herein, $$M_{PDCCH}^{total,slot,\mu}$$

represents the first threshold, and $$C_{PDCCH}^{total,slot,\mu}$$

represents the second threshold, $$P_{cells}^{DL,\mu}$$

represents the first parameter in the present disclosure, $$N_{cells}^{cap}$$

represents the second parameter in the present disclosure, $$M_{PDCCH}^{max,slot,\mu}$$

represents a parameter related to the first SCS, $$C_{PDCCH}^{max,slot,\mu}$$

represents a parameter related to the first SCS other than $$M_{PDCCH}^{max,slot,\mu}, \mu$$

represents an index of the frist SCS, and [Z]represents a maximum integer no greater than Z.

In one embodiment, the first parameter and the second parameter are inter-associated.

In one embodiment, the first parameter and the second parameter are unrelated.

In one embodiment, the first parameter and the second parameter are independent.

Embodiment 16A

Embodiment 16A illustrates a schematic diagram of a target sum value and a characteristic sum value according to the present disclosure, as shown in FIG. 16A. In FIG. 16A, $N_{1,u}$ represents a first quantitative value, and $N_2.u$ represents a second quantitative value, $N_1$ represents a number of serving cells comprised by a first cell group associated with at least one control channel candidate, $N_2$ represents a number of serving cells comprised by a second cell group associated with at least one control channel candidate, y represents a target factor.

In Embodiment 16A, the first parameter in the present disclosure is a ratio of a target sum value to a characteristic sum value, the target sum value being no greater than the characteristic sum value: the characteristic sum value is linear with a number of serving cells comprised in the first cell group being associated with at least one control channel candidate in the present disclosure, and the characteristic sum value is linear with a product of a number of serving cells comprised in the second cell group being associated with at least one control channel candidate and the target factor in the present disclosure: the target sum value is linear with the first quantitative value in the present disclosure, and the target sum value is linear with a product of the second quantitative value and the target factor in the present disclosure.

In one embodiment, the target sum value is a positive integer.

In one embodiment, the target sum value is a non-negative integer.

In one embodiment, the target sum value is equal to 0.

In one embodiment, the characteristic sum value is a positive integer.

In one embodiment, the characteristic sum value is a positive integer greater than 1.

In one embodiment, the characteristic sum value is equal to 1.

In one embodiment, the target sum value is less than the characteristic sum value.

In one embodiment, the target sum value is equal to characteristic sum value.

In one embodiment, of the at least one control channel candidate associated there is at least one control channel candidate employing an SCS other than the first SCS.

Embodiment 17A

Embodiment 17A illustrates a schematic diagram of a second parameter according to one embodiment of the present disclosure, as shown in FIG. 17A. In FIG. 17A, $N_1$.cap represents a number of serving cells comprised by a first cell group, $N_2$.cap represents a number of serving cells comprised by a second cell group, and y represents a target factor.

In Embodiment 17A, the second parameter in the present disclosure is linear with a number of serving cells comprised by the first cell group in the present disclosure, and the second parameter is linear with a product of a number of serving cells comprised by the second cell group and the target factor in the present disclosure.

In one embodiment, the target factor is equal to the first candidate factor in the present disclosure.

In one embodiment, the phrase that the second parameter is linear with a number of serving cells comprised by the first cell group includes a meaning that the second parameter is linear with the number of serving cells comprised by the first cell group, with a correlation coefficient being greater than 0.

In one embodiment, the phrase that the second parameter is linear with a number of serving cells comprised by the first cell group includes a meaning that the second parameter is linear with the number of serving cells comprised by the first cell group, with a correlation coefficient being equal to 1.

In one embodiment, the phrase that the second parameter is linear with a product of a number of serving cells comprised by the second cell group and the target factor includes a meaning that the second parameter is linear with a product of a number of serving cells comprised by the second cell group and the target factor, with a correlation coefficient being greater than 0.

In one embodiment, the phrase that the second parameter is linear with a product of a number of serving cells comprised by the second cell group and the target factor includes a meaning that the second parameter is linear with a product of a number of serving cells comprised by the second cell group and the target factor, with a correlation coefficient being equal to 1.

In one embodiment, the sentence that "the second parameter is linear with a number of serving cells comprised by the first cell group, and the second parameter is linear with a product of a number of serving cells comprised by the second cell group and the target factor" is realized through the following formula:

$$N_{cells}^{cap} = N_{1,cap} + R \cdot N_{2,cap}$$

Herein, $$N_{cells}^{cap}$$

represents the second parameter, $N_{1,cap}$ represents a number of serving cells comprised by the first cell group, $N_{2,cap}$ represents a number of serving cells comprised by the second cell group, R represents the target factor.

Embodiment 18A

Embodiment 18A illustrates a schematic diagram of relations among a third parameter, a fourth parameter and a first SCS according to one embodiment of the present disclosure, as shown in FIG. 18A. In FIG. 18A, the first column from the left represents an index scheduling an SCS, and the second column from the left represents X first-type candidate parameters, and the third column from the left represents X second-type candidate parameters: the index of SCS in bold is an index of a first SCS, a first-type candidate parameter in bold is a third parameter, and a second-type candidate parameter in bold is a fourth parameter.

In Embodiment 18A, the first SCS in the present disclosure is one of X candidate SCSs, X being a positive integer greater than 1: the X candidate SCSs respectively correspond to X first-type candidate parameters, any of the X first-type candidate parameters being a positive integer, the X candidate SCSs respectively correspond to X second-type candidate parameters, any of the X second-type candidate parameters being a positive integer: a third parameter is one of the X first-type candidate parameters, and the third parameter is used to determine the first threshold: a fourth parameter is one of the X second-type candidate parameters, and the fourth parameter is used to determine the second threshold: the first SCS is used to determine the third parameter out of the X first-type candidate parameters, and the first SCS is used to determine the fourth parameter out of the X second-type candidate parameters.

In one embodiment, any of the X candidate SCSs is equal to one of 15 kHz, 30 kHz, 60 kHz, 120 KHz.

In one embodiment, any of the X candidate SCSs is equal to one of 15 kHz, 30 kHz, 60 kHz, 120 kHz, 240 KHz.

In one embodiment, any of the X candidate SCSs is equal to one of a non-negative integral power of 2 of 15 kHz.

In one embodiment, the X is equal to 4.

In one embodiment, the X is greater than 4.

In one embodiment, the X is no less than 4.

In one embodiment, the X candidate SCSs are Predefined.

In one embodiment, the X candidate SCSs are Fixed.

In one embodiment, the X candidate SCSs are composed of all SCSs supported by R17.

In one embodiment, the X candidate SCSs are composed of all SCSs supported by R16.

In one embodiment, any two of the X candidate SCSs are unequal.

In one embodiment, any one of the X first-type candidate parameters is a maximum number of PDCCH candidate monitorings in a slot on a serving cell.

In one embodiment, any two of the X first-type candidate parameters are unequal.

In one embodiment, there are two of the X first-type candidate parameters being equal.

In one embodiment, the X is equal to 4, and the X first-type candidate parameters are respectively 44, 36, 22 and 20.

In one embodiment, any one of the X first-type candidate parameters is a possible value of $$M_{PDCCH}^{max,slot,\mu}.$$

In one embodiment, the X first-type candidate parameters are predefined.

In one embodiment, any one of the X second-type candidate parameters is a maximum number of Non-Overlapped CCE monitorings in a slot on a serving cell.

In one embodiment, any two of the X second-type candidate parameters are unequal.

In one embodiment, there are two of the X second-type candidate parameters being equal.

In one embodiment, the X is equal to 4, and the X second-type candidate parameters are respectively 56, 56, 48 and 32.

In one embodiment, any one of the X second-type candidate parameters is a possible value of $$C_{PDCCH}^{max,slot,\mu}.$$

In one embodiment, the X second-type candidate parameters are predefined.

In one embodiment, the X first-type candidate parameters and the X second-type candidate parameters are independent.

In one embodiment, the phrase that the X candidate SCSs respectively correspond to X first-type candidate parameters means that the X candidate SCSs respectively correspond to X first-type candidate parameters according to a table relationship.

In one embodiment, the phrase that the X candidate SCSs respectively correspond to X first-type candidate parameters means that the X candidate SCSs respectively correspond to X first-type candidate parameters according to a mapping relationship.

In one embodiment, the phrase that the X candidate SCSs respectively correspond to X second-type candidate parameters means that the X candidate SCSs respectively correspond to X second-type candidate parameters according to a table relationship.

In one embodiment, the phrase that the X candidate SCSs respectively correspond to X second-type candidate parameters means that the X candidate SCSs respectively correspond to X second-type candidate parameters according to a mapping relationship.

In one embodiment, the phrase that the third parameter is used to determine the first threshold means that the third parameter is used by the first node for determining the first threshold.

In one embodiment, the phrase that the third parameter is used to determine the first threshold means that the first threshold is proportional to the third parameter.

In one embodiment, the phrase that the third parameter is used to determine the first threshold means that the first threshold is proportional to the third parameter, with a scaling coefficient being equal to a product of the first parameter and the second parameter in the present disclosure.

In one embodiment, the phrase that the third parameter is used to determine the first threshold means that the first threshold is equal to a maximum integer no greater than a first transition threshold, the first transition threshold being proportional to the third parameter.

In one embodiment, the phrase that the third parameter is used to determine the first threshold means that the first threshold is equal to a maximum integer no greater than a first transition threshold, the first transition threshold being proportional to the third parameter, with a scaling coefficient being equal to a product of the first parameter and the second parameter in the present disclosure.

In one embodiment, the above phrase that the third parameter is used to determine the first threshold is realized through the following formula:

$$M_{PDCCH}^{total,slot,\mu} = \left\lfloor N_{cells}^{cap} \cdot M_{PDCCH}^{max,slot,\mu} \cdot P_{cells}^{DL,\mu} \right\rfloor$$

$$M_{PDCCH}^{total,slot,\mu}$$

represents the first threshold, $$P_{cells}^{DL,\mu}$$

represents the first parameter in the present disclosure, $$N_{cells}^{cap}$$

represents the second parameter in the present disclosure, and $$M_{PDCCH}^{max,slot,\mu}$$

represents the third parameter, µ represents an index of the first SCS, and [Z] represents a maximum integer no greater than Z.

In one embodiment, the phrase that the fourth parameter is used to determine the second threshold means that the fourth parameter is used by the first node for determining the second threshold.

In one embodiment, the phrase that the fourth parameter is used to determine the second threshold means that the second threshold is proportional to the fourth parameter.

In one embodiment, the phrase that the fourth parameter is used to determine the second threshold means that the second threshold is proportional to the fourth parameter, with a scaling coefficient being equal to a product of the first parameter and the second parameter in the present disclosure.

In one embodiment, the phrase that the fourth parameter is used to determine the second threshold means that the second threshold is equal to a maximum integer no greater than a second transition threshold. the second transition threshold being proportional to the fourth parameter.

In one embodiment, the phrase that the fourth parameter is used to determine the second threshold means that the second threshold is equal to a maximum integer no greater than a second transition threshold. the second transition threshold being proportional to the fourth parameter, with a scaling coefficient being equal to a product of the first parameter and the second parameter in the present disclosure.

In one embodiment, the above phrase that the fourth parameter is used to determine the second threshold is realized through the following formula:

$$C_{PDCCH}^{total,slot,\mu} = \left\lfloor N_{cells}^{cap} \cdot C_{PDCCH}^{max,slot,\mu} \cdot P_{cells}^{DL,\mu} \right\rfloor$$

$$C_{PDCCH}^{total,slot,\mu}$$

represents the second threshold, $$P_{cells}^{DL,\mu}$$

represents the first parameter in the present disclosure, $$N_{cells}^{cap}$$

represents the second parameter in the present disclosure, and $$C_{PDCCH}^{max,slot,\mu}$$

represents the fourth parameter, µ represents an index of the first SCS, and [Z] represents a maximum integer no greater than Z.

In one embodiment, the phrase that the first SCS is used to determine the third parameter out of the X first-type candidate parameters means that the first SCS is used by the first node in the present disclosure for determining the third parameter out of the X first-type candidate parameters.

In one embodiment, the phrase that the first SCS is used to determine the third parameter out of the X first-type candidate parameters means that the third parameter is one of the X first-type candidate parameters that corresponds to the first SCS.

In one embodiment, the phrase that the first SCS is used to determine the third parameter out of the X first-type candidate parameters means that the first SCS is used to determine the third parameter out of the X first-type candidate parameters according to a given mapping relationship.

In one embodiment, the phrase that the first SCS is used to determine the third parameter out of the X first-type candidate parameters means that the first SCS is used to determine the third parameter out of the X first-type candidate parameters according to a given functional relationship.

In one embodiment, the phrase that the first SCS is used to determine the fourth parameter out of the X second-type candidate parameters means that the first SCS is used by the first node in the present disclosure for determining the fourth parameter out of the X second-type candidate parameters.

In one embodiment, the phrase that the first SCS is used to determine the fourth parameter out of the X second-type candidate parameters means that the fourth parameter is one of the X second-type candidate parameters that corresponds to the first SCS.

In one embodiment, the phrase that the first SCS is used to determine the fourth parameter out of the X second-type candidate parameters means that the first SCS is used to determine the fourth parameter out of the X second-type candidate parameters according to a given mapping relationship.

In one embodiment, the phrase that the first SCS is used to determine the fourth parameter out of the X second-type candidate parameters means that the first SCS is used to determine the fourth parameter out of the X second-type candidate parameters according to a given functional relationship.

In one embodiment, for each serving cell to which a sub-band comprised by the first sub-band set of the present disclosure belongs in frequency domain, the first node in the present disclosure is not required to monitor control channel candidate(s) of the M1 control channel candidates of which the number exceeds a smaller value of the first threshold and the third parameter.

In one embodiment, for each serving cell to which any sub-band comprised by the first sub-band set of the present disclosure belongs in frequency domain and belonging to the first cell group in the present disclosure, the first node in the present disclosure is not required to monitor control channel candidate(s) of the M1 control channel candidates of which the number exceeds a smaller value of the first threshold and the third parameter.

In one embodiment, for each serving cell to which any sub-band comprised by the first sub-band set of the present disclosure belongs in frequency domain and belonging to the third cell group in the present disclosure, the first node in the present disclosure is not required to monitor control channel candidate(s) of the M1 control channel candidates of which the number exceeds a smaller value of the first threshold and the third parameter.

In one embodiment, for each serving cell to which any sub-band comprised by the first sub-band set of the present disclosure belongs in frequency domain and belonging to the fifth cell group in the present disclosure, the first node in the present disclosure is not required to monitor control channel candidate(s) of the M1 control channel candidates of which the number exceeds a smaller value of the first threshold and the third parameter.

In one embodiment, for each serving cell to which any sub-band comprised by the first sub-band set of the present disclosure belongs in frequency domain and belonging to the second cell group in the present disclosure, the first node in the present disclosure is not required to monitor control channel candidate(s) of the M1 control channel candidates of which the number exceeds a smaller value of the first threshold and a first product, the first product being a product of the target factor and the third parameter.

In one embodiment, for each serving cell to which any sub-band comprised by the first sub-band set of the present disclosure belongs in frequency domain and belonging to the fourth cell group in the present disclosure, the first node in the present disclosure is not required to monitor control channel candidate(s) of the M1 control channel candidates of which the number exceeds a smaller value of the first threshold and a first product, the first product being a product of the target factor and the third parameter.

In one embodiment, for each serving cell to which a sub-band comprised by the first sub-band set of the present disclosure belongs in frequency domain, the first node in the present disclosure is not required to comprise control channel element(s) of the M2 control channel elements of which the number exceeds a smaller value of the second threshold and the fourth parameter.

In one embodiment, for each serving cell to which any sub-band comprised by the first sub-band set of the present disclosure belongs in frequency domain and belonging to the first cell group in the present disclosure, the first node in the present disclosure is not required to comprise control channel element(s) of the M2 control channel elements of which the number exceeds a smaller value of the second threshold and the fourth parameter.

In one embodiment, for each serving cell to which any sub-band comprised by the first sub-band set of the present disclosure belongs in frequency domain and belonging to the third cell group in the present disclosure, the first node in the present disclosure is not required to comprise control channel element(s) of the M2 control channel elements of which the number exceeds a smaller value of the second threshold and the fourth parameter.

In one embodiment, for each serving cell to which any sub-band comprised by the first sub-band set of the present disclosure belongs in frequency domain and belonging to the fifth cell group in the present disclosure, the first node in the present disclosure is not required to comprise control channel element(s) of the M2 control channel elements of which the number exceeds a smaller value of the second threshold and the fourth parameter.

In one embodiment, for each serving cell to which any sub-band comprised by the first sub-band set of the present disclosure belongs in frequency domain and belonging to the second cell group in the present disclosure, the first node in the present disclosure is not required to comprise control channel element(s) of the M2 control channel elements of which the number exceeds a smaller value of the second threshold and a second product, the second product being a product of the target factor and the fourth parameter.

In one embodiment, for each serving cell to which any sub-band comprised by the first sub-band set of the present disclosure belongs in frequency domain and belonging to the fourth cell group in the present disclosure, the first node in the present disclosure is not required to comprise control channel element(s) of the M2 control channel elements of which the number exceeds a smaller value of the second threshold and a second product, the second product being a product of the target factor and the fourth parameter.

Embodiment 19A

Embodiment 19A illustrates a schematic diagram of a relation between a first control channel candidate and a second control channel candidate according to one embodiment of the present disclosure, as shown in FIG. 19A. In FIG. 19A, respectively illustrated by Case A. Case B and Case C, each blank rectangle represents a control channel element, and each blank rectangle circled by the dotted-line box represents a control channel element occupied by either a first control channel candidate or a second control channel candidate: in Case A, any control channel element occupied by the first control channel candidate is different from that occupied by the second control channel candidate: in Case B. $X(i)$ represents a Payload bit sequence assumed to be carried by the first control channel candidate and the second control channel candidate, $Y1(i)$ and $Y2(i)$ respectively represent scramblings assumed to be employed by the first control channel candidate and the second control channel candidate: in Case C, $x(0)$, $x(1)$, . . . , $x(m)$ represent payload bits of a DCI format assumed to be corresponding to the first control channel candidate, and $x(0)$, $x(1)$, . . . $x(n)$ represent payload bits of a DCI format assumed to be corresponding to the second control channel candidate.

In Embodiment 19A, a first control channel candidate is one of the M1 control channel candidates in the present disclosure, and a second control channel candidate is one of the M1 control channel candidates in the present disclosure other than the first control channel candidate: a control channel element occupied by the first control channel candidate is different from that occupied by the second control channel candidate, or scrambling employed by the first control channel candidate is different from that employed by the second control channel candidate, or a payload size of a downlink control information (DCI) format corresponding to the first control channel candidate is different from that of a DCI format corresponding to the second control channel candidate.

In one embodiment, the first control channel candidate and the second control channel candidate are separately calculated when computing a number of monitorings over the M1 control channel candidates.

In one embodiment, the first control channel candidate and the second control channel candidate are counted as two different control channel candidates of the M1 control channel candidates.

In one embodiment, when any control channel element occupied by the first control channel candidate is the same as that occupied by the second control channel candidate, scrambling employed by the first control channel candidate is different from that employed by the second control channel candidate, or a payload size of a DCI format corresponding to the first control channel candidate is different from that of a DCI format corresponding to the second control channel candidate.

In one embodiment, when scrambling employed by the first control channel candidate is the same as that employed by the second control channel candidate, a control channel element occupied by the first control channel candidate is different from that occupied by the second control channel candidate, or a payload size of a DCI format corresponding to the first control channel candidate is different from that of a DCI format corresponding to the second control channel candidate.

In one embodiment, when a payload size of a DCI format corresponding to the first control channel candidate is the same as that of a DCI format corresponding to the second control channel candidate, a control channel element occupied by the first control channel candidate is different from that occupied by the second control channel candidate, or scrambling employed by the first control channel candidate is different from that employed by the second control channel candidate.

In one embodiment, the phrase that "a control channel element occupied by the first control channel candidate is different from that occupied by the second control channel candidate" means that the number of control channel elements occupied by the first control channel candidate is different from the number of control channel elements occupied by the second control channel candidate.

In one embodiment, the phrase that "a control channel element occupied by the first control channel candidate is different from that occupied by the second control channel candidate" means that a control channel element occupied by the first control channel candidate is not occupied by the second control channel candidate.

In one embodiment, the phrase that "a control channel element occupied by the first control channel candidate is different from that occupied by the second control channel candidate" means that an Aggregation Level (AL) that the first control channel candidate belongs to is different from an AL that the second control channel candidate belongs to.

In one embodiment, the phrase that "scrambling employed by the first control channel candidate is different from that employed by the second control channel candidate" means that a Scrambling Sequence employed by the first control channel candidate is different from that employed by the second control channel candidate.

In one embodiment, the phrase that "scrambling employed by the first control channel candidate is different from that employed by the second control channel candidate" means that a type of a Scrambling Sequence employed by the first control channel candidate is different from that of a Scrambling Sequence employed by the second control channel candidate.

In one embodiment, the phrase that "scrambling employed by the first control channel candidate is different from that employed by the second control channel candidate" means that a length of a Scrambling Sequence employed by the first control channel candidate is different from that of a Scrambling Sequence employed by the second control channel candidate.

In one embodiment, the phrase that "scrambling employed by the first control channel candidate is different from that employed by the second control channel candidate" means that an initial value of a Scrambling Sequence employed by the first control channel candidate is different from that of a Scrambling Sequence employed by the second control channel candidate.

In one embodiment, the phrase that "scrambling employed by the first control channel candidate is different from that employed by the second control channel candidate" means that an initial value of a generation register for a Scrambling Sequence employed by the first control channel candidate is different from that for a Scrambling Sequence employed by the second control channel candidate.

In one embodiment, the phrase that "a payload size of a DCI format corresponding to the first control channel candidate is different from that of a DCI format corresponding to the second control channel candidate" means that the payload size of a DCI format corresponding to the first control channel candidate is larger than that of a DCI format corresponding to the second control channel candidate.

In one embodiment, the phrase that "a payload size of a DCI format corresponding to the first control channel candidate is different from that of a DCI format corresponding to the second control channel candidate" means that the payload size of a DCI format corresponding to the first control channel candidate is smaller than that of a DCI format corresponding to the second control channel candidate.

In one embodiment, the phrase that "a payload size of a DCI format corresponding to the first control channel candidate is different from that of a DCI format corresponding to the second control channel candidate" means that a DCI format corresponding to the first control channel candidate is different from that corresponding to the second control channel candidate.

In one embodiment, the first control channel candidate and the second control channel candidate fulfill at least one of the following conditions:

any control channel element occupied by the first control channel candidate is different from that occupied by the second control channel candidate:

scrambling employed by the first control channel candidate is different from that employed by the second control channel candidate: or a payload size of a DCI format corresponding to the first control channel candidate is different from that of a DCI format corresponding to the second control channel candidate.

Embodiment 20A

Embodiment 20A illustrates a schematic diagram of a relation between a first Control Channel Element (CCE) and a second CCE according to one embodiment of the present disclosure, as shown in FIG. 20A. In FIG. 20A, as illustrated by Case A and Case B, the horizontal axis represents time, while the vertical axis represents frequency: each rectangle represents one of M2 control channel elements, the reticle-filled rectangle represents a first control channel element, while the cross-filled rectangle represents a second control channel element: in Case A, each control channel element circled by the dotted-line box belongs to a control resource set.

In Embodiment 20A, a first control channel element is one of the M2 control channel elements in the present disclosure, and a second control channel element is one of the M2 control channel elements in the present disclosure other than the first control channel element: the first control channel element and the second control channel element respectively belong to different control resource sets, or a control channel candidate occupying the first control channel element and a control channel candidate occupying the second control channel element start with different symbols respectively in time domain.

In one embodiment, time-frequency resources occupied by the first control channel element and time-frequency resources occupied by the second control channel element are different.

In one embodiment, time-frequency resources occupied by the first control channel element and time-frequency resources occupied by the second control channel element are the same.

In one embodiment, the first control channel element and the second control channel element are non-overlapping.

In one embodiment, the phrase that "the first control channel element and the second control channel element respectively belong to different control resource sets" includes a meaning that the first control channel element belongs to a first control resource set, while the second control channel element belongs to a second control resource set: the first control resource set is a CORESET, and the second control resource set is a CORESET, the first control resource set being different from the second control resource set.

In one embodiment, the phrase that "the first control channel element and the second control channel element respectively belong to different control resource sets" includes a meaning that the first control channel element and the second control channel element respectively belong to control resource sets configured with different indexes.

In one embodiment, the phrase that "the first control channel element and the second control channel element respectively belong to different control resource sets" includes a meaning that the first control channel element belongs to a first control resource set, while the second control channel element belongs to a second control resource set: the first control resource set is a CORESET, and the second control resource set is a CORESET, time-frequency resources occupied by the first control resource set being different from those occupied by the second control resource set.

In one embodiment, the phrase that "the first control channel element and the second control channel element respectively belong to different control resource sets" includes a meaning that the first control channel element belongs to a first control resource set, while the second control channel element belongs to a second control resource set: the first control resource set is a CORESET, and the second control resource set is a CORESET, an index of the first control resource set being different from that of the second control resource set.

In one embodiment, the phrase that "the first control channel element and the second control channel element respectively belong to different control resource sets" includes a meaning that the first control channel element belongs to a first control resource set, while the second control channel element belongs to a second control resource set: the first control resource set is a CORESET, and the second control resource set is a CORESET, time-frequency resources occupied by the first control resource set being same as those occupied by the second control resource set while an index of the first control resource set being different from that of the second control resource set.

In one embodiment, the phrase that "a control channel candidate occupying the first control channel element and a control channel candidate occupying the second control channel element start with different symbols respectively in time domain" includes a meaning that: a third control channel candidate occupies the first control channel element, and a fourth control channel candidate occupies the second control channel element, a Starting Symbol/First Symbol occupied by the third control channel candidate in time domain being different from that occupied by the fourth control channel candidate in time domain.

In one embodiment, the phrase that "a control channel candidate occupying the first control channel element and a control channel candidate occupying the second control channel element start with different symbols respectively in time domain" includes a meaning that time-domain resources respectively occupied by two control channel candidates respectively occupying the first control channel element and the second control channel element are different.

In one embodiment, the phrase that "a control channel candidate occupying the first control channel element and a control channel candidate occupying the second control channel element start with different symbols respectively in time domain" includes a meaning that Starting symbols respectively occupied by two control channel candidates respectively occupying the first control channel element and the second control channel element in time domain have different indexes in the first time window.

In one embodiment, the phrase that "a control channel candidate occupying the first control channel element and a control channel candidate occupying the second control channel element start with different symbols respectively in time domain" includes a meaning that Starting symbols respectively occupied by two control channel candidates respectively occupying the first control channel element and the second control channel element in time domain have different indexes in slots to which the Starting symbols respectively belong.

In one embodiment, a starting symbol of a control channel candidate occupying the first control channel element is an OFDM symbol, and a starting symbol of a control channel candidate occupying the second control channel element is an OFDM symbol.

In one embodiment, the first control channel element and the second control channel element fulfill at least one of the following conditions:

the first control channel element and the second control channel element respectively belong to different control resource sets; or a control channel candidate occupying the first control channel element and a control channel candidate occupying the second control channel element start with different symbols respectively in time domain.

Embodiment 21A

Figure 21A:
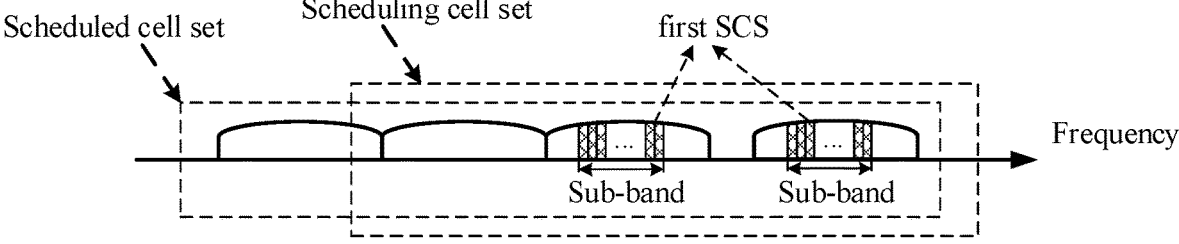
FIG. 21A illustrates a schematic diagram of sub-band(s) in a first sub-band set according to one embodiment of the present disclosure.

Embodiment 21A illustrates a schematic diagram of sub-band(s) in a first sub-band set according to one embodiment of the present disclosure, as shown in FIG. 21A. In FIG. 21A, each box with circular arc top represents a serving cell, two dotted-line frame represent a scheduled cell set and a scheduling cell set respectively, and each vertical square filled with crosses represents a subcarrier comprised by a sub-band in a first sub-band set.

In Embodiment 21A, a scheduling cell set comprises scheduling cells for serving cells comprised by the scheduled cell set in the present disclosure, and the scheduling cell set comprises a positive integer number of serving cell(s): the M1 control channel candidates in the present disclosure are monitored in (a) sub-band(s) comprised by the first sub-band set, the first sub-band set comprising a positive integer number of sub-band(s): a serving cell to which any sub-band comprised by the first sub-band set belongs in frequency domain belongs to the scheduling cell set: an SCS of subcarriers comprised in any sub-band comprised by the first sub-band set is equal to the first SCS in the present disclosure.

In one embodiment, the scheduling cell set comprises only one serving cell.

In one embodiment, the scheduling cell set comprises more than one serving cell.

In one embodiment, any serving cell comprised by the scheduling cell set is an activated cell.

In one embodiment, the scheduling cell set comprises a serving cell that is a deactivated cell.

In one embodiment, any serving cell comprised by the scheduling cell set comprises an active BWP.

In one embodiment, the scheduling cell set comprises a serving cell that comprises a Non-active BWP.

In one embodiment, the number of serving cells comprised in the scheduling cell set is equal to the number of sub-bands comprised in the first sub-band set.

In one embodiment, the number of serving cells comprised in the scheduling cell set is greater than the number of sub-bands comprised in the first sub-band set.

In one embodiment, the number of serving cells comprised in the scheduling cell set is less than the number of sub-bands comprised in the first sub-band set.

In one embodiment, the phrase that "a scheduling cell set comprises scheduling cells for serving cells comprised by the scheduled cell set" means that the scheduling cell set comprises all scheduling cells for serving cells comprised by the scheduled cell set.

In one embodiment, the phrase that "a scheduling cell set comprises scheduling cells for serving cells comprised by the scheduled cell set" means that the scheduling cell set only comprises scheduling cells for serving cells comprised by the scheduled cell set.

In one embodiment, the phrase that "a scheduling cell set comprises scheduling cells for serving cells comprised by the scheduled cell set" means that any serving cell scheduled by a serving cell comprised in the scheduling cell set belongs to the scheduled cell set.

In one embodiment, the phrase that "a scheduling cell set comprises scheduling cells for serving cells comprised by the scheduled cell set" means that the scheduling cell set comprises a scheduling cell for any serving cell comprised in the scheduled cell set.

In one embodiment, the phrase that "a scheduling cell set comprises scheduling cells for serving cells comprised by the scheduled cell set" means that the scheduling cell set also comprises a scheduling cell that is not a scheduling cell for any serving cell comprised in the scheduled cell set.

In one embodiment, the phrase that the M1 control channel candidates are monitored in (a) sub-band(s) comprised by the first sub-band set means that a sub-band to which frequency-domain resources occupied by any one of the M1 control channel candidates belong is a part of the first sub-band set.

In one embodiment, the phrase that the M1 control channel candidates are monitored in (a) sub-band(s) comprised by the first sub-band set means that a sub-band comprised by the first sub-band set comprises frequency-domain resources occupied by any one of the M1 control channel candidates.

In one embodiment, the phrase that the M1 control channel candidates are monitored in (a) sub-band(s) comprised by the first sub-band set means that any sub-band in the first sub-band set comprises frequency-domain resources occupied by at least one of the M1 control channel candidates.

In one embodiment, the first sub-band set only comprises one sub-band.

In one embodiment, the first sub-band set comprises more than one sub-band.

In one embodiment, any sub-band comprised in the first sub-band set is a BWP.

In one embodiment, any sub-band comprised in the first sub-band set is an Active DL BWP.

In one embodiment, any sub-band comprised in the first sub-band set is contiguous frequency-domain resources having a same Numerology in a carrier bandwidth.

In one embodiment, any sub-band comprised in the first sub-band set is frequency-domain contiguous subcarriers having a same Numerology in a carrier bandwidth.

In one embodiment, any sub-band comprised in the first sub-band set is a common resource block subset comprising consecutive Common Resource Blocks (CRBs) for a given Numerology in a given carrier.

In one embodiment, a serving cell to which any sub-band comprised in the first sub-band set belongs is a serving cell corresponding to a carrier to which the any sub-band comprised in the first sub-band set belongs.

In one embodiment, when the first sub-band set comprises more than one sub-band, any two sub-bands comprised in the first sub-band set respectively belong to two different serving cells.

In one embodiment, when the first sub-band set comprises more than one sub-band, there are two sub-bands comprised in the first sub-band set respectively belonging to a same serving cell.

In one embodiment, a sub-band to which any of the M2 control channel elements belongs in frequency domain is a sub-band in the first sub-band set.

In one embodiment, when the first sub-band set comprises more than one sub-band, there are two of the M2 control channel elements respectively belonging to two different sub-bands in the first sub-band set.

In one embodiment, each sub-band comprised in the first sub-band set comprises at least one of the M2 control channel elements in frequency domain.

In one embodiment, any sub-band comprised in the first sub-band set is configurable.

In one embodiment, further comprising:

receiving a ninth information block;

herein, the ninth information block is used to determine each sub-band comprised in the first sub-band set and an SCS of subcarriers in each sub-band comprised in the first sub-band set.

In one embodiment, the phrase that "a serving cell to which any sub-band comprised by the first sub-band set belongs in frequency domain belongs to the scheduling cell set" means that the scheduling cell set comprises a serving cell to which any sub-band comprised by the first sub-band set belongs in frequency domain.

In one embodiment, the phrase that "a serving cell to which any sub-band comprised by the first sub-band set belongs in frequency domain belongs to the scheduling cell set" means that the scheduling cell set only comprises serving cell(s) to which sub-band(s) comprised by the first sub-band set belongs (belong) in frequency domain.

In one embodiment, the scheduling cell set also comprises a serving cell other than any serving cell to which a sub-band comprised by the first sub-band set belongs in frequency domain.

In one embodiment, the phrase that "a serving cell to which any sub-band comprised by the first sub-band set belongs in frequency domain belongs to the scheduling cell set" means that the first sub-band set comprises B sub-band(s), and the scheduling cell set comprises B serving cell(s), the B serving cell(s) respectively comprising the B sub-band(s), B being a positive integer.

In one embodiment, the phrase that "a serving cell to which any sub-band comprised by the first sub-band set belongs in frequency domain belongs to the scheduling cell set" means that a serving cell corresponding a carrier to which any sub-band comprised by the first sub-band set belongs is a part of the scheduling cell set.

In one embodiment, when the first sub-band set comprises more than one sub-band, any two sub-bands comprised by the first sub-band set comprise subcarriers of an equal SCS.

In one embodiment, an SCS of any subcarrier comprised in any sub-band comprised by the first sub-band set is equal to the first SCS.

In one embodiment, the first sub-band set comprises more than one sub-band, and any two subcarriers comprised by the first sub-band set are of an equal SCS.

In one embodiment, any sub-band comprised by the first sub-band set comprises a positive integral multiple of 12 subcarriers.

Embodiment 22A

Figure 22A:
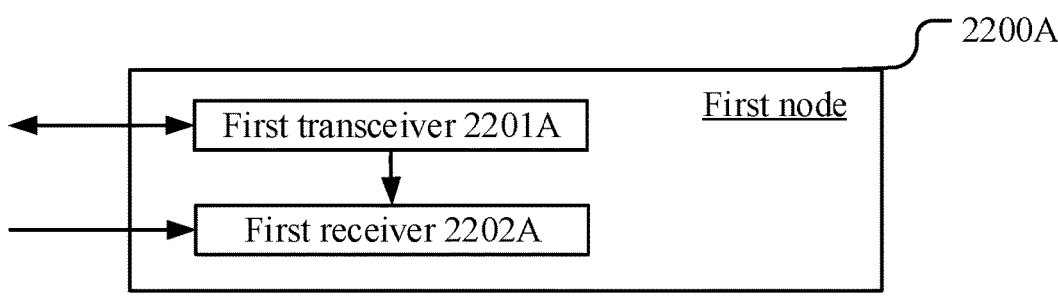
FIG. 22A illustrates a structure block diagram of a processing device in a first node according to one embodiment of the present disclosure.

Embodiment 22A illustrates a structure block diagram of a processing device in a first node, as shown in FIG. 22A. In FIG. 22A, a first node 2200A comprises a first transceiver 2201A and a second receiver 2202A.

The first transceiver 2201A receives a first information block.

The first receiver 2202A monitors M1 control channel candidates in a first time window, the M1 control channel candidates occupying M2 control channel elements, M1 being a positive integer greater than 1, and M2 being a positive integer greater than 1.

In Embodiment 22A, the first information block is used to indicate a scheduled cell set, and serving cells comprised by the scheduled cell set are divided into a first cell group and a second cell group: the first cell group is different from the second cell group: the scheduled cell set comprises a target cell, and any of K1 scheduling cells is a scheduling cell for the target cell. K1 being a positive integer greater than 1: one of the M1 control channel candidates employs a first sub-carrier spacing (SCS), and the first SCS is used to determine a length of the first time window: a number of control resource pool(s) comprised by at least one of the K1 scheduling cells is used to determine a cell group to which the target cell belongs from the first cell group and the second cell group: a first quantitative value is a number of serving cells comprised in the first cell group being associated with at least one of the M1 control channel candidates, and a second quantitative value is a number of serving cells comprised in the second cell group being associated with at least one of the M1 control channel candidates: the first quantitative value, the second quantitative value and the target factor are used together for determining a first threshold and a second threshold: the target factor is a positive number: M1 is no greater than the first threshold, and M2 is no greater than the second threshold; both the first threshold and the second threshold are positive integers greater than 1.

In one embodiment, the K1 scheduling cells respectively correspond to K1 identities, and a scheduling cell corresponding to a smallest one of the K1 identities is a first scheduling cell of the K1 scheduling cells: when a number of control resource pools provided in the first scheduling cell is equal to 1 or there is no control resource pool being provided in the first scheduling cell, the target cell belongs to the first cell group: when the number of control resource pools provided in the first scheduling cell is greater than 1, the target cell belongs to the second cell group.

In one embodiment, when the number of control resource pools provided in any of the K1 scheduling cells is less than 2, the target cell belongs to the first cell group: when among the K1 scheduling cells there is a scheduling cell in which the number of control resource pools provided is greater than 1, the target cell belongs to the second cell group.

In one embodiment, the K1 scheduling cells respectively correspond to K1 first coefficients, and each of the K1 first coefficients is a positive integer, and a quotient of a sum of the K1 first coefficients and K1 is equal to a target value: when the target value is less than a target threshold, the target cell belongs to the first cell group: when the target value is no less than the target threshold, the target cell belongs to the second cell group: the target threshold is a positive real number.

In one embodiment, a first serving cell is a serving cell comprised in the scheduled cell set, and the first serving cell is only scheduled by one scheduling cell: when the number of control resource pool(s) provided in the scheduling cell for the first serving cell is equal to 1 or there is no control resource pool being provided in the scheduling cell for the first serving cell, the first serving cell belongs to the first cell group; when the number of control resource pools provided in the scheduling cell for the first serving cell is greater than 1, the first serving cell belongs to the second cell group.

In one embodiment, the first transceiver 2201A transmits a second information block, and the first transceiver 2201 receives a third information block: the second information block is used to indicate a first candidate factor from a first candidate factor set, the first candidate factor set comprising more than one candidate factor, the first candidate factor is a candidate factor comprised by the first candidate factor set, and any candidate factor comprised by the first candidate factor set is greater than ( ) the third information block is used to determine whether the target factor is equal to the first candidate factor: when the target factor is unequal to the first candidate factor, the target factor is equal to a pre-defined value.

In one embodiment, the first transceiver 2201A transmits a fourth information block: the first candidate factor set is one of G candidate factor sets. G being a positive integer greater than 1: any of the G candidate factor sets comprises more than one candidate factor: the fourth information block is used to indicate the first candidate factor set out of the G candidate factor sets.

In one embodiment, the first quantitative value, the second quantitative value and the target factor are used together for determining a first parameter: the first parameter is used with a second parameter for determining the first threshold and the second threshold: the second parameter is a positive integer.

In one embodiment, the first parameter is a ratio of a target sum value to a characteristic sum value. the target sum value being no greater than the characteristic sum value: the characteristic sum value is linear with a number of serving cells comprised in the first cell group being associated with at least one control channel candidate, and the characteristic sum value is linear with a product of a number of serving cells comprised in the second cell group being associated with at least one control channel candidate and the target factor: the target sum value is linear with the first quantitative value, and the target sum value is linear with a product of the second quantitative value and the target factor.

In one embodiment, the first transceiver 2201A transmits a fifth information block; the fifth information block is used to indicate the second parameter.

In one embodiment, the second parameter is linear with a number of serving cells comprised in the first cell group, and the second parameter is linear with a product of a number of serving cells comprised in the second cell group and the target factor.

In one embodiment, the first SCS is one of X candidate SCSs. X being a positive integer greater than 1: the X candidate SCSs respectively correspond to X first-type candidate parameters, any of the X first-type candidate parameters being a positive integer, the X candidate SCSs respectively correspond to X second-type candidate parameters, any of the X second-type candidate parameters being a positive integer: a third parameter is one of the X first-type candidate parameters, and the third parameter is used to determine the first threshold: a fourth parameter is one of the X second-type candidate parameters, and the fourth parameter is used to determine the second threshold: the first SCS is used to determine the third parameter out of the X first-type candidate parameters, and the first SCS is used to determine the fourth parameter out of the X second-type candidate parameters.

In one embodiment, the first transceiver 2201A receives a sixth information block: the sixth information block is used to determine at least one of the M1 control channel candidates, the M2 control channel elements, or the number of control resource pools configured by any of the K1 scheduling cells.

In one embodiment, a first control channel candidate is one of the M1 control channel candidates, and a second control channel candidate is one of the M1 control channel candidates other than the first control channel candidate: a control channel element occupied by the first control channel candidate is different from that occupied by the second control channel candidate, or scrambling employed by the first control channel candidate is different from that employed by the second control channel candidate, or a payload size of a downlink control information (DCI) format corresponding to the first control channel candidate is different from that of a DCI format corresponding to the second control channel candidate.

In one embodiment, a first control channel element is one of the M2 control channel elements, and a second control channel element is one of the M2 control channel elements other than the first control channel element: the first control channel element and the second control channel element respectively belong to different control resource sets, or a control channel candidate occupying the first control channel element and a control channel candidate occupying the second control channel element respectively start with different symbols.

In one embodiment, a scheduling cell set comprises scheduling cells for serving cells comprised by the scheduled cell set, and the scheduling cell set comprises a positive integer number of serving cell(s): the M1 control channel candidates are monitored in (a) sub-band(s) comprised by the first sub-band set, the first sub-band set comprising a positive integer number of sub-band(s): a serving cell to which any sub-band comprised by the first sub-band set belongs in frequency domain belongs to the scheduling cell set: an SCS of subcarriers comprised in any sub-band comprised by the first sub-band set is equal to the first SCS.

In one embodiment, the first receiver 2202A receives a first signaling in the M1 control channel candidates: the first signaling is a physical layer signaling.

In one embodiment, the first transceiver 2201A comprises at least the first six of the antenna 452, the receiver 454, the multi-antenna receiving processor 458, the receiving processor 456, the transmitter 454, the multi-antenna transmitting processor 457, the transmitting processor 468 and the controller/processor 459 in Embodiment 4.

In one embodiment, the first receiver 2202A comprises at least the first four of the antenna 452, the receiver 454, the multi-antenna receiving processor 458, the receiving processor 456 and the controller/processor 459 in Embodiment 4.

Embodiment 23A

Figure 23A:
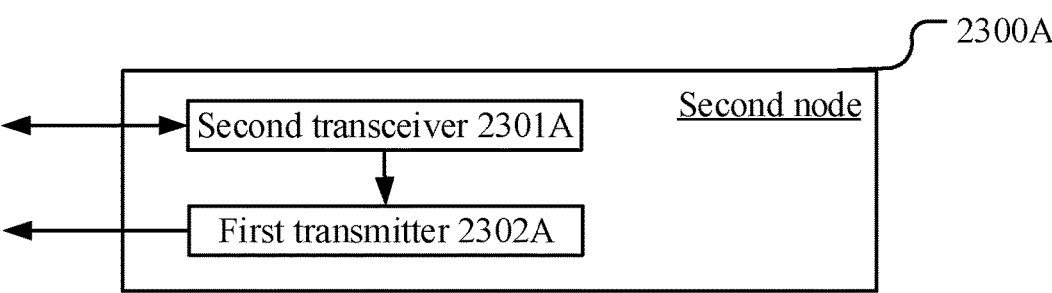
FIG. 23A illustrates a structure block diagram of a processing device in a second node according to one embodiment of the present disclosure.

Embodiment 23A illustrates a structure block diagram of a processing device in a second node, as shown in FIG. 23A. In FIG. 23A, a second node 2300A comprises a first transmitter 2301A and a second transceiver 2302A.

The first transmitter 2301A transmits a first information block:

The second transceiver 2302A determines M1 control channel candidates in a first time window, the M1 control channel candidates occupying M2 control channel elements, M1 being a positive integer greater than 1, and M2 being a positive integer greater than 1.

In Embodiment 23A, the first information block is used to indicate a scheduled cell set, and serving cells comprised by the scheduled cell set are divided into a first cell group and a second cell group: the first cell group is different from the second cell group: the scheduled cell set comprises a target cell, and any of K1 scheduling cells is a scheduling cell for the target cell, K1 being a positive integer greater than 1: one of the M1 control channel candidates employs a first subcarrier spacing (SCS), and the first SCS is used to determine a length of the first time window: a number of control resource pool(s) comprised by at least one of the K1 scheduling cells is used to determine a cell group to which the target cell belongs from the first cell group and the second cell group: a first quantitative value is a number of serving cells comprised in the first cell group being associated with at least one of the M1 control channel candidates, and a second quantitative value is a number of serving cells comprised in the second cell group being associated with at least one of the M1 control channel candidates: the first quantitative value, the second quantitative value and the target factor are used together for determining a first threshold and a second threshold: the target factor is a positive number: M1 is no greater than the first threshold, and M2 is no greater than the second threshold; both the first threshold and the second threshold are positive integers greater than 1.

In one embodiment, the K1 scheduling cells respectively correspond to K1 identities, and a scheduling cell corresponding to a smallest one of the K1 identities is a first scheduling cell of the K1 scheduling cells: when a number of control resource pools provided in the first scheduling cell is equal to 1 or there is no control resource pool being provided in the first scheduling cell, the target cell belongs to the first cell group: when the number of control resource pools provided in the first scheduling cell is greater than 1. the target cell belongs to the second cell group.

In one embodiment, when the number of control resource pools provided in any of the K1 scheduling cells is less than 2, the target cell belongs to the first cell group: when among the K1 scheduling cells there is a scheduling cell in which the number of control resource pools provided is greater than 1, the target cell belongs to the second cell group.

In one embodiment, the K1 scheduling cells respectively correspond to K1 first coefficients, and each of the K1 first coefficients is a positive integer, and a quotient of a sum of the K1 first coefficients and K1 is equal to a target value: when the target value is less than a target threshold, the target cell belongs to the first cell group: when the target value is no less than the target threshold, the target cell belongs to the second cell group: the target threshold is a positive real number.

In one embodiment, a first serving cell is a serving cell comprised in the scheduled cell set, and the first serving cell is only scheduled by one scheduling cell: when the number of control resource pool(s) provided in the scheduling cell for the first serving cell is equal to 1 or there is no control resource pool being provided in the scheduling cell for the first serving cell, the first serving cell belongs to the first cell group; when the number of control resource pools provided in the scheduling cell for the first serving cell is greater than 1, the first serving cell belongs to the second cell group.

In one embodiment, the first transceiver 2301A receives a second information block, and the second transceiver 2301A transmits a third information block: the second information block is used to indicate a first candidate factor from a first candidate factor set, the first candidate factor set comprising more than one candidate factor, the first candidate factor is a candidate factor comprised by the first candidate factor set, and any candidate factor comprised by the first candidate factor set is greater than 0; the third information block is used to determine whether the target factor is equal to the first candidate factor: when the target factor is unequal to the first candidate factor, the target factor is equal to a predefined value.

In one embodiment, the second transceiver 2301A receives a fourth information block: the first candidate factor set is one of G candidate factor sets. G being a positive integer greater than 1: any of the G candidate factor sets comprises more than one candidate factor: the fourth information block is used to indicate the first candidate factor set out of the G candidate factor sets.

In one embodiment, the first quantitative value, the second quantitative value and the target factor are used together for determining a first parameter: the first parameter is used with a second parameter for determining the first threshold and the second threshold: the second parameter is a positive integer.

In one embodiment, the first parameter is a ratio of a target sum value to a characteristic sum value, the target sum value being no greater than the characteristic sum value: the characteristic sum value is linear with a number of serving cells comprised in the first cell group being associated with at least one control channel candidate, and the characteristic sum value is linear with a product of a number of serving cells comprised in the second cell group being associated with at least one control channel candidate and the target factor: the target sum value is linear with the first quantitative value, and the target sum value is linear with a product of the second quantitative value and the target factor.

In one embodiment, the second transceiver 2301A receives a fifth information block: the fifth information block is used to indicate the second parameter.

In one embodiment, the second parameter is linear with a number of serving cells comprised in the first cell group, and the second parameter is linear with a product of a number of serving cells comprised in the second cell group and the target factor.

In one embodiment, the first SCS is one of X candidate SCSs. X being a positive integer greater than 1: the X candidate SCSs respectively correspond to X first-type candidate parameters, any of the X first-type candidate parameters being a positive integer, the X candidate SCSs respectively correspond to X second-type candidate parameters, any of the X second-type candidate parameters being a positive integer: a third parameter is one of the X first-type candidate parameters, and the third parameter is used to determine the first threshold: a fourth parameter is one of the X second-type candidate parameters, and the fourth parameter is used to determine the second threshold: the first SCS is used to determine the third parameter out of the X first-type candidate parameters, and the first SCS is used to determine the fourth parameter out of the X second-type candidate parameters.

In one embodiment, the second transceiver 2301A transmits a sixth information block: the sixth information block is used to determine at least one of the M1 control channel candidates, the M2 control channel elements, or the number of control resource pools configured by any of the K1 scheduling cells.

In one embodiment, a first control channel candidate is one of the M1 control channel candidates, and a second control channel candidate is one of the M1 control channel candidates other than the first control channel candidate: a control channel element occupied by the first control channel candidate is different from that occupied by the second control channel candidate, or scrambling employed by the first control channel candidate is different from that employed by the second control channel candidate, or a payload size of a downlink control information (DCI) format corresponding to the first control channel candidate is different from that of a DCI format corresponding to the second control channel candidate.

In one embodiment, a first control channel element is one of the M2 control channel elements, and a second control channel element is one of the M2 control channel elements other than the first control channel element: the first control channel element and the second control channel element respectively belong to different control resource sets, or a control channel candidate occupying the first control channel element and a control channel candidate occupying the second control channel element respectively start with different symbols.

In one embodiment, a scheduling cell set comprises scheduling cells for serving cells comprised by the scheduled cell set, and the scheduling cell set comprises a positive integer number of serving cell(s): the M1 control channel candidates are monitored in (a) sub-band(s) comprised by the first sub-band set, the first sub-band set comprising a positive integer number of sub-band(s): a serving cell to which any sub-band comprised by the first sub-band set belongs in frequency domain belongs to the scheduling cell set: an SCS of subcarriers comprised in any sub-band comprised by the first sub-band set is equal to the first SCS.

In one embodiment, the first transmitter 2302A transmits a first signaling in the M1 control channel candidates: the first signaling is a physical layer signaling.

In one embodiment, the second transceiver 2301A comprises at least the first six of the antenna 420, the transmitter 418, the multi-antenna transmitting processor 471, the transmitting processor 416, the receiver 418, the multi-antenna receiving processor 472, the receiving processor 470) and the controller/processor 475 in Embodiment 4.

In one embodiment, the first transmitter 2302A comprises at least the first four of the antenna 420, the transmitter 418, the multi-antenna transmitting processor 471, the transmitting processor 416 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The first node and second node in the present disclosure include but are not limited to mobile phones, tablet computers, notebooks, network cards, low-consumption equipment, enhanced MTC (eMTC) terminals, NB-IoT terminals, vehicle-mounted communication equipment, means of transportation, vehicles, RSU, aircrafts, aircrafts, droners, telecontrolled diminutive airplanes, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, RSU and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE) for wireless communications, the UE comprising:
a receiver configured to:
receive signaling that indicates a scheduled cell set, wherein the scheduled cell set is divided into a first cell group and a second cell group, wherein the first cell group includes one or more serving cells, wherein a corresponding scheduling cell for each of the one or more serving cells in the first cell group has one or no Control Resource Set (CORESET) pool, and the second cell group includes one or more serving cells, wherein a corresponding scheduling cell for each of the one or more serving cells in the second cell group has at least two CORESET pools; and
monitor a first plurality of control channel candidates in a time window, wherein: the first plurality of control channel candidates occupy a second plurality control channel elements, the first plurality is less than or equal to a first threshold, the second plurality is less than or equal to a second threshold, the first threshold and the second threshold are determined based on a number the one or more serving cells in the first cell group, a number of the one or more serving cells in the second cell group, and a target factor, wherein the target factor is a number.

2. The UE of claim 1, wherein:
a scheduling cell for a target cell corresponds to a smallest identity of a plurality of identities corresponding to a respective plurality of scheduling cells; and
the target cell belongs to either the first cell group or the second cell group based on a number of CORESET pools of the scheduling cell for the target cell.

3. The UE of claim 1, wherein:
K1 scheduling cells for a target cell correspond to respective K1 coefficients, wherein K1 is an integer;
on a condition that a quotient of a sum of the K1 coefficients and K1 is less than a target threshold, the target cell belongs to the first cell group; and on a condition that the quotient of the sum of the K1 coefficients and K1 is greater than or equal to the target threshold, the target cell belongs to the second cell group.

4. The UE of claim 1, further comprising a transmitter, wherein:
the transmitter is configured to transmit an indication of a candidate factor from a candidate factor set; and
the receiver is further configured to receive information that is used to determine whether the target factor is equal to the candidate factor.

5. The UE of claim 4, wherein:
the transmitter is further configured to transmit an indication of the candidate factor set.

6. The UE of claim 1, wherein:
a first parameter is determined based on the number of the one or more serving cells in the first cell group, the number of the one or more serving cells in the second cell group, and the target factor; and
the first threshold and the second threshold are determined based on the first parameter and a second parameter.

7. The UE of claim 6, wherein the first parameter is a ratio of a target sum value to a characteristic sum value, the target sum value being no greater than the characteristic sum value; the characteristic sum value is linear with the number of the one or more serving cells in the first cell group, and the characteristic sum value is linear with a product of the number of the one or more serving cells in the second cell group and the target factor; the target sum value is linear with the number of the one or more serving cells in the first cell group, and the target sum value is linear with a product of the number of the one or more serving cells in the second cell group and the target factor.

8. The UE of claim 6, further comprising a transmitter configured to transmit the second parameter.

9. The UE of claim 1, wherein:
a control candidate of the first plurality of control channel candidates employs a subcarrier spacing (SCS), the SCS is used to determine a length of the time window, and the first threshold and the second threshold are based on the SCS.

10. The UE of claim 1, wherein:
a first control channel candidate is one of the first plurality of control channel candidates, and a second control channel candidate is one of the first plurality of control channel candidates other than the first control channel candidate; and
a control channel element occupied by the first control channel candidate is different from that occupied by the second control channel candidate, or scrambling employed by the first control channel candidate is different from that employed by the second control channel candidate, or a payload size of a downlink control information (DCI) format corresponding to the first control channel candidate is different from that of a DCI format corresponding to the second control channel candidate.

11. A method performed by a User Equipment (UE), the method comprising:
receiving signaling that indicates a scheduled cell set, wherein the scheduled cell set is divided into a first cell group and a second cell group, wherein the first cell group includes one or more serving cells, wherein corresponding a scheduling cell for each of the one or more serving cells in the first cell group has one or no Control Resource Set (CORESET) pool, and the second cell group includes one or more serving cells, whererin a corresponding scheduling cell for each of the one or more serving cells in the second cell group has at least two CORESET pools; and monitoring a first plurality of control channel candidates in a time window, wherein: the first plurality of control channel candidates occupy a second plurality of control channel elements, the first plurality is less than or equal to a first threshold, the second plurality is less than or equal to a second threshold, the first threshold and the second threshold are determined based on a number of the one or more serving cells in the first cell group, a number of the one or more serving cells in the second cell groups, and a target factor, wherein the target factor is a number.

12. The method of claim 11, wherein:

a scheduling cell for a target cell corresponds to a smallest identity of a plurality of identities corresponding to a respective plurality of scheduling cells; and the target cell belongs to either the first cell group or the second cell group based on a number of CORESET pools of the scheduling cell for the target cell.

13. The method of claim 11, wherein:

K1 scheduling cells for a target cell correspond to respective K1 coefficients, wherein K1 is an integer;

on a condition that a quotient of a sum of the K1 coefficients and K1 is less than a target threshold, the target cell belongs to the first cell group; and on a condition that the quotient of the sum of the K1 coefficients and K1 is greater than or equal to the target threshold, the target cell belongs to the second cell group.

14. The method of claim 11, further comprising:

transmitting an indication of a candidate factor from a candidate factor set; and receiving information that is used to determine whether the target factor is equal to the candidate factor.

15. The method of claim 14, further comprising:

transmitting an indication of the candidate factor set.

16. The method of claim 11, wherein:

a first parameter is determined based on the number of the one or more serving cells in the first cell group, the number of the one or more serving cells in the second cell group, and the target factor; and the first threshold and the second threshold are determined based on the first parameter and a second parameter.

17. The method of claim 16, wherein the first parameter is a ratio of a target sum value to a characteristic sum value, the target sum value being no greater than the characteristic sum value; the characteristic sum value is linear with the number of the one or more serving cells in the first cell group being, and the characteristic sum value is linear with a product of the number of the one or more serving cells in the second cell group and the target factor; the target sum value is linear with the number of the one or more serving cells in the first cell group, and the target sum value is linear with a product of the number of the one or more serving cells in the second cell group and the target factor.

18. The method of claim 16, further comprising:

transmitting the second parameter.

19. The method of claim 11, wherein:

a control candidate of the first plurality of control channel candidates employs a subcarrier spacing (SCS), the SCS is used to determine a length of the time window, and the first threshold and the second threshold are based on the SCS.

20. The method of claim 11, wherein:

a first control channel candidate is one of the first plurality of control channel candidates, and a second control channel candidate is one of the first plurality of control channel candidates other than the first control channel candidate; and a control channel element occupied by the first control channel candidate is different from that occupied by the second control channel candidate, or scrambling employed by the first control channel candidate is different from that employed by the second control channel candidate, or a payload size of a downlink control information (DCI) format corresponding to the first control channel candidate is different from that of a DCI format corresponding to the second control channel candidate.

* * * * *